United States Patent [19]
Wakabayashi

[11] Patent Number: 5,781,810
[45] Date of Patent: Jul. 14, 1998

[54] CAMERA WITH TWO FILM SUPPLY MOTORS ADDITIONALLY DRIVING THE MAGNETIC PREPARATORY OPERATION AND METHOD

[75] Inventor: Tsutomu Wakabayashi, Kanagawa-ken, Japan

[73] Assignee: Nikon Corporation, Tokyo, Japan

[21] Appl. No.: 877,853

[22] Filed: Jun. 18, 1997

Related U.S. Application Data

[63] Continuation of Ser. No. 562,858, Nov. 27, 1995, abandoned.

[30] Foreign Application Priority Data

Dec. 20, 1994 [JP] Japan .................................. 6-316474
Dec. 20, 1994 [JP] Japan .................................. 6-316475

[51] Int. Cl.$^6$ .................................................. G03B 17/24
[52] U.S. Cl. ........................... 396/320; 396/413; 396/418
[58] Field of Search ........................ 396/387, 406–411, 396/413, 418, 310, 319, 320

[56] References Cited

U.S. PATENT DOCUMENTS 4,832,275  5/1989  Robertson ........................... 242/348.3
5,351,102  9/1994  Tsuji et al. ............................ 354/106
5,568,212  10/1996 Shimizu ................................ 396/320

FOREIGN PATENT DOCUMENTS 3-174525  7/1991  Japan .

Primary Examiner—Safet Metjahic
Assistant Examiner—J. K. Han
Attorney, Agent, or Firm—Oliff & Berridge, P L C

[57] ABSTRACT

A camera that effectively uses only two film supply motors. The operation of supplying film from a cartridge is performed by driving a first motor in a first direction. The operation preparatory to magnetic recording on the film is performed by driving the first motor in a second direction different from the first direction. Further, the operation of winding the film on the camera side is performed by driving a second motor in a third direction. The operation of rewinding the film into the cartridge is performed by driving the second motor in a fourth direction different from the third direction. Alternatively, the second motor fourth direction can be used to perform the operation preparatory to magnetic recording, and the first motor second direction can be used to perform the film rewinding. The present invention applies to normal or prewinding cameras.

35 Claims, 38 Drawing Sheets

2

CAMERA WITH TWO FILM SUPPLY MOTORS ADDITIONALLY DRIVING THE MAGNETIC PREPARATORY OPERATION AND METHOD

This is a Continuation of application Ser. No. 08/562,858 filed Nov. 27, 1995 now abandoned.

BACKGROUND OF THE INVENTION

1. Field of the Invention

The present invention relates to a camera that uses two film supply motors to supply film, wind film, rewind film and move a magnetic recording device relative to the film.

2. Description of Related Art

A conventional film in an unused state stores the film wrapped around a spool completely within the cartridge. U.S. Pat. No. 4,832,275, the subject matter of which is incorporated herein by reference, discloses such an apparatus. A conventional camera that uses this kind of cartridge is shown in Japanese Unexamined Patent Publication Hei 3-174525.

Conventional cameras supply film using two motors. Film is supplied from the cartridge by a first motor driving the cartridge spool to rotate in a predetermined direction. Film is wound by a second motor driving the winding spool to rotate in a predetermined direction. The film is rewound into the cartridge by the second motor rotating in the reverse direction to drive the cartridge spool in the reverse direction.

However, in the conventional camera described above, the two motors only supply the film. Therefore, the two motors are not efficiently used.

SUMMARY OF THE INVENTION

It is an object of the present invention to effectively use the film supply motors.

The camera of the present invention includes a first motor supplying film from a cartridge by driving in a first direction, and rewinds the film into the cartridge in a second direction that is different from the first direction. The camera further includes a second motor winding the film toward the camera side by driving in a third direction, and prepares for magnetic recording on the film by driving in a fourth direction that is different from the third direction. The camera may further winds the film on the camera side after each photograph.

The camera according to the present invention can also use a prewinding method where the film is completely supplied from the cartridge to a camera side winding spool before beginning photography. During photography, a portion of the film is rewound into the cartridge after each photograph.

The prewinding camera method may include a control device to perform the film rewinding operation using the first motor concurrently with the magnetic recording preparatory operation of the second motor.

The camera may also include a first motor that rotates in a first direction and a second direction opposite the first direction. A second motor rotates in a third direction and a fourth direction opposite the third direction. A first power device advances the film from the cartridge by converting the first motor in the first direction rotation. The first power transfer device rewinds film into the cartridge by transferring the first motor rotation in the second motor direction. A second power transfer device winds film on the camera side by transferring the second motor rotation in the third direction to the winding spool, and prepares for the magnetic recording by transferring the second motor rotation in the fourth direction to a magnetic recording preparatory device.

The magnetic recording preparatory operation of the camera may include pressing and withdrawing a magnetic head against the film.

Further, the prewinding camera may perform film winding operation by the first motor during the magnetic recording preparatory operation of the second motor.

The prewinding camera supplies film by transferring rotation of the first motor in a first direction by the first power transfer device and rewinding film into the cartridge by transferring rotation of the first motor in the second direction to the cartridge spool. Further, the film is wound towards the camera side by transferring rotation of the second motor in the third direction using the second power transfer device. The operation preparatory to magnetic recording is performed by driving the second motor in a fourth direction.

The magnetic recording preparatory operations may include pressing a magnetic head against the film and withdrawing the magnetic head from the film. The magnetic recording preparatory operation may further include all preparatory operations necessary for magnetic recording.

Alternatively, the present invention may be performed by the camera supplying film from a cartridge by driving the first motor in a first direction. Magnetic recording is performed by driving the first motor in a second direction different from the first direction. Further, winding film on the camera side by driving the second motor in a third direction and rewinding the film into the cartridge by driving the second motor in a fourth direction different from the third direction. The camera can be a normal winding or a prewinding camera.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
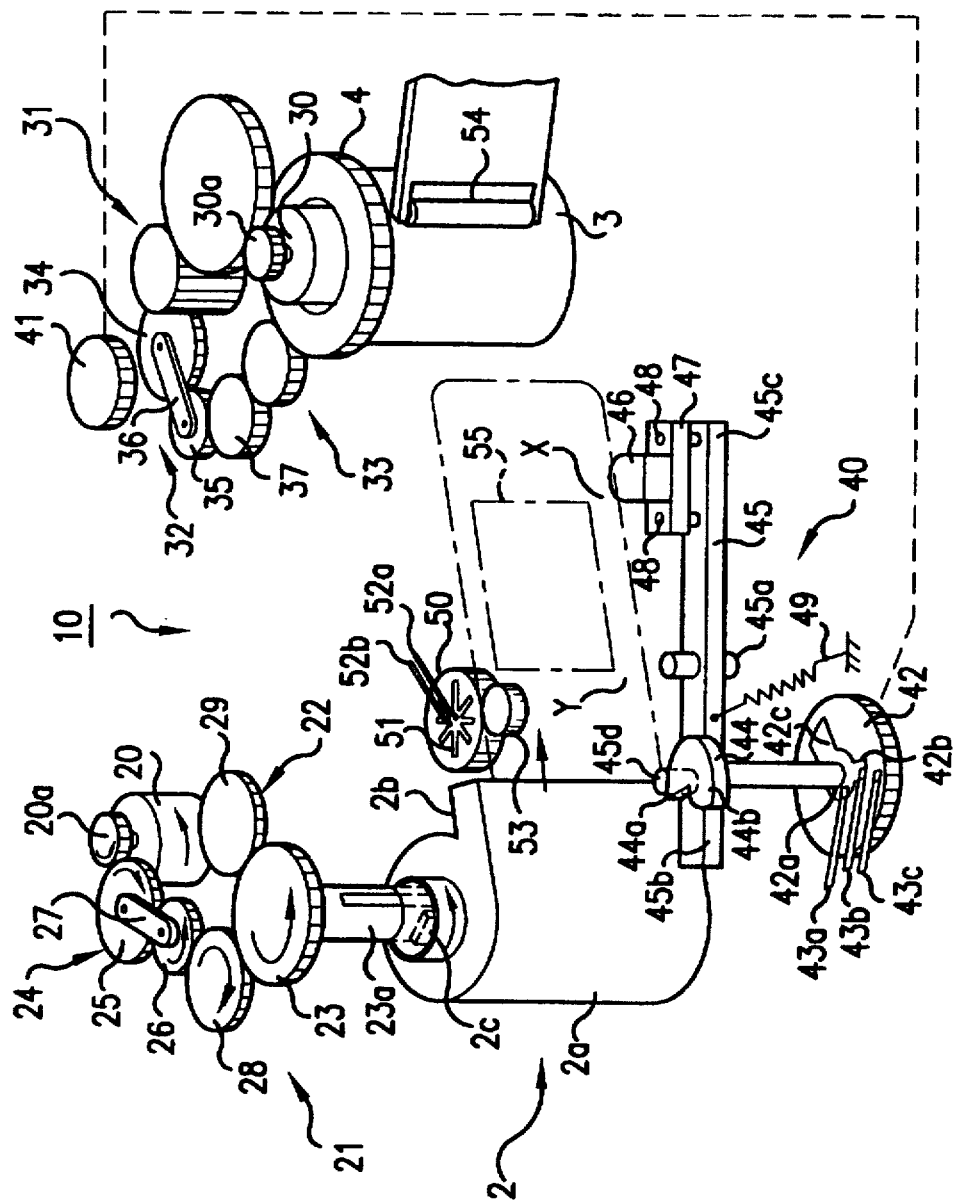
FIG. 1 is a drawing showing the driving mechanism according to a preferred embodiment of the present invention.

FIGS. 1–8 are drawings showing the drive mechanisms of a camera according to a first preferred embodiment of the present invention. To make the drive mechanism of the film cartridge easier to understand, in FIGS. 1–8, a key 23a fixed to a film driving gear 23 and a spline 2c formed at the tip of the cartridge spool (not shown) of a film cartridge 2 are shown in a non-engaged state. However, when the film cartridge 2 is loaded into the camera, the key 23a engages with the spline 2c so the cartridge spool (not shown) rotates by means of the rotation of the film driving gear 23 to supply and rewind a film 1.

In the first preferred embodiment, the unused film 1 is wound around a cartridge spool (not shown) and completely stored within the film cartridge 2. During use, the film cartridge 2 is configured so that the spool rotates in the supply direction and the film 1 is supplied to the outside through a supply opening 2b.

A magnetic recording section is included on the film 1 to magnetically record various information. Recording or retrieval of the various information is accomplished using a magnetic head 46. The magnetic recording section is positioned to correspond to each photo frame on one side of the film 1 in the lengthwise direction. The magnetic recording section preferably has a band shape.

The camera has a first motor 20 and a second motor 30. The spool of the film cartridge 2 is driven and the film 1 is supplied from the film cartridge 2 by the first motor 20 rotating in a first direction. The first motor rotation in the first direction is hereafter also called forward rotation. The cartridge spool driven by the first motor 20 rotating in a second direction opposite from the forward rotation rewinds the film 1 into the film cartridge 2. This may hereafter be referred to as reverse rotation.

On the other hand, a winding spool 3 is driven and the film 1 is wound by the second motor 30 rotating in a third direction also hereafter called forward rotation. The advancement and withdrawing of the magnetic head 46 is performed by the second motor 30 rotating in a fourth direction opposite to the third direction. This fourth direction is also hereafter called reverse rotation.

The operations dependent on the rotation direction of the first motor 20 and the second motor 30 are set forth in Table 1.

TABLE 1

|  | Forward Rotation | Reverse Rotation |
| --- | --- | --- |
| First motor | film supplying | film rewinding |
| Second motor | film winding | magnetic head recording preparatory operation (magnetic head advancing and withdrawing) |

The magnetic head 46 is attached to a first end 45c of a support lever 45 and is positioned near the bottom edge of the film 1 (the area labelled X in FIG. 1) and close to an aperture 55. The support lever 45 rotates about a rotation shaft 45a located approximately in the center of the support lever 45 and a pin 45d at a second end 45b opposite the first end 45c. A spring 49 forces the second end 45b of the support lever 45 toward a cam 44. The cam 44 is fixed to a gear 42. When the gear 42 rotates, the pin 45d slides along the side surface of the cam 44. Through the gear 42 and support lever 45 action, the magnetic head 46 on the first end 45c advances and withdraws.

When the pin 45d rotatably contacts a side 44a of the cam 44, the magnetic head 46 withdraws from the film 1. When the pin 45d contacts a side 44b of the cam 44, the magnetic head 46 is pressed against the magnetic recording section of the film 1 by the spring 49. Thus, magnetic recording and retrieval is made possible. Normally, the magnetic head 46 is withdrawn from the film 1. The magnetic head presses against the magnetic recording section of the film 1 during frame advancing following photography so information about the photo frame can be magnetically recorded.

FIGS. 1–8 show the position of the magnetic head 46 relative to a camera having a normal winding method. With a camera using a prewinding method, the magnetic head 46 is positioned to contact the film 1 section labelled Y as shown in FIG. 1. The magnetic head 46 is preferably fixed to the support lever 45 by a screw 48 through a fixing bracket 47 that allows the position and inclination to be regulated relative to the magnetic recording section of the film 1.

Electrically conductive patterns 42a, 42b and 42c are formed on the gear 42, and brushes 43a, 43b and 43c slide along the top of the electrically conductive patterns 42a, 42b and 42c. The electrically conductive patterns 42a–42c and brushes 43a–43c operate as switches that detect advancement and withdrawal of the magnetic head 46 relative to the film 1. The pin 45d contacts the side 44a of the cam 44 when the magnetic head 46 has withdrawn from the film 1 and an electric current flows between brushes 43a and 43b. The pin 45d contacts the side 44b of the cam 44 when the magnetic head is pressing against the surface of the film 1 and an electric current flows between brushes 43a and 43c.

A supply amount detection roller 50 detects the amount of the film 1 that is supplied. The supply amount detection roller 50 is pressed against the film 1 using a pressure roller 53. The pressure roller 53 is forced against the film 1 to guarantee the roller 50 rotates as the film 1 is supplied. Brushes 52a and 52b slide across an electrically conductive pattern 51 on top of the roller 50. When the roller 50 rotates as the film 1 is supplied, electric current either flows or does not flow through the brushes 52a and 52b to create a pulse signal each time a predetermined amount of film is supplied.

The film supply operation, the film winding operation, the magnetic head advancement and withdrawal and the film rewinding operation of the first preferred embodiment will now be described below with reference to FIGS. 1–5.

(1) Film Supply Operation.

As shown in FIG. 1, when the first motor 20 rotates forward, drive power transfers from a pinion gear 20a attached to the motor shaft to a sun gear 25 of a planetary gear mechanism 24. This causes a planetary lever 27 on the sun gear 25 to move toward a gear 28 under the friction force of a spring (not shown). A planetary gear 26 of the planetary gear mechanism 24 enmeshes with the gear 28 to transfer the forward rotation of the first motor 20 to the film driving gear 23. The gear 23 is driven in a counterclockwise rotational direction. Because the key 23a of the gear 23 is engaged with the spline 2c of the film cartridge 2, the spool of the film cartridge 2 rotates in the supply film direction. Thus, the film 1 is supplied from the supply opening 2b.

Figure 2:
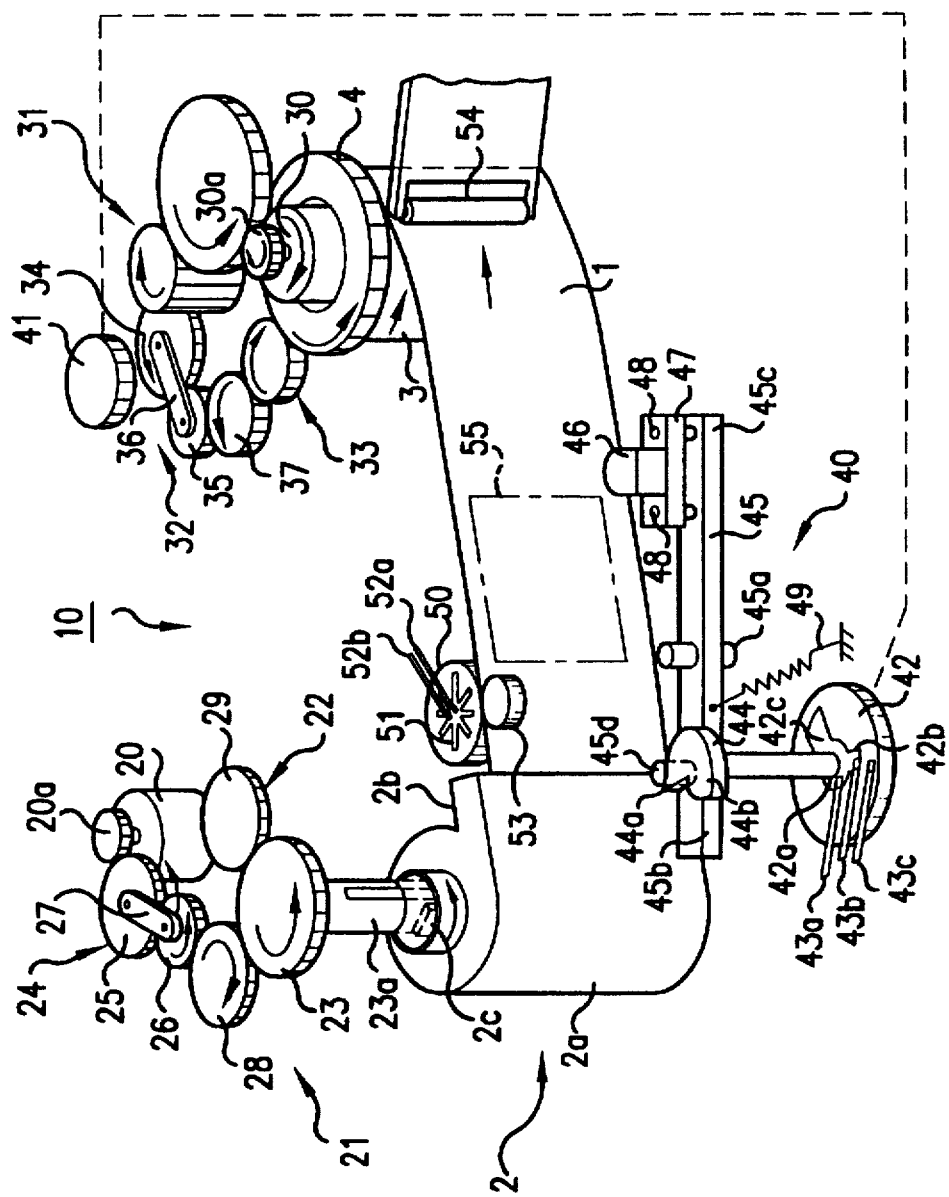
FIG. 2 is a drawing showing another state of the driving mechanism.

A leader portion of the film 1 is supplied from the cartridge 2. The leader portion moves along the film path, passes an aperture 55, and reaches the outer perimeter of the winding spool 3. As shown in FIG. 2, the film is then pressed against the outer perimeter of the winding spool 3 by a pressure roller 54 acting under the force of a spring (not shown).

(2) Film Winding Operation

When the leader portion of the film 1 is pressed against the outer perimeter of the winding spool 3 by the pressure roller 54, the first motor 20 is halted and forward rotation of the second motor 30 starts. As shown in FIG. 2, when the second motor 30 rotates forward, drive power transfers from a pinion gear 30a on the motor shaft to a sun gear 34 of a planetary gear mechanism 32 through a gear train 31. This causes a planetary lever 36 attached to the sun gear 34 to move toward a gear train 33. A planetary gear 35 of the planetary gear mechanism 32 enmeshes with the gear 37 to transfer the forward rotation of the second motor 30 to a gear 4 through the gear train 33. The gear 4 is attached to the winding spool 3 to rotate the winding spool 3 in the winding direction and thus wind the film 1 around the winding spool 3.

Figure 3:
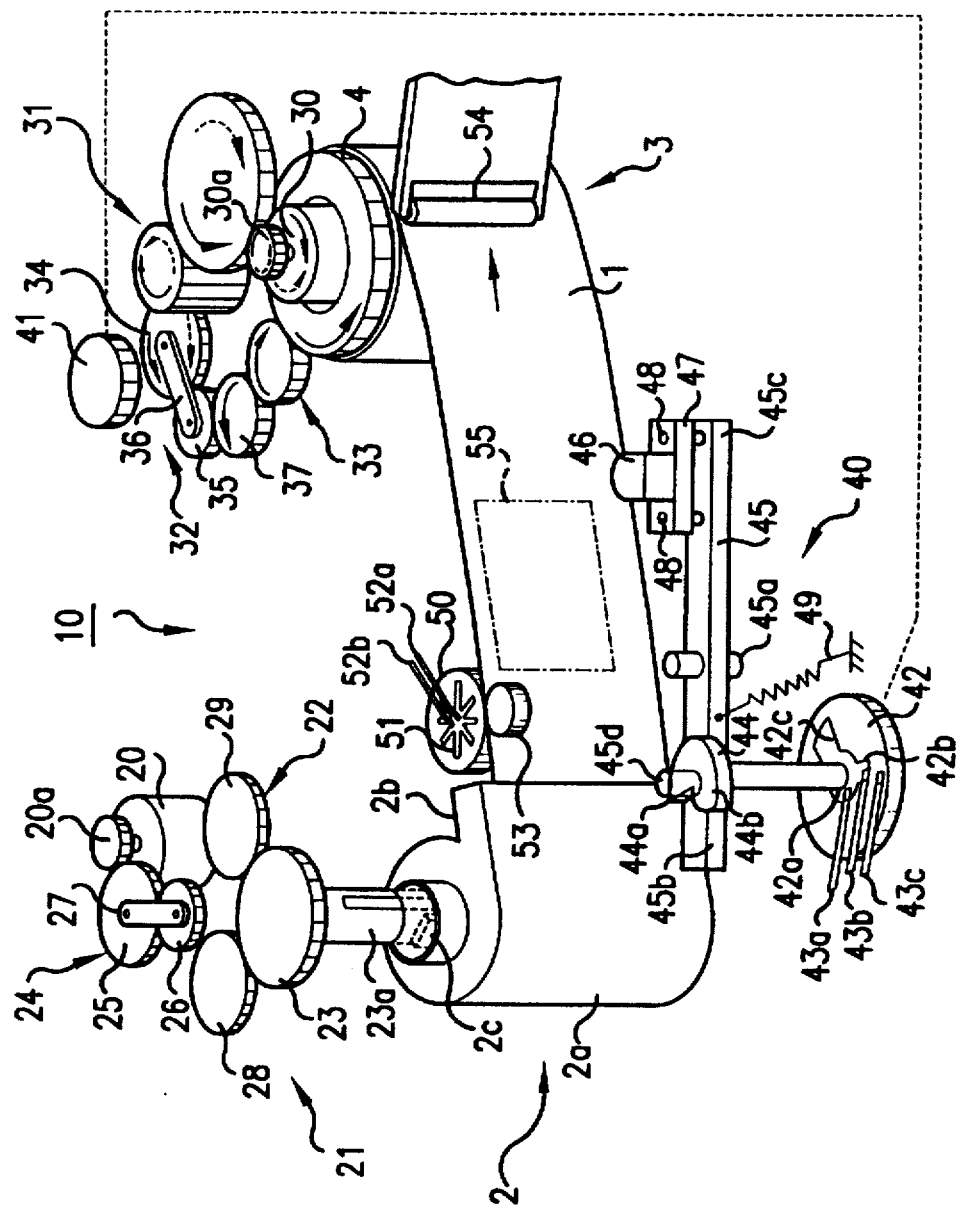
FIG. 3 is a drawing showing another state of the driving mechanism.

Because the key 23a of the gear 23 engages with the spline 2c of the film cartridge 2, the cartridge spool rotation transfers to the gear 28 through the gear 23 with the film winding. The first motor 20 is halted at this time. As shown in FIG. 3, when gear 28 is driven to rotate in a clockwise direction, the enmeshing of the gear 28 and the planetary gear 26 is broken by the rotational drive force and the planetary lever 27 moves toward the gear 29. Therefore, the cartridge spool rotation accompanying the film winding does not transfer from the gear 28 to the planetary gear 26. Further, the first motor 20 does not impede film winding by the second motor 30.

(3) Magnetic Head Advancement and Withdrawal

Figure 4:
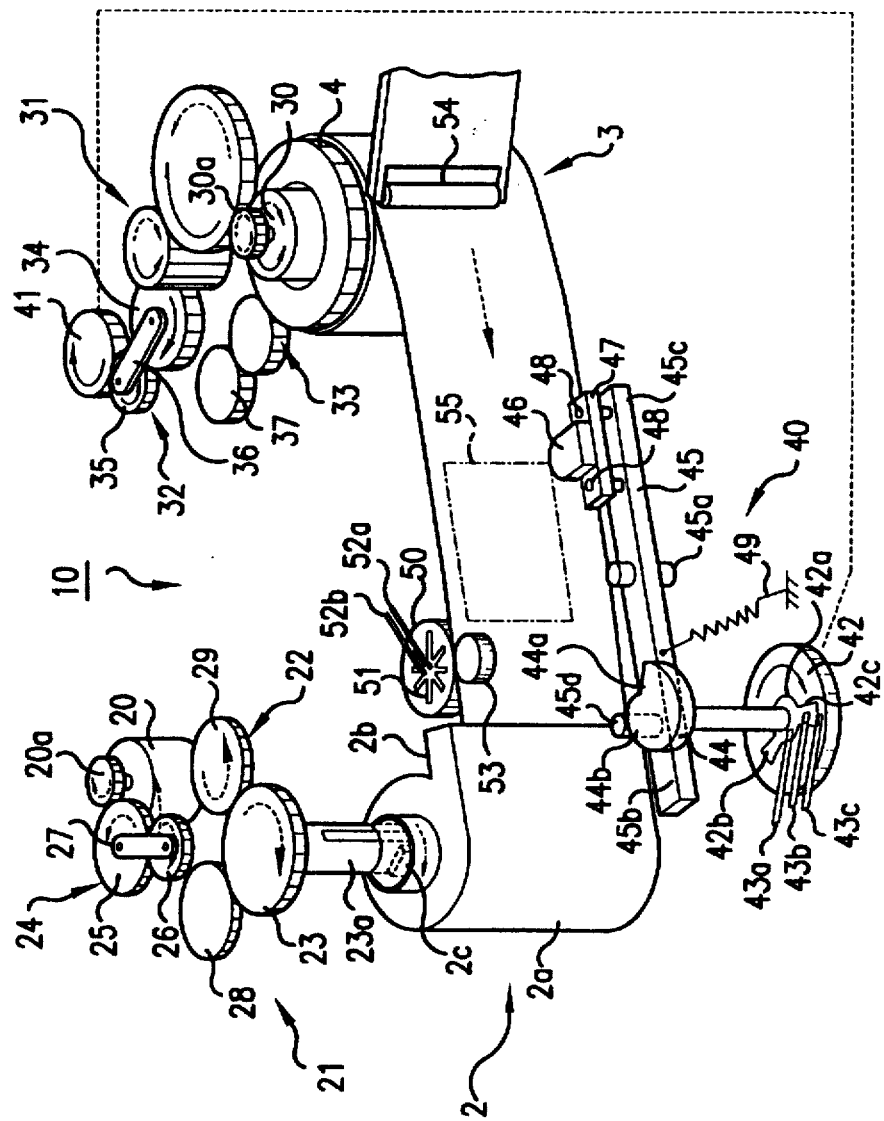
FIG. 4 is a drawing showing another state of the driving mechanism.
Figure 5:
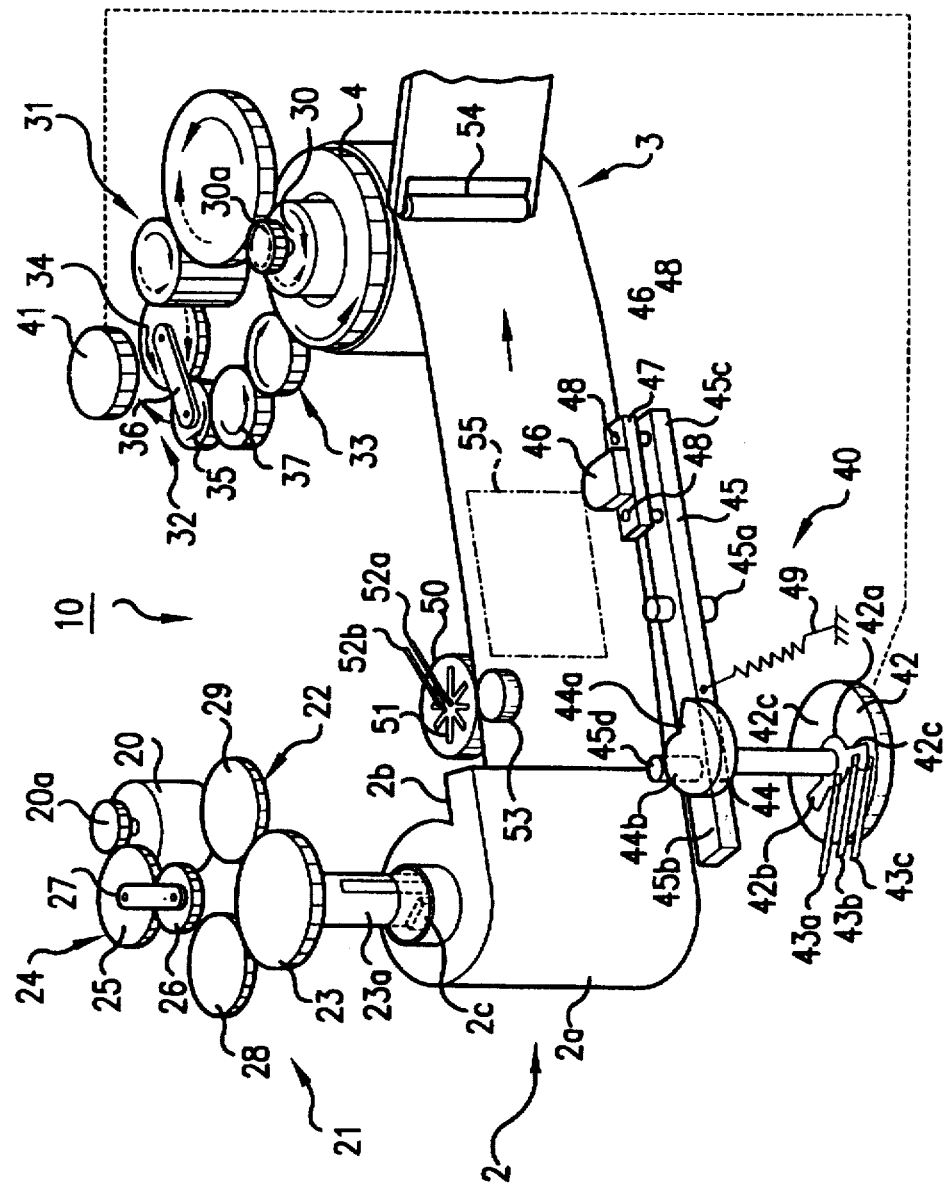
FIG. 5 is a drawing showing another state of the driving mechanism.
Figure 6:
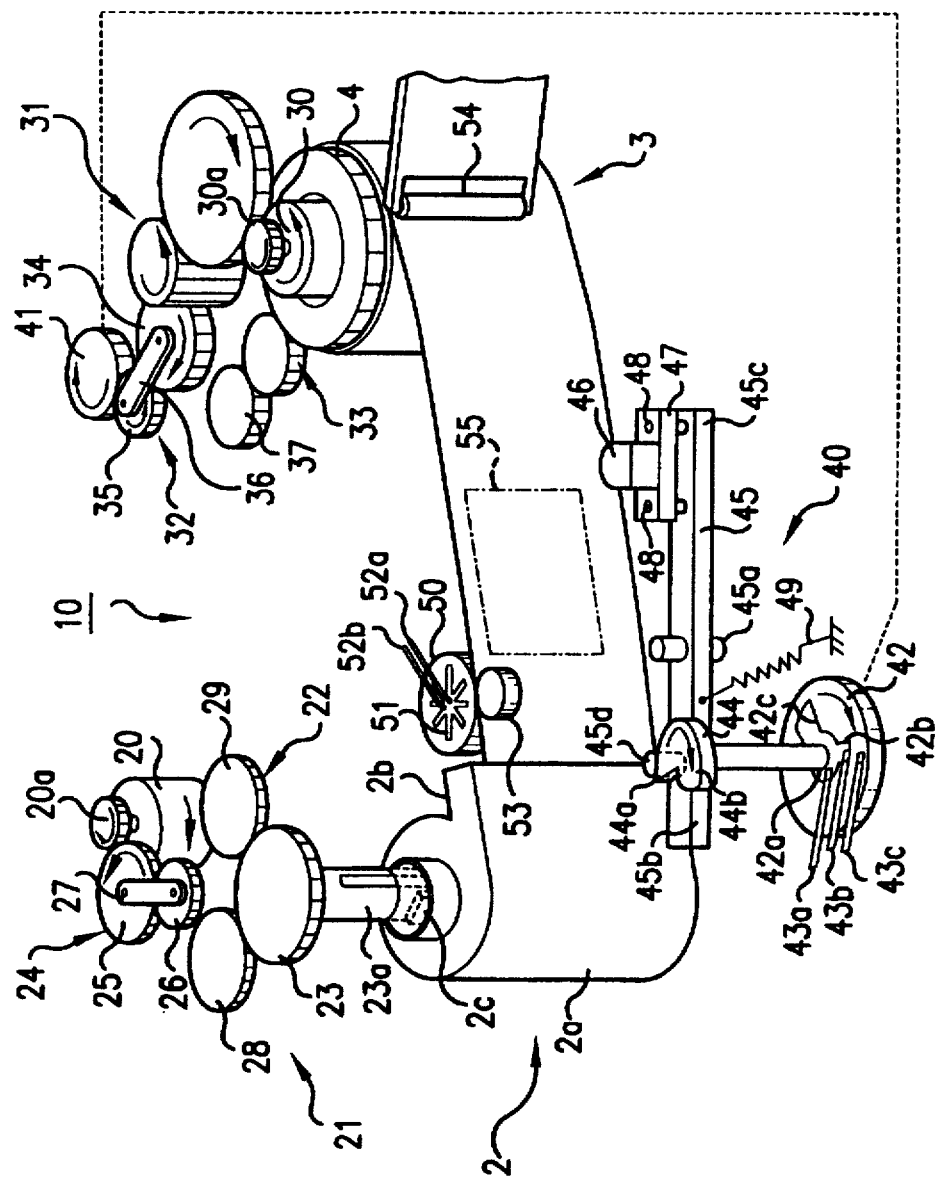
FIG. 6 is a drawing showing another state of the driving mechanism.

As shown in FIG. 4, when the second motor 30 rotates in the reverse direction, the sun gear 34 of the planetary gear mechanism 32 is rotated counterclockwise so that the planetary lever 36 moves toward a gear 41. The planetary gear 35 and gear 41 enmesh to transfer the second motor 30 reverse rotation from the planetary gear 35 to the cam driving gear 42 through the gear 41. Thus, the cam 44 rotates in a clockwise direction. Further, when the pin 45d of the support lever 45 contacts the side 44b of the cam 44, the magnetic head 46 is pressed against the magnetic recording section of the film 1 as shown in FIG. 4. An electric current then flows between the brushes 43a and 43c.

The cam 44 rotates further as the second motor 30 continues rotating. As shown in FIG. 3, the pin 45d of the support lever 45 contacts with the side 44a of the cam 44 and the magnetic head 46 withdraws from the film 1. At this time, an electric current flows between the brushes 43a and 43b.

(4) Film Rewinding Operation

Figure 7:
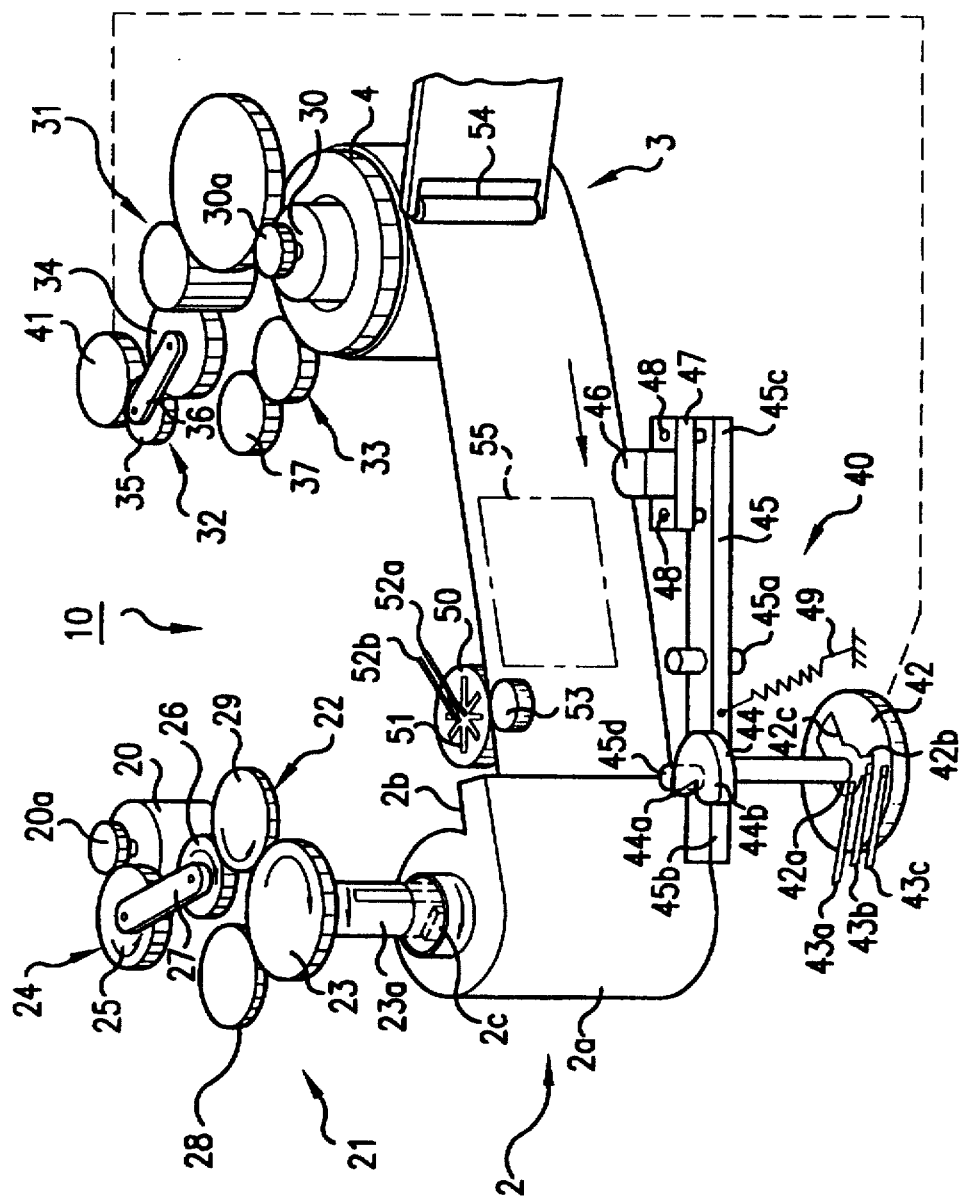
FIG. 7 is a drawing showing another state of the driving mechanism.

As shown in FIG. 7, when film photography is complete, the first motor 20 begins to rotate in reverse causing the pinion gear 20a to rotate in a clockwise direction. The reverse rotation of the first motor 20 transfers to the sun gear 25 of the planetary gear mechanism 24 through the pinion gear 20a. The sun gear 25 counterclockwise rotation causes the planetary lever 27 to move toward the gear 29 and the planetary gear 26 enmeshes with the gear 29. Thus, the first motor 20 reverse rotation transfers from the planetary gear 26 through the gear 29, to the cartridge driving gear 23 and the spline 2c, which engages the gear key 23a, to reverse rotate the cartridge spool. Thereby, the film 1 is rewound into the cartridge 2.

The winding spool 3 rotates with the film 1 to cause the gear 37 to rotate through the gear 4 and the gear train 33. Because the planetary gear 35 is enmeshed with gear 41, the second motor 30 does not become a load on the first motor 20 during the film rewinding.

Figure 9:
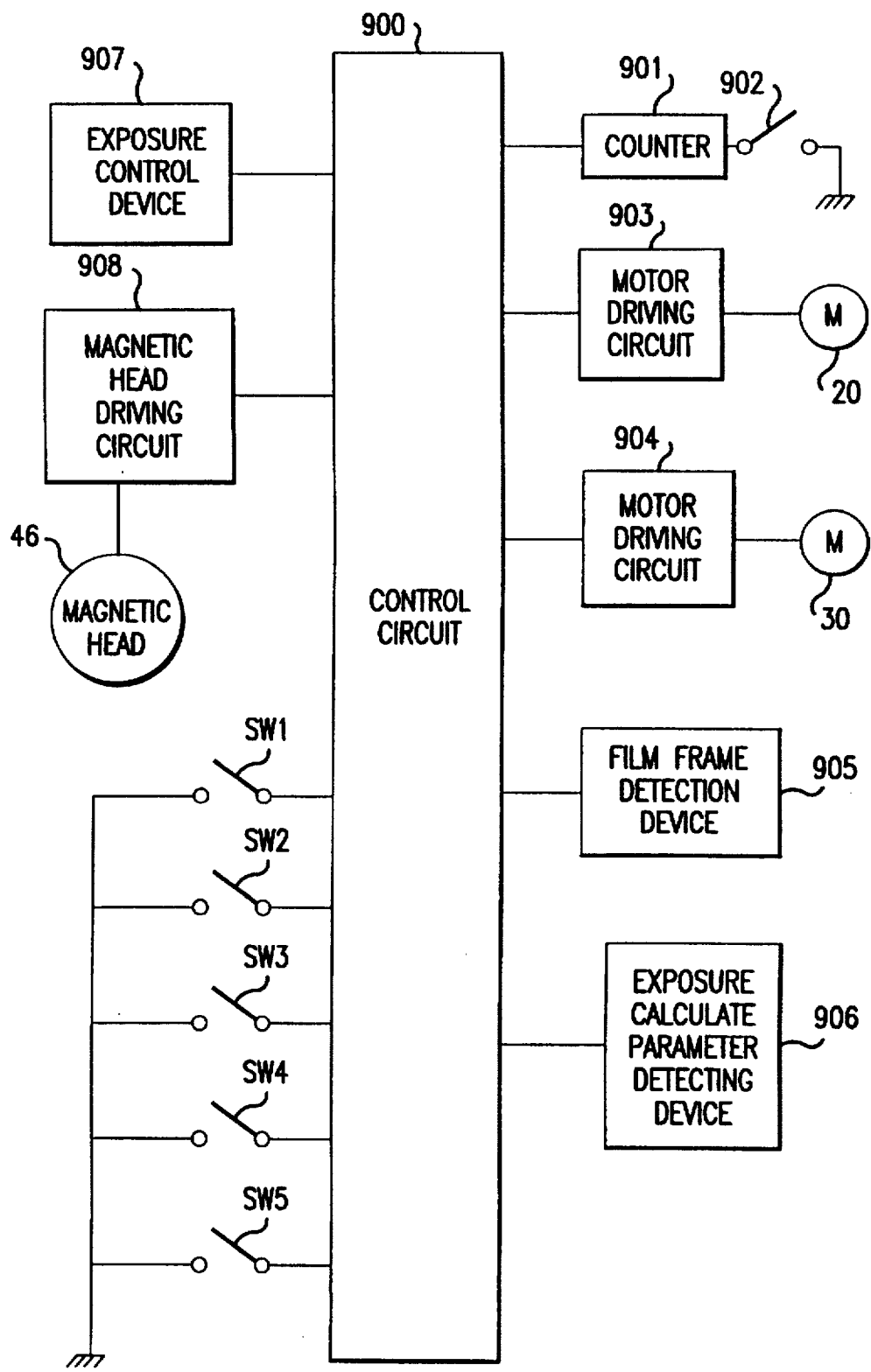
FIG. 9 is a function block diagram showing a configuration of the present invention.

FIG. 9 is a block diagram showing the configuration of a preferred embodiment. A control circuit 900 includes a microcomputer and peripheral components such as a memory and a timer.

In the illustrated embodiments, the camera controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 10-20 and 29-40 can be used as the controller. As shown, a distributed processing architecture is preferred for maximum data/signal processing capability and speed.

The control circuit 900 controls the film supplying operation, the film winding operation, the advancement/withdrawal of the magnetic head and the film rewinding operation as will be discussed. Further, the following circuits and devices are connected to the control circuit 900.

The counter 901 detects the amount of supplied film. A switch 902 includes the electrically conductive pattern 51 on the supplying amount detection roller 50 and the sliding brushes 52a and 52b. Thus, the switch 902 creates a pulse signal each time a predetermined amount of film is supplied. The counter 901 counts the switch's pulse signals to detect the amount of supplied film.

The motor driving circuit 903 drives the first motor 20 while the motor driving circuit 904 drives the second motor 30. A film frame number detection device 905 detects the number of film frames that have been loaded. An exposure calculation parameter detecting device 906 detects the subject brightness and film sensitivity used in exposure computations. Further, an exposure control device 907 performs exposure of the film 1 by controlling the shutter mechanism and aperture stop mechanism. A magnetic head driving circuit 908 drives the magnetic head 46 to record and retrieve various information on the magnetic recording section of the film 1.

Switch SW1 detects the opened and closed state of the cartridge chamber cover. The switch SW1 closes when the cartridge chamber cover is opened (hereafter, a switch closed state is referred to as "on" and a switch open state is referred to as "off") and opens when the cover is closed. Switch SW2 detects the loading of the cartridge 2. The switch SW2 turns on when the cartridge 2 is loaded into the cartridge chamber and turns off when the cartridge 2 is removed. Switch SW3 turns on with the motion of a release button (not shown) and turns off when depression of the release button is stopped.

Switch SW4 is a withdrawal detection switch for the magnetic head 46. The switch SW4 includes the electrically conductive patterns 42a and 42b and the brushes 43a and 43b. The switch SW4 turns on when the magnetic head 46 is withdrawn. Switch SW5 is a pressure detection switch for the magnetic head 46. The switch SW5 includes electrically conductive patterns 42a, 42c and the brushes 43a, 43c. The switch SW5 turns on when the magnetic head 46 is in a pressing state.

FIGS. 10-15 are flowcharts showing the film operations of the first preferred embodiment applied to a camera having a normal winding method where the film 1 is wound from the cartridge 2 by the winding spool 3 after each photograph.

Figure 10:
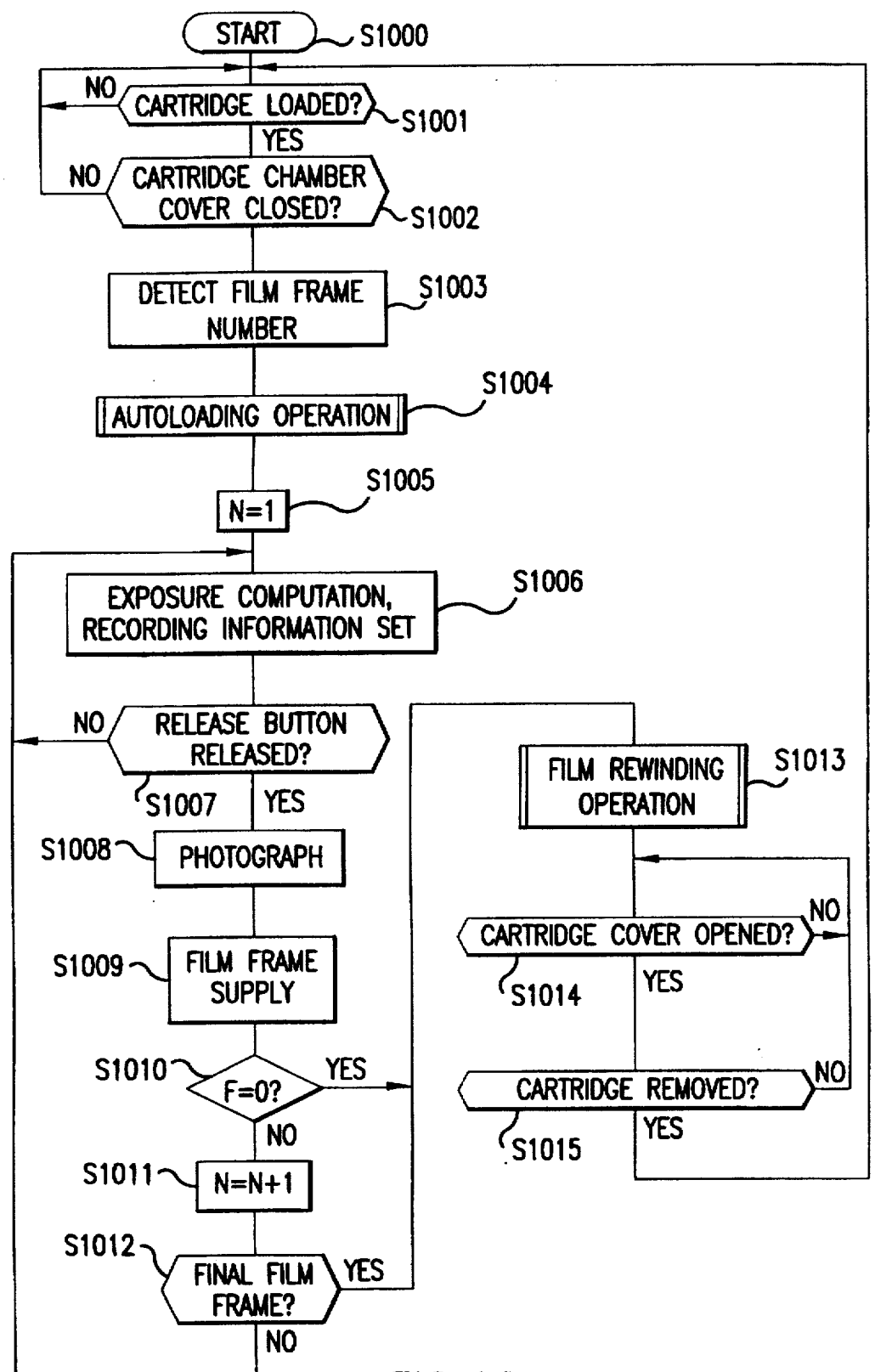
FIG. 10 is a flowchart showing the operation of a preferred embodiment applied to a normal winding method.

As shown in FIG. 10, the control circuit 900 starts operations in step S1000 when a battery (not shown) is loaded in the camera. Step S1001 determines whether the film cartridge 2 is loaded in the cartridge chamber using switch SW2. When the film cartridge 2 has been loaded, operation continues to step S1002. Step S1002 determines whether the cartridge chamber cover has been closed using the switch SW1. When the cartridge chamber cover has been closed, operation continues to step S1003. Step S1003 detects the number of film frames using the film frame number detection device 905. The number of film frames is stored in an memory (not shown).

Figure 11:
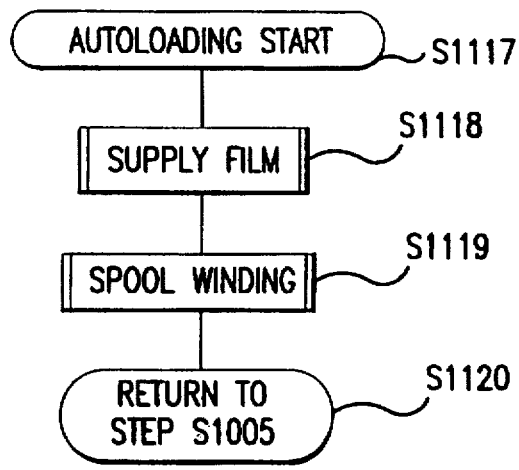
FIG. 11 is a flowchart showing autoloading for a normal winding method.

Step S1004 performs an autoloading operation as shown in FIG. 11. Within the autoloading operation, the supplying operation (shown in FIG. 12) and the spool winding operation (shown in FIG. 13) are performed.

As shown in FIG. 11, the autoloading operation starts in step S1117. Step S1118 performs film supplying operation.

Figure 8:
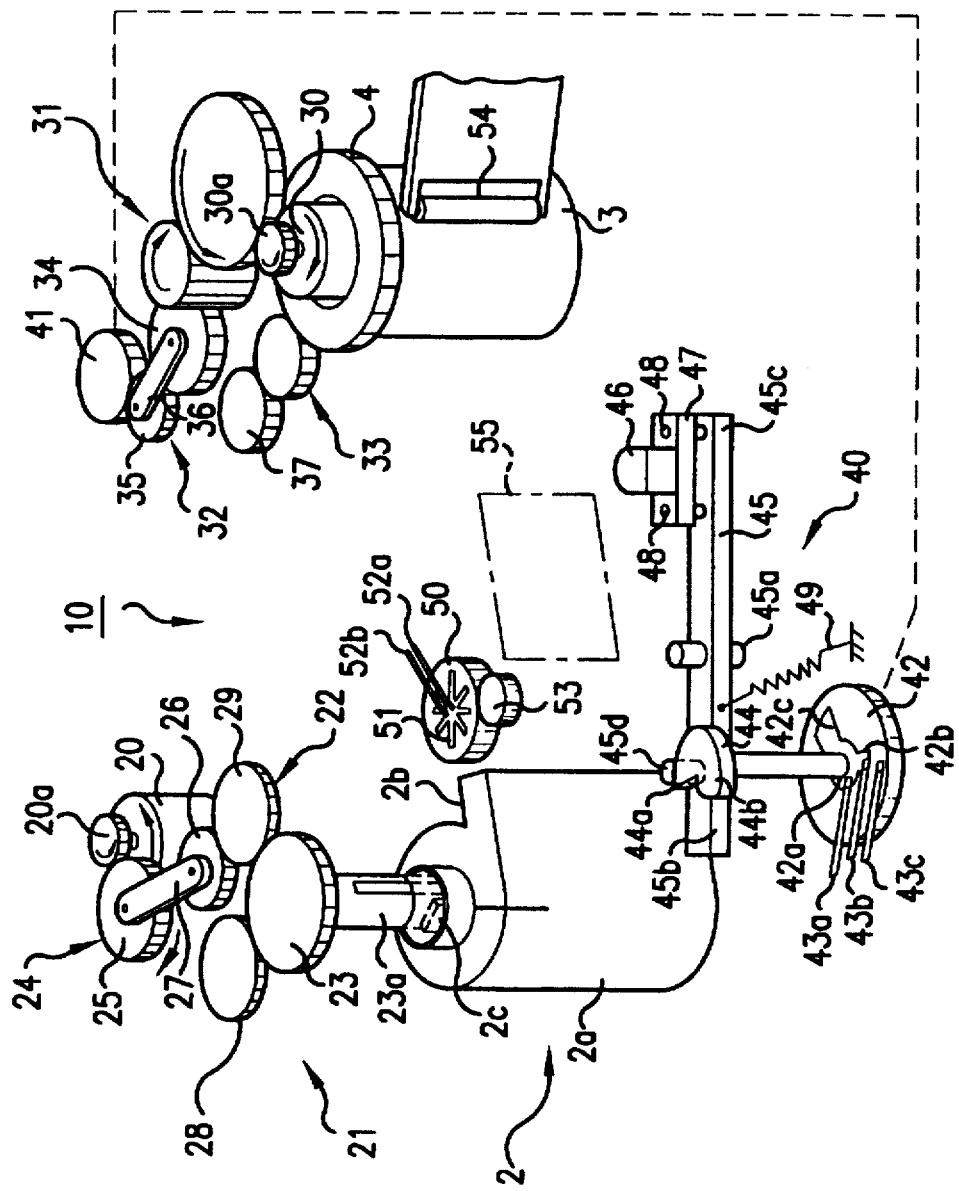
FIG. 8 is a drawing showing another state of the driving mechanism.

When film photography is completed and the film 1 has been rewound into the cartridge 2, the planetary gear 35 of the planetary gear mechanism 32 is enmeshed with gear 41 as shown in FIG. 8. When the supply film 1 is complete the winding spool 3 must immediately be driven in the winding direction. The film winding operation must be completed by taking up the film 1 around the winding spool 3. By having the planetary gear 35 enmesh with the gear 37 before the start of the film supply operation, the film operations of supplying, and winding can be performed smoothly.

Figure 12:
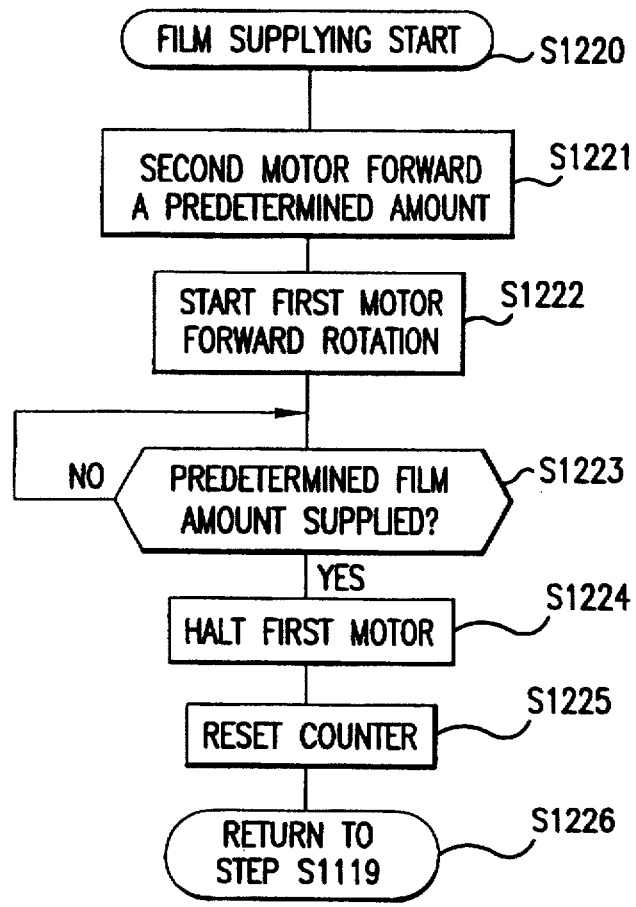
FIG. 12 is a flowchart showing the film supplying operation for a normal winding method.

As shown in FIG. 12, the film supplying operation starts in step S1220. In step S1221, the second motor 30 is driven with forward rotation for a predetermined period of time. Thus, the planetary lever 36 of the planetary gear mechanism 32 is driven by the second motor 30 in the direction of the gear 37 and the planetary gear 35 enmeshes with the gear 37. The predetermined period of time can be varied but must be sufficient to switch the mesh of the planetary gear mechanism 32.

Then in step S1222, the forward rotation of the first motor 20 starts. The planetary lever 27 of the planetary gear mechanism 24 moves towards gear 28 side as shown in FIG. 1. The planetary gear 26 then enmeshes with the gear 28. Thus, the film driving gear 23 is driven by the first motor in the film supply direction and the film 1 is supplied from the cartridge 2.

Step S1223 determines whether a predetermined amount of the film 1 has been supplied using the counter 901. The predetermined film amount is preferably the amount needed for the leader portion 1 to reach the winding spool 3. When the leader portion reaches the winding spool 3, step S1224 halts the first motor 20. The program then continues to step S1225 where the counter 901 is reset. In step S1226, operation returns to step S1119 shown in FIG. 11.

Figure 13:
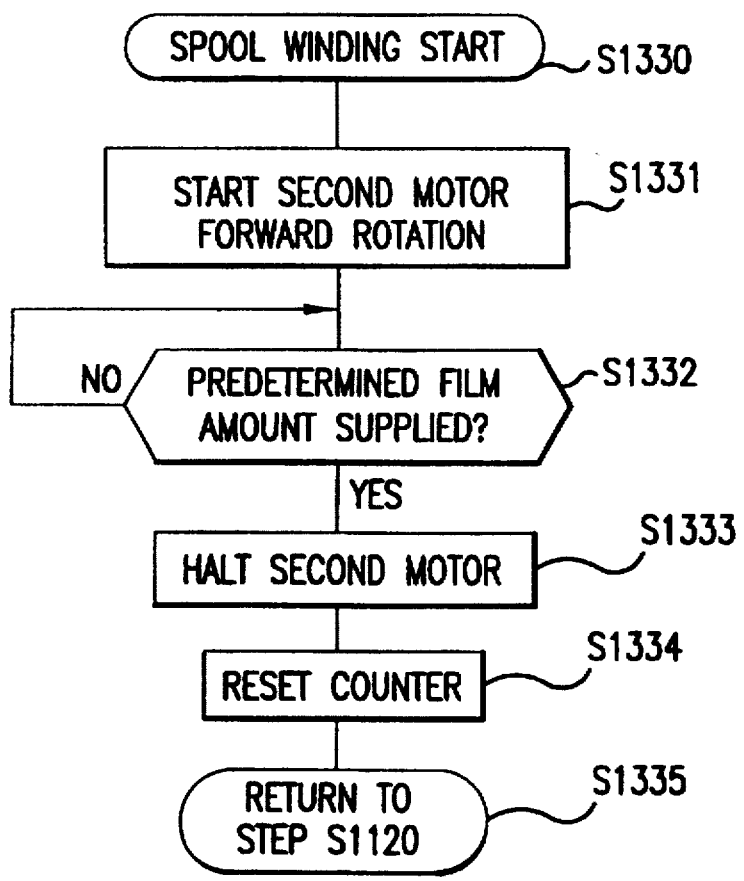
FIG. 13 is a flowchart showing the spool winding operation for a normal winding method.

In step S1119, spool winding operation is performed. FIG. 13 shows the spool winding operation. In step S1331, because the planetary gear 35 is enmeshed with planetary gear mechanism 32, the gear 4 is driven in the film winding direction as the second motor 30 rotates forward. The gear 28 is driven through the cartridge spool (not shown) and the gear 23 corresponding to the film winding operation of the second motor 30. However, because the first motor 20 is halted, the gear 28 and the planetary gear 26 are not enmeshed as shown in FIG. 3. Therefore, the first motor 20 does not become a load on the second motor 30 during the film winding operation.

Step S1332 determines whether a predetermined amount of the film 1 has been wound onto the winding spool 3 using the counter 901. If the predetermined amount has been wound, operation continues to step S1333 where the second motor 30 is halted. The predetermined amount is the amount necessary for the first frame of the film 1 to be wound to a photo position opposite the aperture 55. When the first frame of the film 1 is at a predetermined photograph position, step S1334 resets the counter 901. The autoloading operation is complete as shown in FIG. 3. In step S1335, operation returns to step S1120 in FIG. 11. Step S1120 returns operation to step S1005 in FIG. 10.

When autoloading of the film 1 has been completed and the first frame is located in the photography position, a photography frame number N is set to 1 in step S1005 of FIG. 10. In step S1006, the object brightness, film sensitivity and the like are detected by the exposure calculation parameter detecting device 906. An exposure computation is made based on these exposure calculation parameters, and the aperture stop and exposure time (shutter speed) are determined. Further, various photography information is recorded on the magnetic recording section of the photography frame of the film 1.

Step S1007 determines whether a release button (not shown) has been depressed using the switch SW3. When the release button has been depressed, operation proceeds to step S1008. If the release button has not been depressed, operation returns to step S1006. At step S1008, the exposure control device 907 performs an exposure of the photography frame with the computed aperture stop and shutter speed. When the photograph is complete, step S1009 performs the film frame supply operation as discussed with respect to FIG. 14.

The film frame supply operation starts in step S1440. Step S1441 starts reverse rotation of the second motor 30. The enmeshing of the planetary gear mechanism 32 changes and the planetary gear 35 enmeshes with the gear 41 to advance the magnetic head 46 by rotating the cam 44 through the gear 42 as shown in FIG. 4. Step S1442 determines whether the magnetic head 46 is pressed against the film 1 using the switch SW5, thus allowing recording. When the pin 45d of the support lever 45 contacts the side 44b of the cam 44 under the rotation of the cam 44, the magnetic head 46 is pressed against the magnetic recording section of the film 1 under the force of the spring 49. If magnetic recording is possible, the second motor 30 is halted in step S1443.

Step S1444 starts a timer to verify whether the supply of one film frame is completed within a predetermined length of time. Step S1445 starts forward rotation of the second motor 30 to wind one film frame (supply of one frame) and move the next photography frame of the film 1 to the photography position. At this time, the cartridge spool (not shown) rotates with the winding of the film 1. The gear 28 also rotates through gear 23. However, because the planetary gear 26 does not enmesh with the gear 28 during winding, the first motor 20 does not become a load on the second motor 30.

Step S1446 determines whether the film 1 has been supplied to a position where magnetic recording should be started based on the supply amount detected by the counter 901. When the magnetic recording start position is reached, various recording information is output to the magnetic head driving circuit 908 and recorded on the magnetic recording section of the film 1 using the magnetic head 46 in step S1447. The magnetic recording is preferably completed slightly before frame supplying completion.

Step S1448 determines whether supplying of one frame of film has been completed based on the supply amount detected by the counter 901. When frame supplying has been completed, operation continues to step S1449. When frame supplying has not been completed, step S1450 determines whether the elapsed time exceeds the predetermined time length using the timer. When the predetermined time length is exceeded, step S1451 resets a flag F to 0. When the predetermined time length is not exceeded, operation returns to step S1448. The flag F indicates whether one frame was supplied within the predetermined time length. When one frame has been supplied within the predetermined time length, step S1449 sets the flag F to 1. Step S1452 halts the second motor 30. Step S1453 halts the timer and step S1454 resets the counter 901.

After film frame supplying, step S1455 starts reverse rotation of the second motor 30. The mesh of the planetary gear mechanism 32 is changed and reverse rotation of the second motor 30 transfers from the planetary gear 35 to the gear 41. Thus, the cam 44 rotates to start withdrawing the magnetic head 46. Step S1456 determines whether the magnetic head 46 has been withdrawn from the film 1 using the switch SW4. When the pin 45d of the support lever 45 contacts with the side 44a of the cam 44 under the cam 44 rotation, the magnetic head 46 has been completely withdrawn from the film 1 and the switch SW4 turns on. Then in step S1457, the second motor 30 is halted. Step S1458 returns the program to step S1010 in FIG. 10.

Step S1010 determines whether the flag F has been reset to 0. When the flag F is reset to 0, the film 1 has been wound to the terminal end. Further, operation continues to step S1013 to rewind the film 1 into the cartridge 2.

When the flag F has been set to 1, supplying one frame of film was completed within the predetermined time length. Thus, operation continues to step S1011 where the photography frame number N is incremented. Step S1012 determines whether the frame is the final frame. The final frame photograph is completed when the photography frame number N is larger than the film frame number detected by the film frame number detection device 905. Then, operation continues to step S1013 to rewind the film 1 into the cartridge 2. If the final film frame was not detected in step S1012, operation returns to step S1006 to take a photograph with the next photography film frame.

Figure 15:
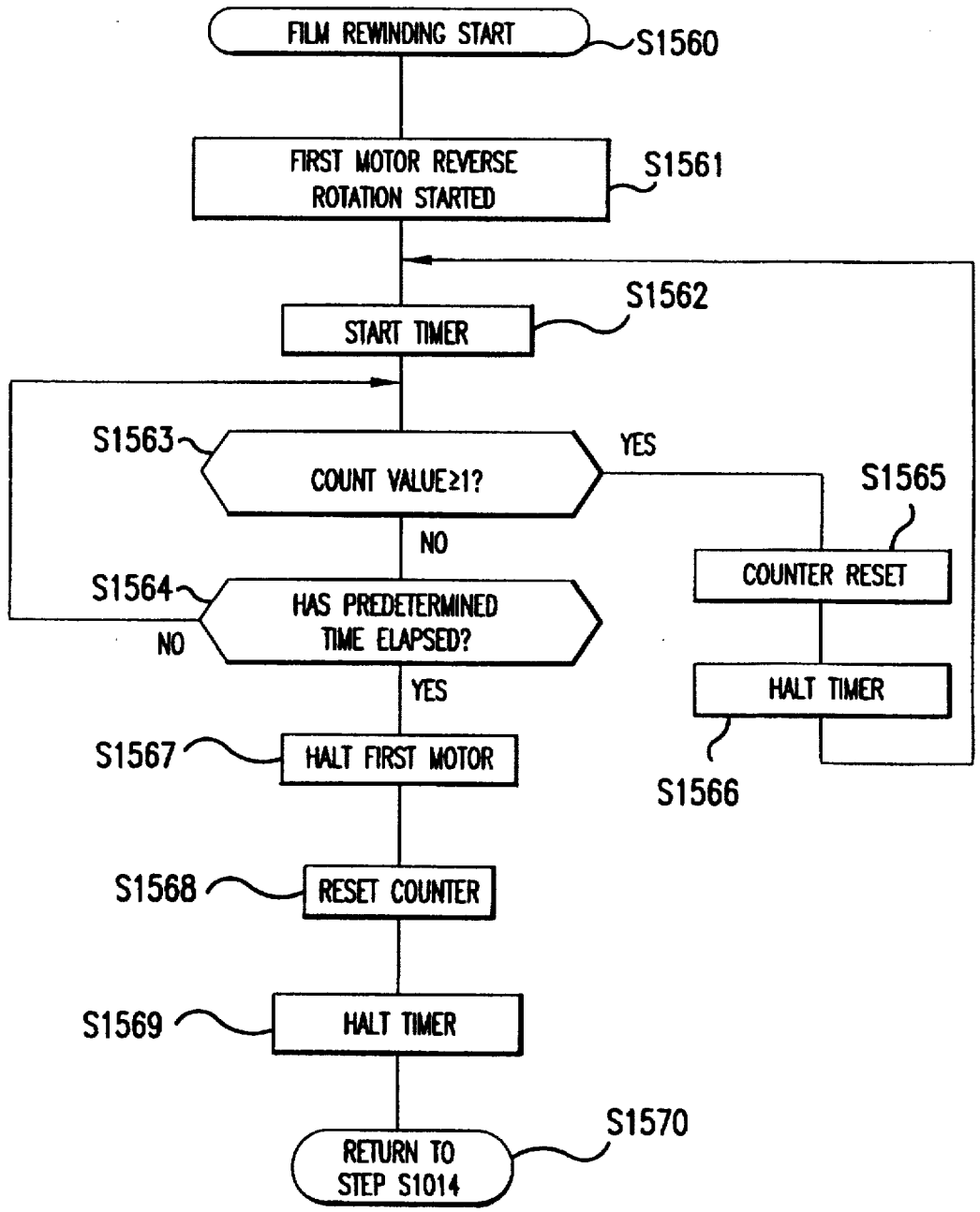
FIG. 15 is a flowchart showing the film rewinding operation for a normal winding method.

Step S1013 performs the film rewinding operation as described with respect to FIG. 15. Film rewinding starts in step S1560. Step S1561 starts the first motor 20 reverse rotation and the planetary gear 26 enmeshes with the gear 29 as shown in FIG. 7. Further, the first motor 20 reverse rotation transfers to the gear 23 causing the cartridge spool to rotate in the rewinding direction. Thus, the film 1 starts rewinding. During rewinding, the planetary gear 35 of the planetary gear mechanism 32 enmeshes with the gear 41. Therefore, the second motor 30 does not become a load on the first motor 20.

Step S1562 starts the timer. Step S1563 determines whether the count value of the counter 901 is 1 or greater. When the count value on the counter 901 is 1 or greater in step S1563, operation continues to step S1565 where the counter is reset. In step S1566, the timer is halted and operation returns to step S1562.

When the count value is not 1 or greater, step S1564 determines whether the timer has exceeded a predetermined time length. When the predetermined time length has elapsed, operation continues to step S1567. If the predetermined time length has not elapsed, operation returns to step S1563. In step S1567, the first motor 20 is halted. Step S1568 resets the counter 901. Step S1569 halts timing with the timer. Thus, the rewinding operation rewinds the film 1 into the cartridge 2. Then, in step S1570, operation returns to step S1014 in FIG. 10.

Step S1014 determines whether the cartridge chamber cover was opened using the switch SW1. When the cover has been opened, step S1015 determines whether the film cartridge 2 has been removed using the switch SW2. If the cartridge cover is not opened in step S1014 or the cartridge is not removed in step S1015, operation returns to step S1014. When the cartridge 2 has been removed from the cartridge chamber in step S1015, operation returns to step S1001 and the above-described processes can be repeated.

For a camera of normal winding method, film is supplied by driving the cartridge spool through forward rotation. Film rewinding is performed by driving the cartridge spool through reverse driving. Further, pressing and withdrawing the magnetic head 46 is performed by reverse driving. Power transfer mechanisms, including planetary gear mechanisms, are used and configured so that one motor does not become a load on the other motor during driving. Therefore, advancing and withdrawing of the magnetic head 46 in addition to film supply is performed using two film supply motors. Thus, a special motor for advancement and withdrawal of the magnetic head 46 is unnecessary and the cost of the camera is reduced. Further, the size of the camera can be reduced.

The above described embodiment and method were applied to a camera using the normal winding method. The present invention is also applicable to a camera utilizing a prewinding method where all of the film is wound at one time from the cartridge 2 to the winding spool 3 of the camera before photography. Then, a portion of the film rewinds into the cartridge with each photograph.

The composition and driving mechanism of a prewinding method camera are substantially identical to the normal winding method camera as shown in FIG. 8. The prewinding camera driving mechanism is substantially identical to the driving mechanism 10 of the normal winding method shown in FIGS. 1-7. The exception is the magnetic head 46 positioning moves from the position contacting the area labelled X (normal winding) to a position contacting the area labelled Y (prewinding) as shown in FIG. 1.

Figure 16:
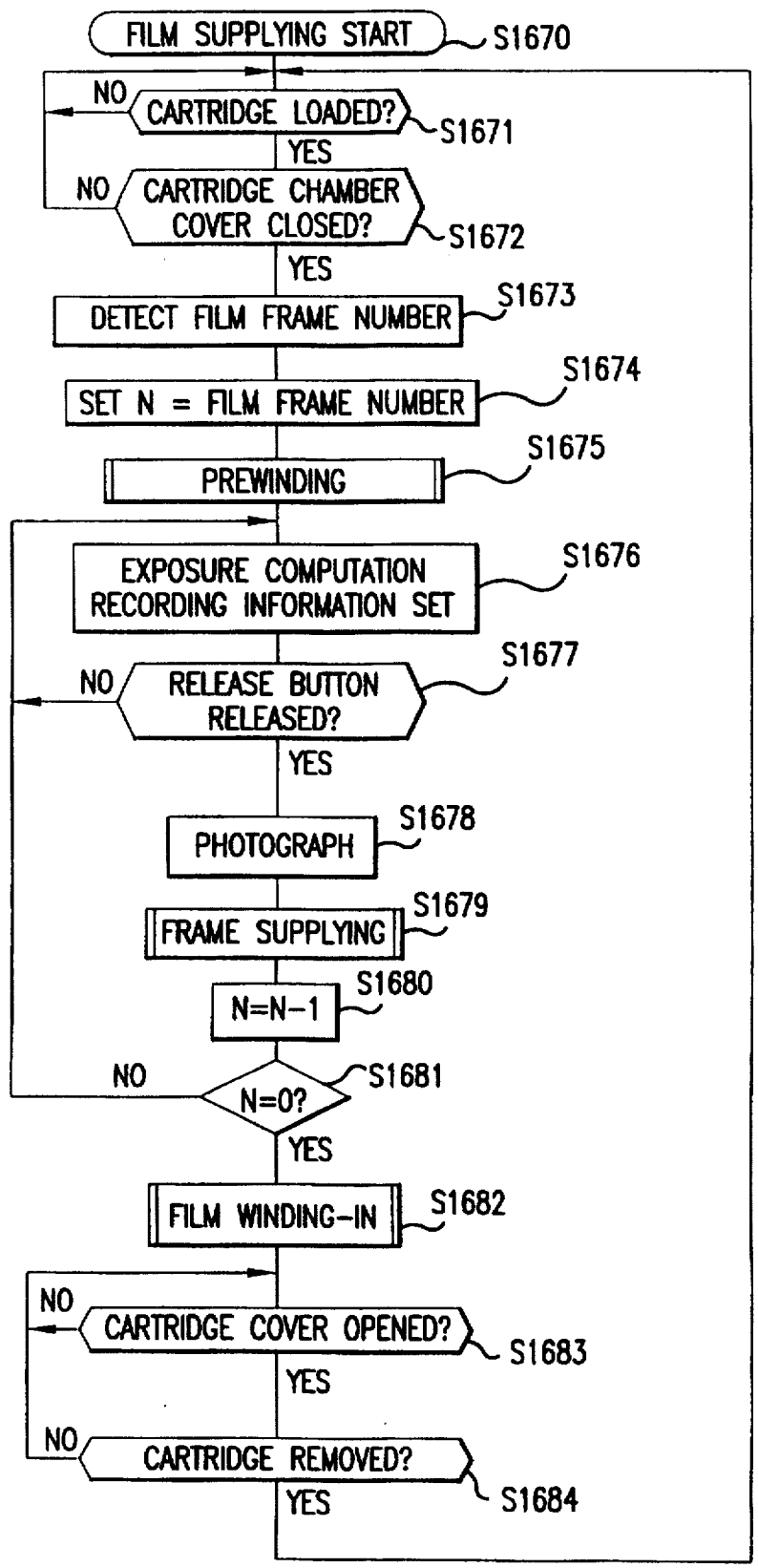
FIG. 16 is a flowchart showing the operation for a prewinding method.

FIGS. 16-19 are flowcharts showing the operation of a prewinding method. As shown in FIG. 16, the control circuit 900 starts the film supplying operations in step S1670 when an camera battery (not shown) is charged. Step S1671 determines whether a film cartridge 2 is loaded in the cartridge chamber using the switch SW2. When the film cartridge 2 has been loaded, step S1672 determines whether the cartridge chamber cover has been closed using the switch SW1. When the cartridge is not loaded in step S1671 or the cartridge cover is not closed in step S1672, operation returns to step S1671. When the cover of the cartridge chamber has been closed, step S1673 detects the number of film frames using the film frame number detection device 905. The number of film frames is stored as the photography frame number N in step S1674.

For a normal winding camera, the film 1 is rewound into the cartridge 2 after shooting the entire film 1. The planetary gear 35 of the planetary gear mechanism 32 is enmeshed with the gear 41. After completion of film supplying operation, the second motor 30 is rotated forward immediately to drive the winding spool in the winding direction and film winding operation is performed by taking up the film 1 around the winding spool 3.

For a prewinding camera, the planetary gear 35 of the planetary gear mechanism 32 enmeshes with the gear 37 before starting the operation to supply the film 1. Therefore, the prewinding camera operations of supplying and winding the film 1 are performed smoothly.

Figure 17:
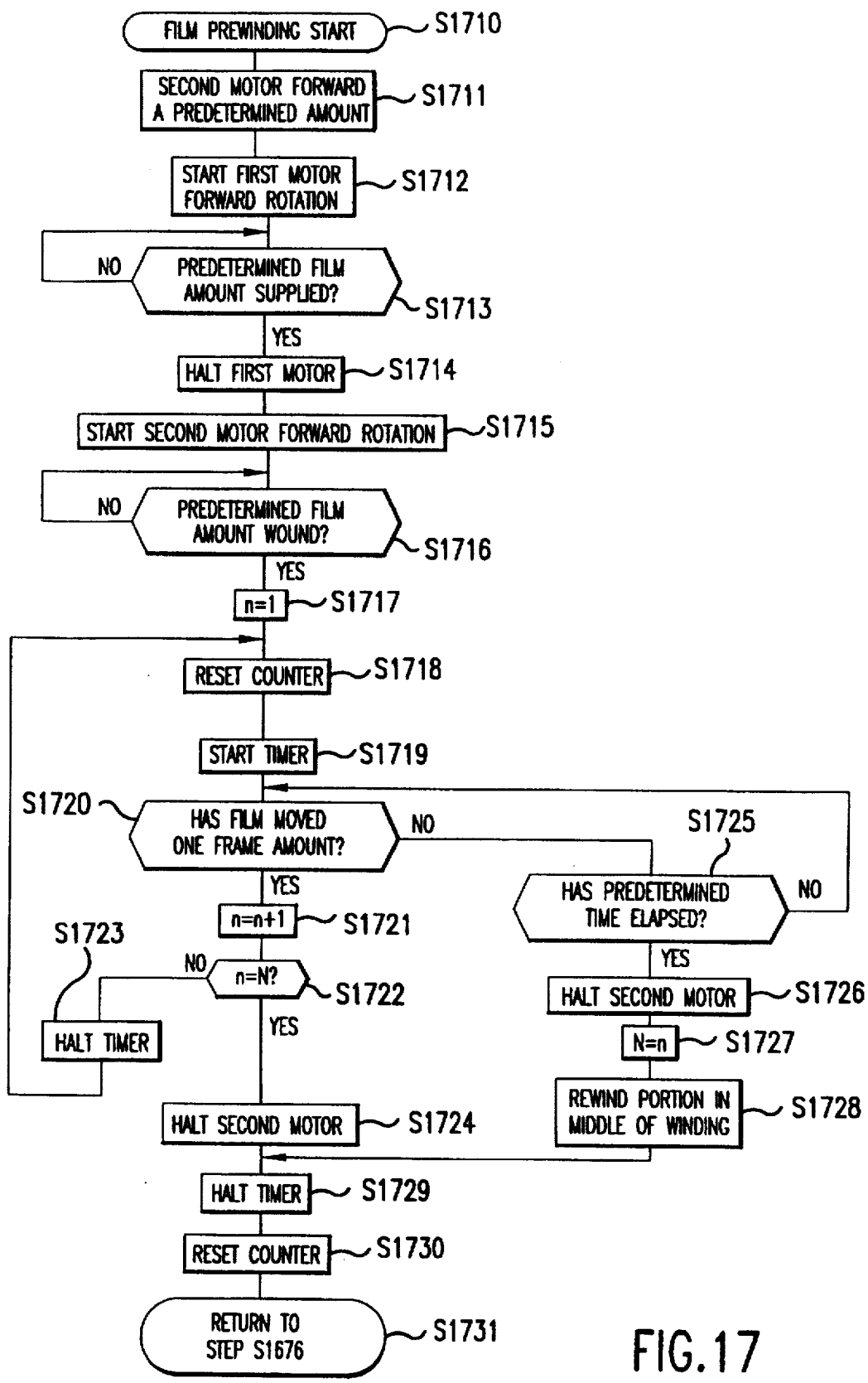
FIG. 17 is a flowchart showing the prewinding operation for a prewinding method.

Step S1675 performs the film prewinding operation. As shown in FIG. 17, film prewinding starts in step S1710. Step S1711 starts rotating the second motor forward for a predetermined period of time to thereby enmesh the planetary gear 35 with the gear 37. Step S1712 starts forward rotation of the first motor 20. The planetary lever 27 of the planetary gear mechanism 24 is moved to the side of the gear 28 as shown in FIG. 1. The planetary gear 26 enmeshes with the gear 28. The first motor 20 drives the cartridge driving gear 23 in the film supplying direction and the film 1 is supplied from the cartridge 2.

Step 1713 determines whether a predetermined amount of film 1 has been supplied using the counter 901. The predetermined film amount is the amount needed for the leader portion of the film 1 to reach the winding spool 3 as shown in FIG. 2. When the leader portion of the film 1 reaches the winding spool 3, step S1714 halts the first motor 20. Otherwise, operation returns to step S1713. The second motor forward rotation 30 is started in the step S1715. Because the planetary gear 35 of planetary gear mechanism 32 is already enmeshed to the gear 37 of the winding side, the film 1 is taken up around the winding spool 3.

Step S1716 determines whether the film has been wound to a position where the first film frame of the film 1 is located at the photograph position based on the supply amount detected by the counter 901. When the first film frame reaches the photograph position, operation continues to step S1717 where the winding frame number n is set to 1. The winding frame number n is the frame number wound around the camera side during prewinding.

Step S1718 resets the counter 901. In step S1719, the timer is started. The timer verifies whether one frame of the film 1 can be wound within a predetermined time length. Step S1720 determines whether winding one frame of the film 1 has been completed based on the supply amount detected film supply amount. If one frame is not wound, operation continues to step S1725. If one frame of film is wound, the winding frame number is incremented in step S1721. Step S1722 determines whether the winding frame number n equals the film frame number N. When the winding frame number n reaches the film frame number N, the film has been wound to the final frame. Step S1724 halts the second motor 30 and step S1729 halts the timer. Step 1730 resets the counter and the prewinding operation is completed.

When winding has not reached the final frame in step S1722, the timer is halted in step S1723 and operation returns to step S1718. When step S1720 determines one frame is not completely wound, step S1725 determines whether the time measured on the timer exceeds a predetermined time length. When the predetermined time length has elapsed, operation continues to step S1726. Otherwise, operation returns to step S1720. If one frame winding does not complete within the predetermined time length, the film 1 has been wound to the terminal end. Step S1726 then halts the second motor 30. Step S1727 sets the film frame number N to the winding frame number n because the film frame number actually wound is n frames. Further, because the prewinding operation was halted, step S1728 rewinds using the second motor 30 reverse rotation so the nth frame is opposite the aperture 55. Timing with the timer is halted in step S1729. The counter 901 is reset in step S1730 and the prewinding operation is complete. Then, in step S1731, operation returns to step S1676 in FIG. 16.

Step S1676 detects the object brightness, film sensitivity and the like using the exposure calculation parameter detecting device 906. An exposure computation is performed based on the exposure parameters and the aperture stop and exposure time (shutter speed) are computed. Further, the required information is recorded on the magnetic recording section of the film 1. Step S1677 determines whether a release button has been depressed and released using the switch SW3. When the button has been released, operation continues to step S1678. Otherwise, operation returns to step S1676. In step S1678, the photograph is taken controlled by the exposure control device 907 using the computed aperture stop and shutter speed. After the photograph, step S1679 performs the frame supplying operation.

A normal winding camera supplies one frame of film following a photograph by winding the film 1 around the camera side winding spool 3. In contrast, a prewinding camera supplies one frame following a photograph by rewinding the film 1 into the cartridge 2. Accordingly, the prewinding camera uses the first motor 20 reverse rotation to supply one frame following photography.

Figure 18:
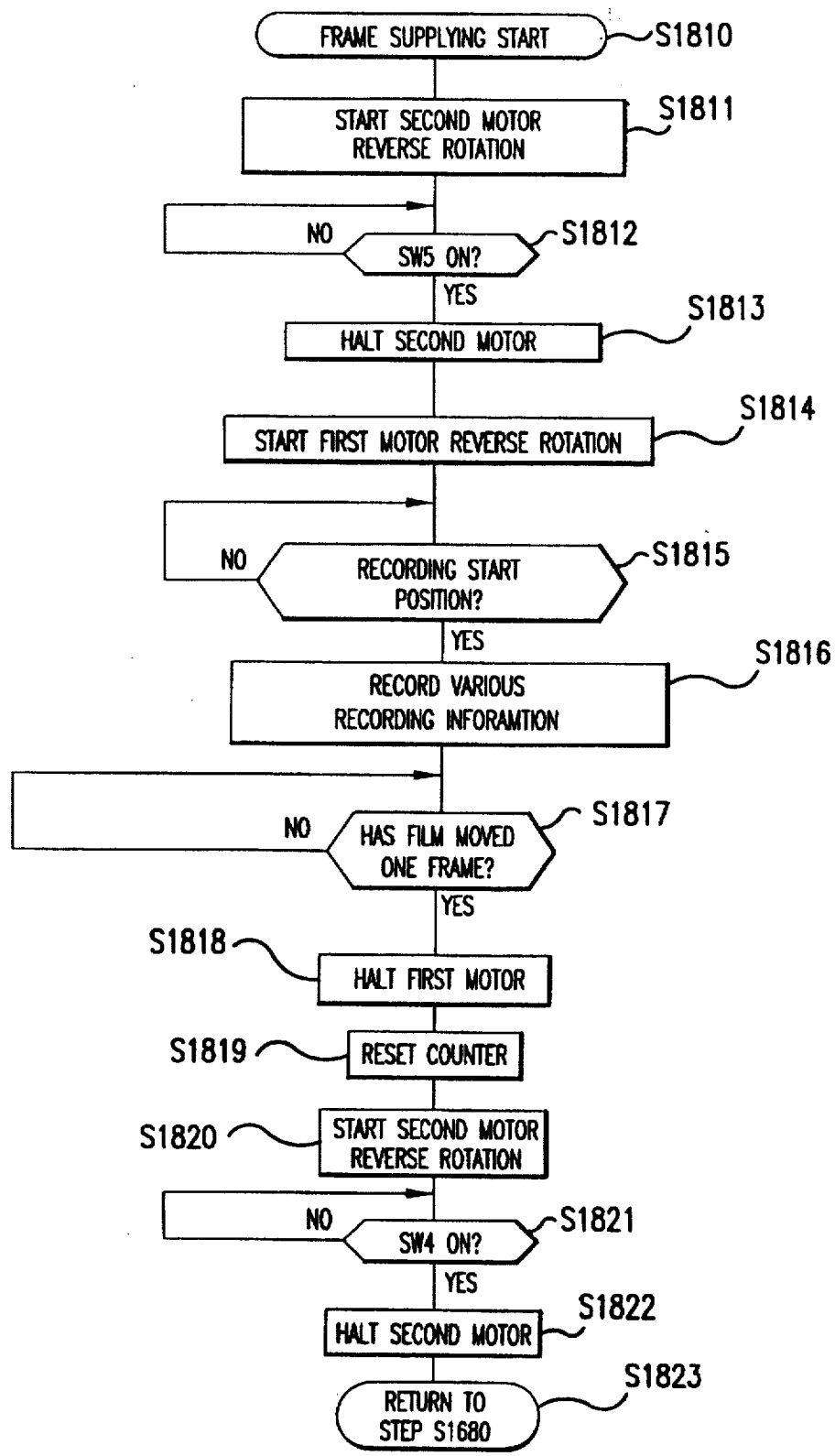
FIG. 18 is a flowchart showing the frame supplying operation for a prewinding method.

As shown in FIG. 18, frame supplying starts in step S1810. Step S1811 starts reverse rotation of the second motor 30 before the one frame is supplied following a photograph to press the magnetic head 46 against the film 1. Step S1812 determines whether the magnetic head 46 is pressed against the film using the switch SW5. If the magnetic head is not pressed against the film 1, operation repeats step S1812. Otherwise, step S1813 halts the second motor 30.

Step S1814 starts frame advancement (film rewind) by starting the first motor 20 reverse rotation. Step S1815 determines whether the film 1 being frame-advanced has reached the position where magnetic recording should be performed based on the film supply amount detected by the counter 901. If the film 1 has not reached the magnetic recording position, step S1815 is repeated. Otherwise, step S1816 outputs various recording information to the magnetic head driving circuit 908 for recording on the magnetic recording section of the film 1. The magnetic head 46 performs magnetic recording in the area corresponding to each shooting frame of the magnetic recording unit of the film 1 (i.e., the area labelled Y as shown in FIG. 1). Recording information needs to be reversed because of opposite travel directions in a prewinding camera as compared to a normal winding camera.

Step S1817 determines whether the supplying of one frame has been completed based on the film supply amount detected by the counter 901. When one frame was supplied, operation continues to step S1818 where the first motor 20 is halted. Otherwise, step S1817 is repeated. The counter 101 is reset in step S1819.

Step S1820 starts the second motor 30 reverse rotation again to start withdrawing the magnetic head 46. Step S1821 determines whether the magnetic head 46 is withdrawn using the switch SW4. If the magnetic head 46 is not withdrawn, step S1821 is repeated. Otherwise, the second motor 30 is halted in step S1822. The frame supplying operation is completed and in step S1823 operation returns to step S1680 of FIG. 16.

After one frame has been supplied following the taking of a photograph, the photography frame number N is decremented in step S1680. Step S1681 determines whether the photography frame number N is 0. In other words, whether the final frame photograph has been completed. When photography of the final frame has not been completed, operation returns to step S1676 to perform the photography operation for the next photography frame.

When photography of the final frame has been completed, step S1682 performs the film winding-in operation.

The film winding-in operation is the operation of rewinding the film 1 into the cartridge 2, and is referred to as "winding-in" to distinguish the "rewinding" of the normal winding camera.

Figure 19:
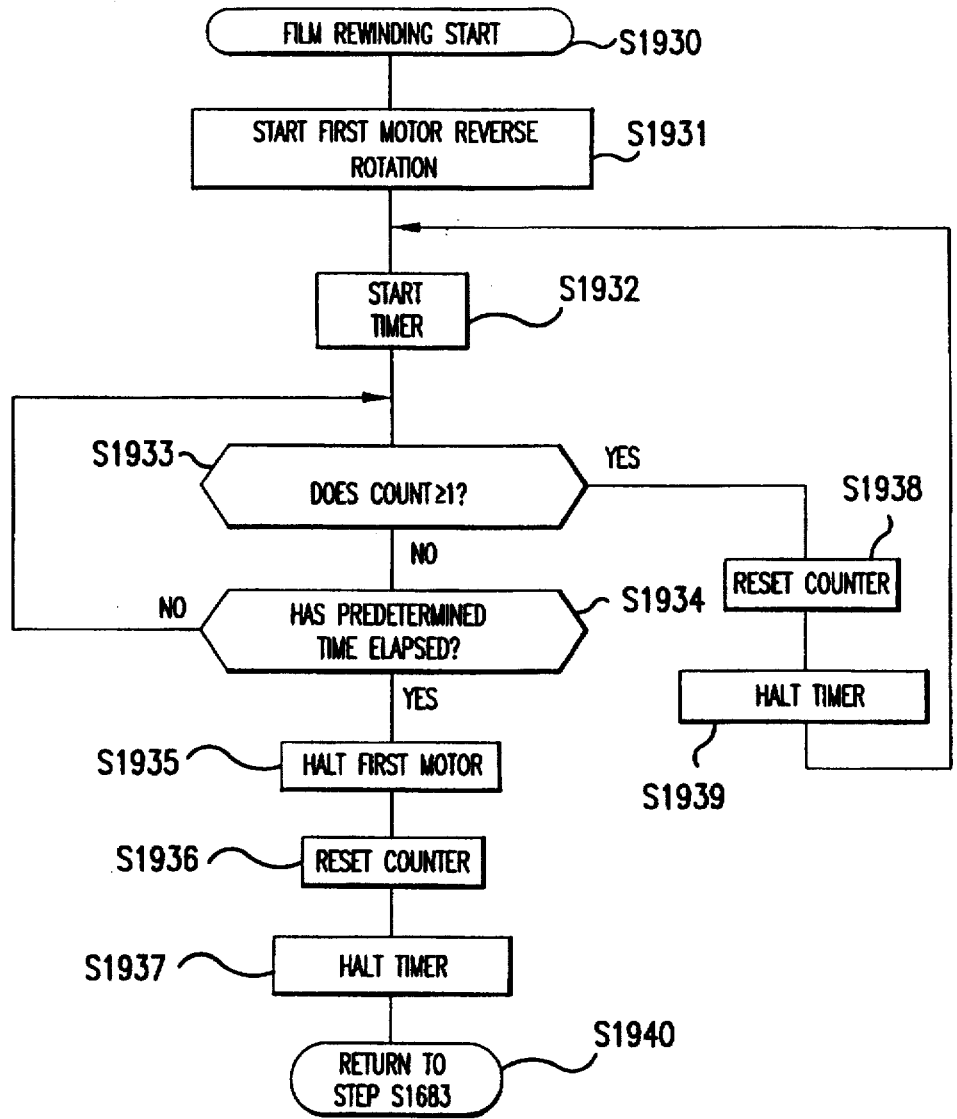
FIG. 19 is a flowchart showing the film winding-in operation for a prewinding method.

As shown in FIG. 19, film winding-in starts in step S1930. Step S1931 starts first motor 20 reverse rotation to begin the winding-in of the film 1 into the cartridge 2. A prewinding camera rotates the first motor 20 in the reverse direction to supply the next frame after a photograph is taken. Thus, the planetary gear 26 of the planetary gear mechanism 24 is already enmeshed with the gear 29. Further, the planetary gear 35 of the planetary gear mechanism 32 is enmeshed with the gear 41 so the second motor 30 does not become a load on the first motor 20 during the winding-in.

Step S1932 starts timing with a timer. Step S1933 determines whether the count value on the counter 901 is 1 or greater. When the count value is 1 or greater, operation continues to step S1938 where the counter is reset. Then step S1939 halts the timer and operation returns to step S1932. On the other hand, when step S1933 determines the count value is not 1 or greater, step S1934 determines whether the time measured by the timer exceeds a predetermined time length. If the predetermined time length has elapsed, operation continues to step S1935. Otherwise, operation returns to step S1933. Step S1935 halts the first motor 20. Step S1936 resets the counter 901. Step S1937 halts timing with the timer. When the winding-in operation is complete, the film 1 is wound into the cartridge 2. Step S1940 returns to step S1683 of FIG. 16.

Step S1683 determines whether the cartridge chamber cover was opened using the switch SW1. When the cover has been opened, step S1684 determines whether the film cartridge 2 has been removed using the switch SW2. If the cartridge cover is not opened in step S1683 or the cartridge is not removed in step S1684, operation returns to step S1683. After the cartridge 2 has been removed from the cartridge chamber, operation returns to step S1671 and the above-described processes can be repeated.

For a prewinding camera, film is supplied by driving the cartridge spool through forward rotation of the first motor 20. The operations needed to rewind film are performed by driving the cartridge spool through reverse driving. Further, pressing and withdrawing the magnetic head 46 is performed by reverse driving. Power transfer mechanisms, including planetary gear mechanisms, are used and configured so that one motor does not become a load on the other motor during driving. Therefore, advancing/withdrawing of the magnetic head 46 and film supply is performed using two film supply motors. A special motor for advancement and withdrawal of the magnetic head 46 is unnecessary. The cost of the camera is reduced and the camera can be made smaller.

The following is a description for a variation on film supplying in a prewinding camera.

As shown in FIG. 18, frame supplying rotates the second motor 30 in reverse until the magnetic head 46 is pressed against the film 1. Then, the second motor 30 is halted. The first motor 20 is driven forward so that supplying of one frame of the film 1 is started. A variation of frame supplying will now be described with reference to the first preferred embodiment where the magnetic head 46 is advanced and withdrawn during the supplying of one frame of the film 1 by overlapping the driving of the first motor 20 and the second motor 30.

Figure 20:
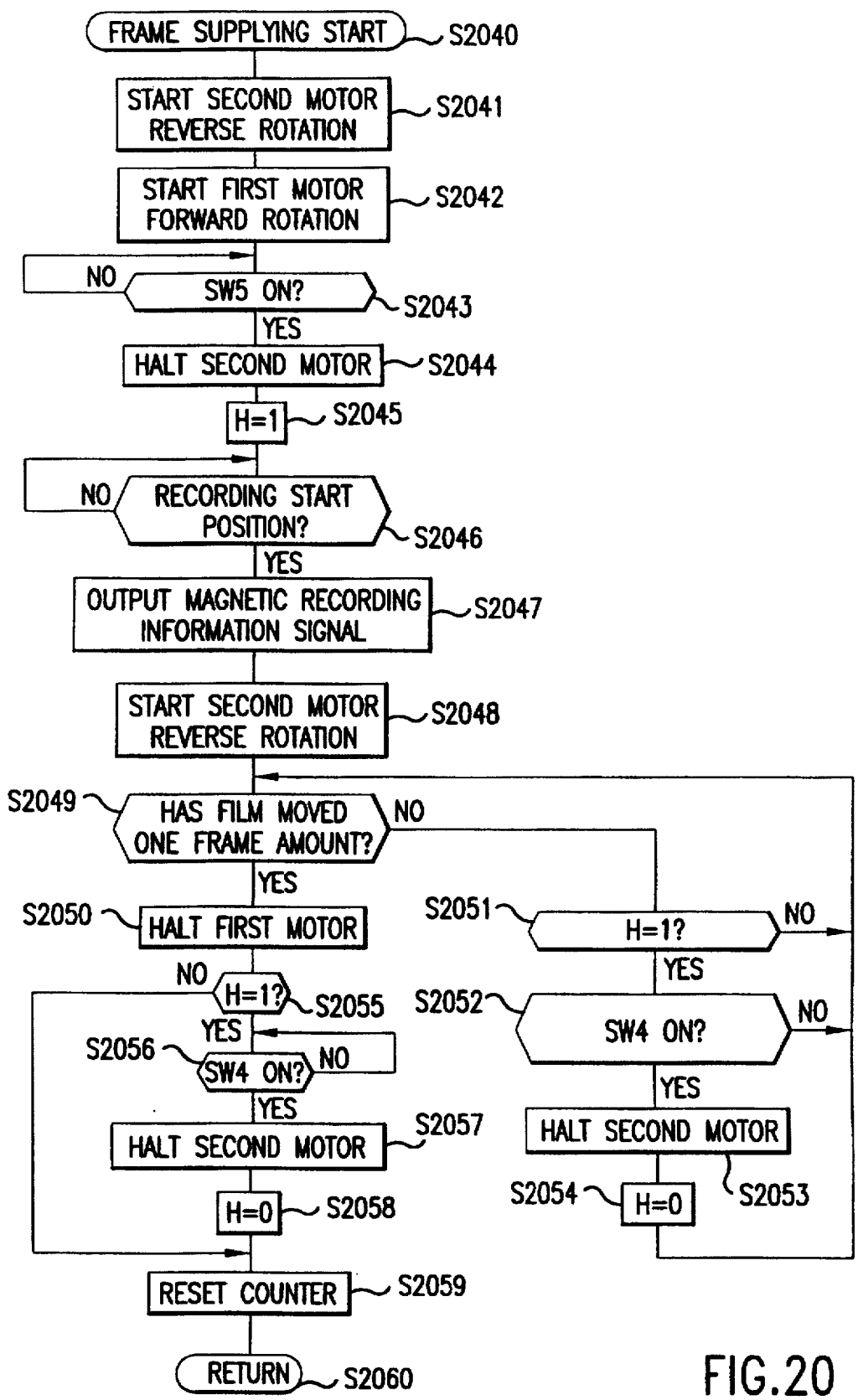
FIG. 20 is a flowchart showing a variation of the frame supplying operation for a prewinding method.

FIG. 20 is a flowchart showing a variation of the frame supplying operation. The frame supplying operation starts in step S2040. When reverse rotation of the second motor 30 is started in step S2041, the enmeshing of the planetary gear mechanism 32 changes so the planetary gear 35 enmeshes with the gear 41 as shown in FIG. 4. The magnetic head 46 starts advancing through rotation of the cam 44 by the gear 42. In step S2042, during the pressing operation of the magnetic head, rewinding of the film 1 is performed by starting first motor 20 reverse rotation. Step S2043 determines whether the magnetic head 46 is pressed against the film 1 using the switch SW5 so magnetic recording is possible. If magnetic recording is possible, step S2044 halts the second motor 30; otherwise step S2043 is repeated. The magnetic head 46 is pressed against the film 1 before the magnetic recording position.

In step S2045, the flag H is set to 1. The flag H is set to 1 when the magnetic head 46 is in a pressing state, and is reset to 0 when the magnetic head 46 is in a withdrawn state. Step S2046, determines whether the film 1 has been supplied to the magnetic recording start position based on the supply amount detected by the counter 901. When the magnetic recording start position has been reached, step S2047 outputs various recording information determined beforehand to the magnetic head driving circuit 908 for recording on the magnetic recording section of the film 1. The magnetic recording completes slightly before the frame supply is completed.

When magnetic recording has been completed, the second motor 30 reverse rotation is started again in step S2048. Because the planetary gear 35 of the planetary gear mechanism 32 is already enmeshed with the gear 41, the cam 44 forward rotation starts withdrawing the magnetic head 46. Step S2049 determines whether one film frame has been supplied based on the counter 901. When one frame has been supplied and the next frame is located in the photography position, operation continues to step S2050. Otherwise, operation continues to step S2051.

When one frame has been supplied, the first motor 20 is halted in step S2050. Then, step S2055 determines whether the flag H is set to 1. When the magnetic head is set to 1 (pressing state), step S2056 determines whether the magnetic head 46 has been withdrawn from the film 1 using the switch SW4. When the magnetic head 46 is withdrawn, step S2057 halts the second motor 30. The flag H is reset to 0 in step S2058. Step S2059 resets the counter 901 and the frame supplying operation is completed. In step S2060, operation returns to the step following the calling step.

On the other hand, when step S2049 determines one frame has not been supplied, step S2051 determines whether the flag H has been set to 1. If the magnetic head is in the pressing state (H=1), operation continues to step S2052. Otherwise, operation returns to step S2049. Step S2052 determines whether the magnetic head 46 has been withdrawn from the film 1 using the switch SW4. When the magnetic head 46 is withdrawn, operation continues to step S2053. Otherwise, operation returns to step S2049. Step S2053 halts the second motor 30. Step S2054 resets the flag H to 0, and operation returns to step S2049.

In this way, this embodiment performs the advancing/withdrawing of the magnetic head and the frame supplying to overlap, and thereby improving camera speed. First, to supply one frame of the film 1 after a photograph, the second motor 30 reverse rotates to start pressing the magnetic head 46 against the film 1. During the pressing operation, forward rotation of the first motor 20 forward rotates to start supplying one frame of the film 1. Reverse rotation of the second motor 30 starts to withdraw the magnetic head 46 from the film 1 during the one frame film supply operation.

When the first motor 20 and the second motor 30 are halted, a braking process such as a short brake or the like is preferably included.

In the first embodiment, the magnetic recording preparation device includes the gear 42, the cam 44 and the support lever 45. The first power transfer device includes the pinion gear 20a, the planetary gear mechanism 24 and the gears 23, 28 and 29. The second power transfer device includes the pinion gear 30a, the gear trains 31 and 33, the planetary gear mechanism 32 and the gear 4.

Film is supplied from the cartridge by driving the first motor in a first direction. Film on the camera side is rewound by driving the first motor in a second direction opposite from the first direction. Film winding to the camera side is performed by driving the second motor in a third direction. Film rewinding into the cartridge is performed by driving the second motor in a fourth direction different from the third direction. In addition, magnetic recording preparatory operations are performed using the two film supply motors so that a special motor for performing magnetic recording preparatory operations is unnecessary. Therefore, the camera cost is reduced and the camera can be made smaller.

FIGS. 21–27 show the drive mechanisms of a second preferred embodiment. An explanation of the second preferred embodiment is omitted where the composition of the second preferred embodiment corresponds to the first preferred embodiment (components labelled 1–55).

The second preferred embodiment advances and withdraws the magnetic head 46 by rotating the first motor 20 in a second direction opposite the first direction (forward rotation). Hereafter, rotation of the first motor 20 in the second direction (i.e., the direction causing the advancement and withdrawal of the magnetic head 46) will be called reverse rotation. On the other hand, winding spool 3 is driven and film 1 is wound by the second motor 30 rotating in a third direction. Hereafter, rotation of the second motor 30 in the third direction (i.e, the direction of film winding) will be called forward rotation. The cartridge spool driven by the second motor 30 rotating in a fourth direction rewinds the film 1 into the cartridge 2.

The operations dependent on the rotation direction of the first motor 20 and the second motor 30 are set forth in Table 2.

TABLE 2

|  | Forward Rotation | Reverse Rotation |
|---|---|---|
| First motor | film supplying | magnetic head advancing and withdrawing (magnetic recording preparatory operation) |
| Second motor | film winding | film rewinding |

Figure 21:
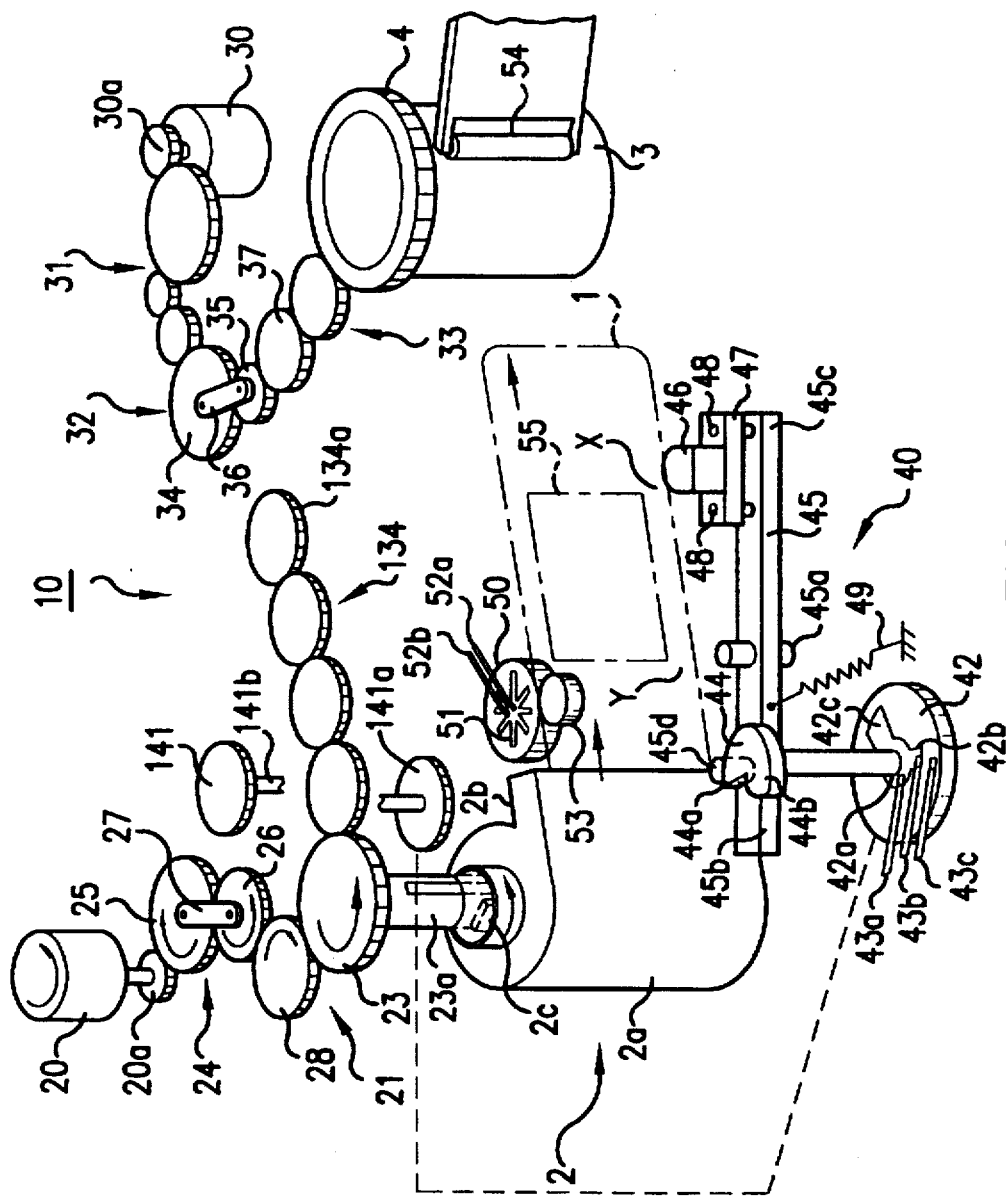
FIG. 21 is a drawing showing the driving mechanism according to another preferred embodiment of one present invention.

FIGS. 21–27 show the position of the magnetic head 46 relative to a camera having normal winding method. With a camera using a prewinding method, the magnetic head 46 is positioned to contact the film 1 section labelled Y as shown in FIG. 21.

The film supply operation, the film winding operation, the magnetic head advancement/withdrawal and the film rewinding operation of the second preferred embodiment will be described below with reference to FIGS. 21–25.

(1) Film Supply Operation.

As shown in FIG. 21, the film supply operation in the second preferred embodiment corresponds to the first preferred embodiment.

(2) Film Winding Operation

Figure 22:
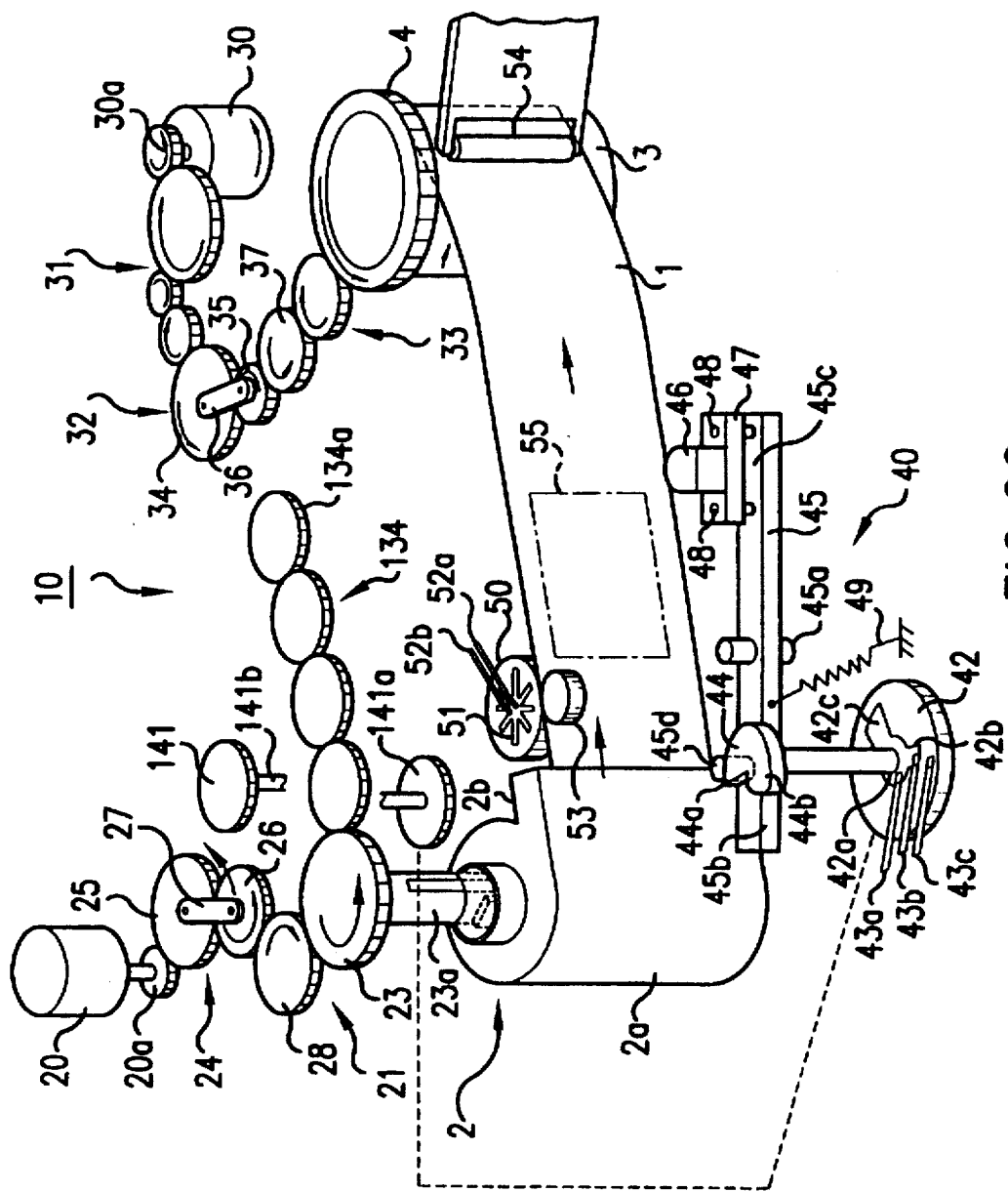
FIG. 22 is a drawing showing another state of the driving mechanism.
Figure 23:
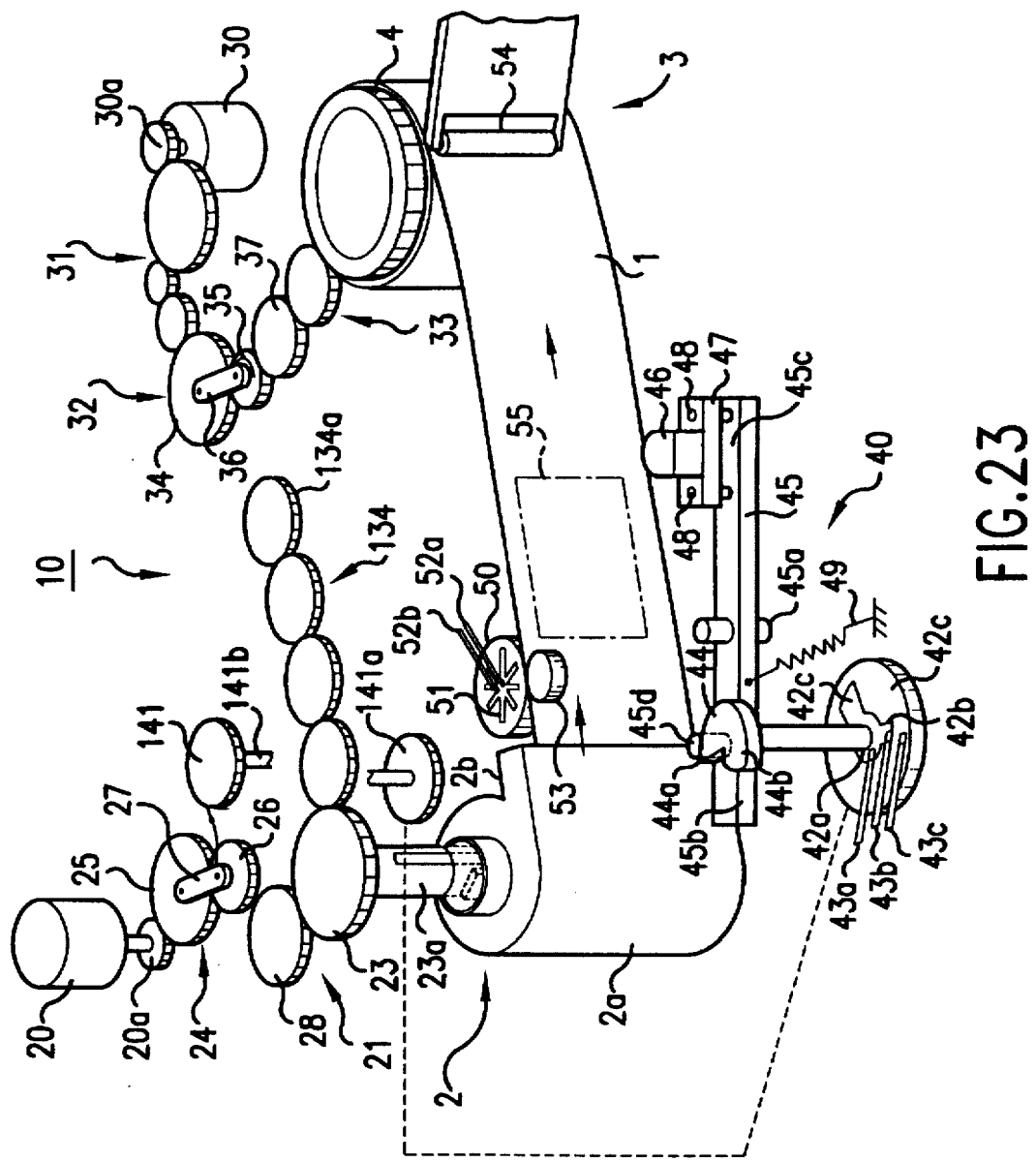
FIG. 23 is a drawing showing another state of the driving mechanism.

As shown in FIGS. 22–23, the film winding operation in the second preferred embodiment corresponds to the first preferred embodiment. The exception is when the gear 28 is driven to rotate clockwise and breaks contact with planetary gear 26 and the planetary lever 27 moves towards a gear 141.

(3) Magnetic Head Advancement and Withdrawal

Figure 24:
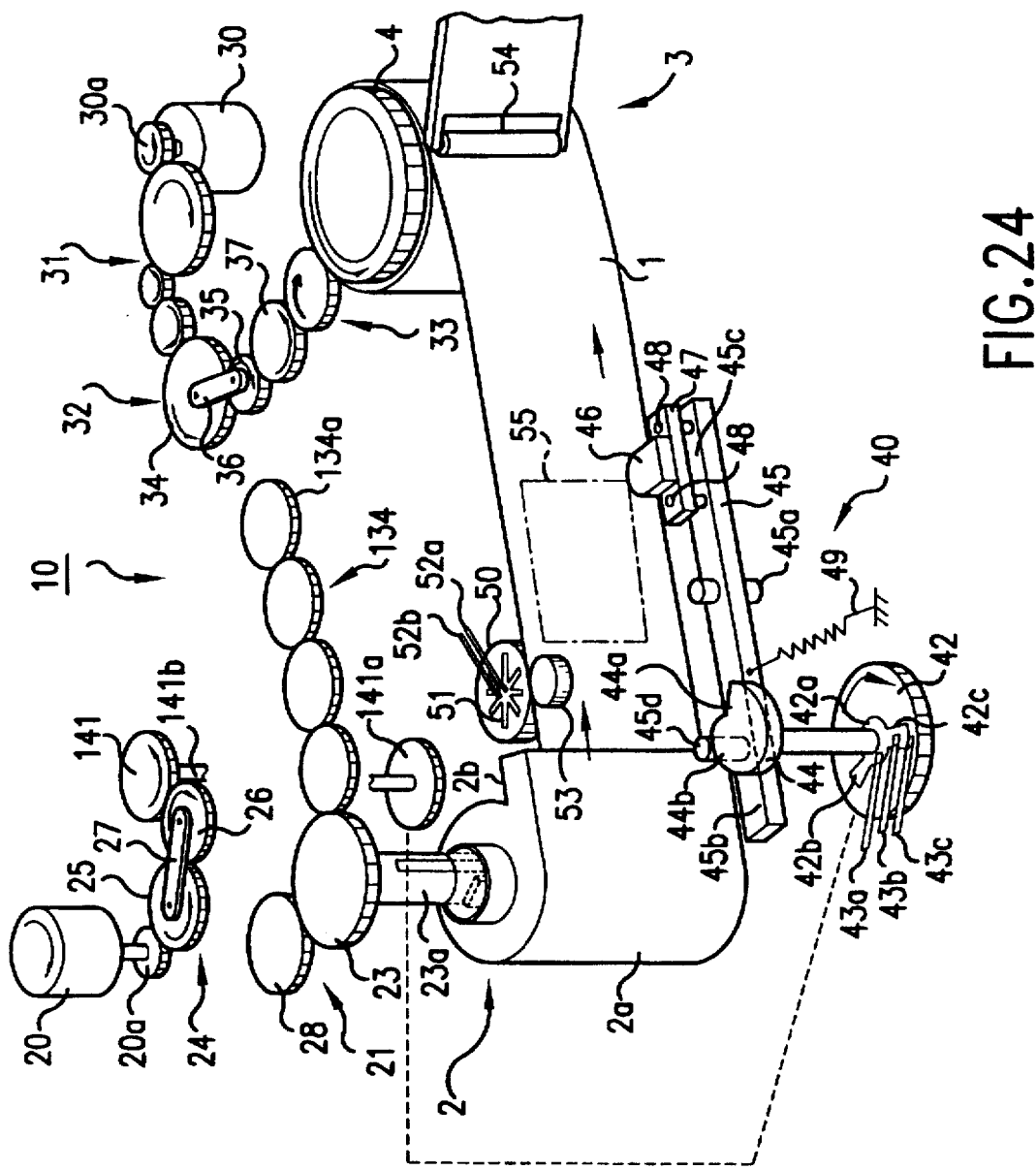
FIG. 24 is a drawing showing another state of the driving mechanism.
Figure 25:
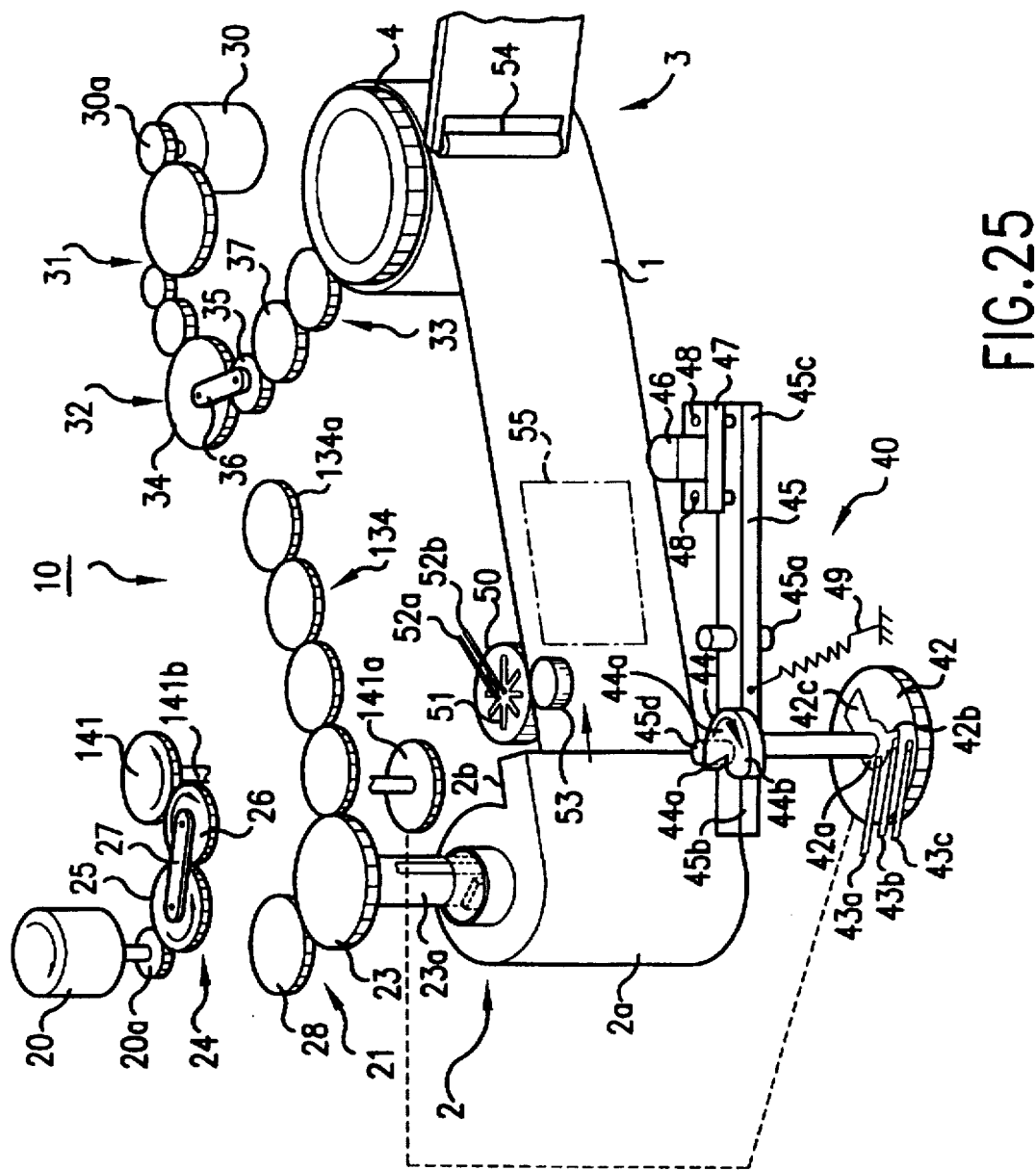
FIG. 25 is a drawing showing another state of the driving mechanist

As shown in FIG. 24, when the first motor 20 rotates in reverse, the sun gear 25 of the planetary gear mechanism 24 is rotated counterclockwise so that the planetary lever 27 moves toward the gear 141. The planetary gear 26 and the gear 141 enmesh to transfer the first motor 20 reverse rotation from the planetary gear 26 to the cam driving gear 42 through the gear 141. Thus, the cam 44 rotates in a clockwise direction. Further, when the pin 45d of the support lever 45 contacts the side 44b of the cam 44, the magnetic head 46 is pressed against the magnetic recording section of the film 1, as shown in FIG. 24. An electric current flows between the brushes 43a and 43c.

As the first motor 20 rotates further, the cam 44 rotates further. As shown in FIG. 23, the pin 45d of the support lever 45 contacts with the side 44a of the cam 44 and the magnetic head 46 withdraws from the film 1. At this time, an electric current flows between the brushes 43a and 43b.

(4) Film Rewinding Operation

Figure 26:
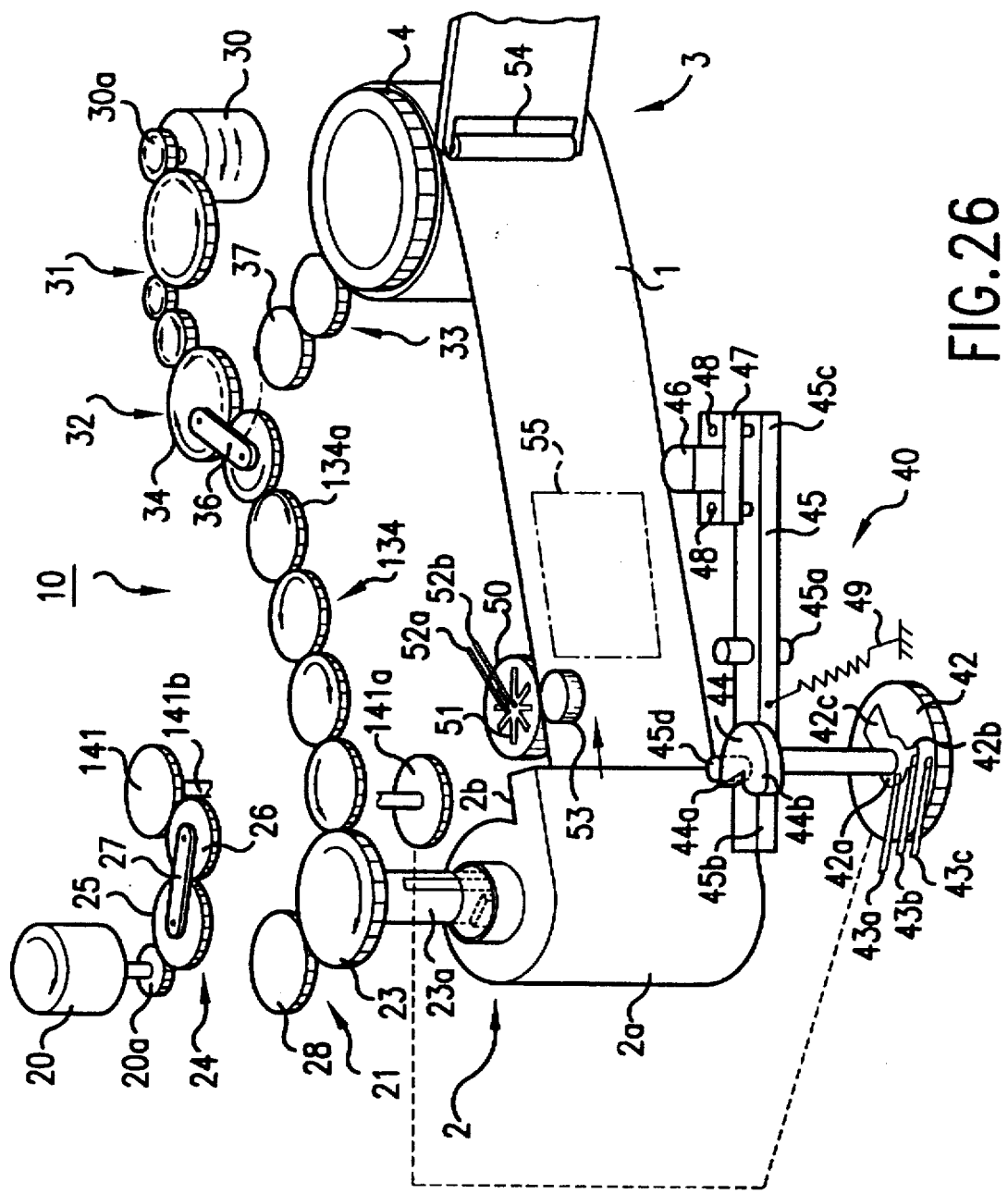
FIG. 26 is a drawing showing another state of the driving mechanism.

As shown in FIG. 26, when the film 1 photography is completed, the second motor 30 begins to rotate in reverse causing the pinion gear 30a to rotate in a clockwise direction. The reverse rotation of the second motor 30 transfers to the gear 134a of the planetary gear mechanism 32 through gear train 31. The gear 134a clockwise rotation causes the planetary lever 36 to move toward a gear train 134, and the planetary gear 35 enmeshes with the gear 134a. Thus, the second motor 30 reverse rotation transfers from the planetary gear 35 through the gear train 34 and to the cartridge driving gear 23 and the spline 2c, which engages with the gear key 23a to reverse rotate the cartridge spool. Thereby, the film 1 is rewound into the cartridge 2.

The gear 28 rotates because of the gear 23 rotation. The first motor 20 does not become a load on the second motor 30 during the film 1 rewinding because the planetary gear 26 is not enmeshed with the gear 28.

Figure 28:
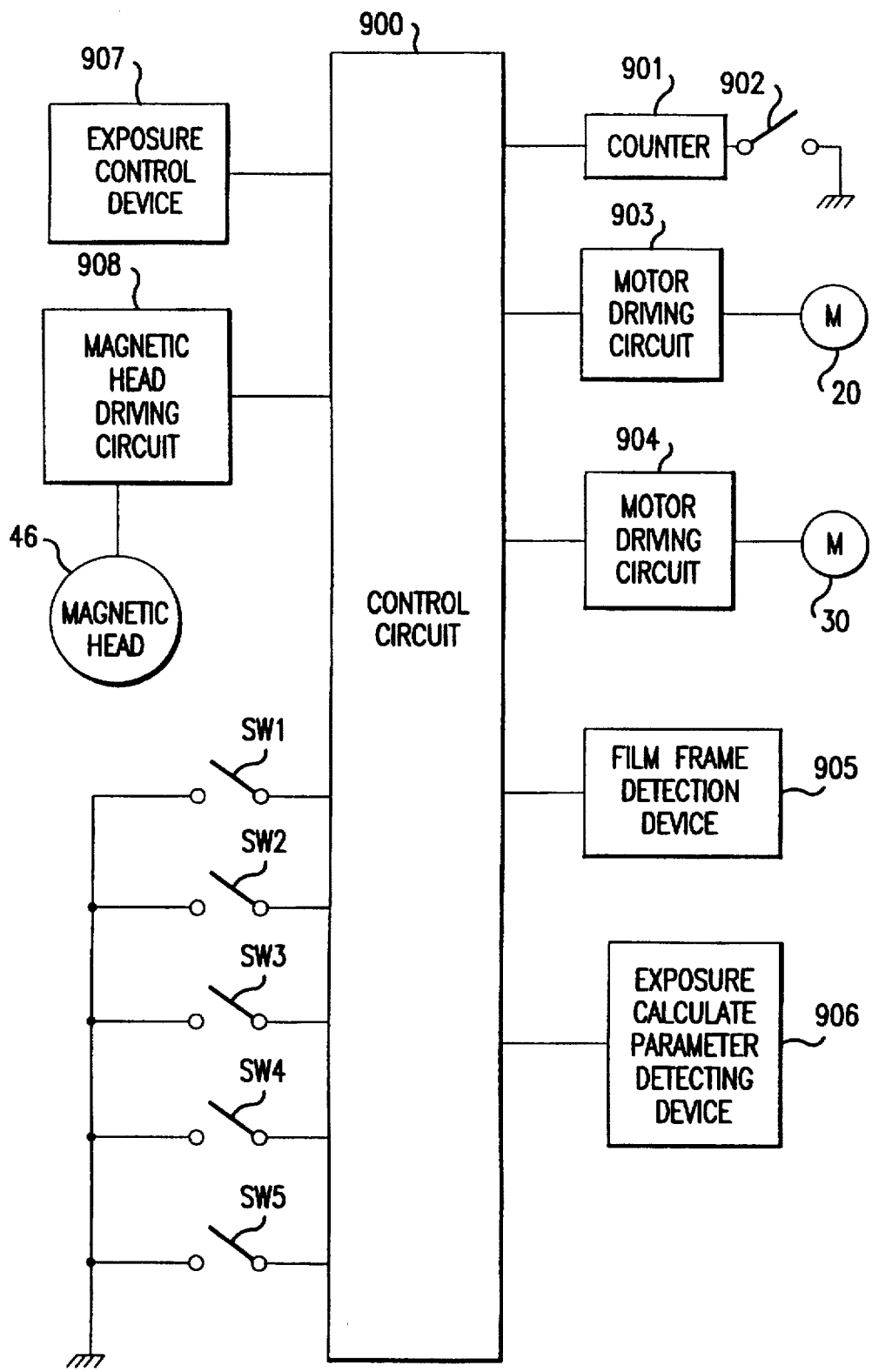
FIG. 28 is a function block diagram showing the configuration.

FIG. 28 is substantially identical to FIG. 9 so the configuration explanation of the preferred embodiments is omitted here. FIGS. 29-34 are flowcharts showing the operations of the second preferred embodiment having a normal winding method.

Figure 29:
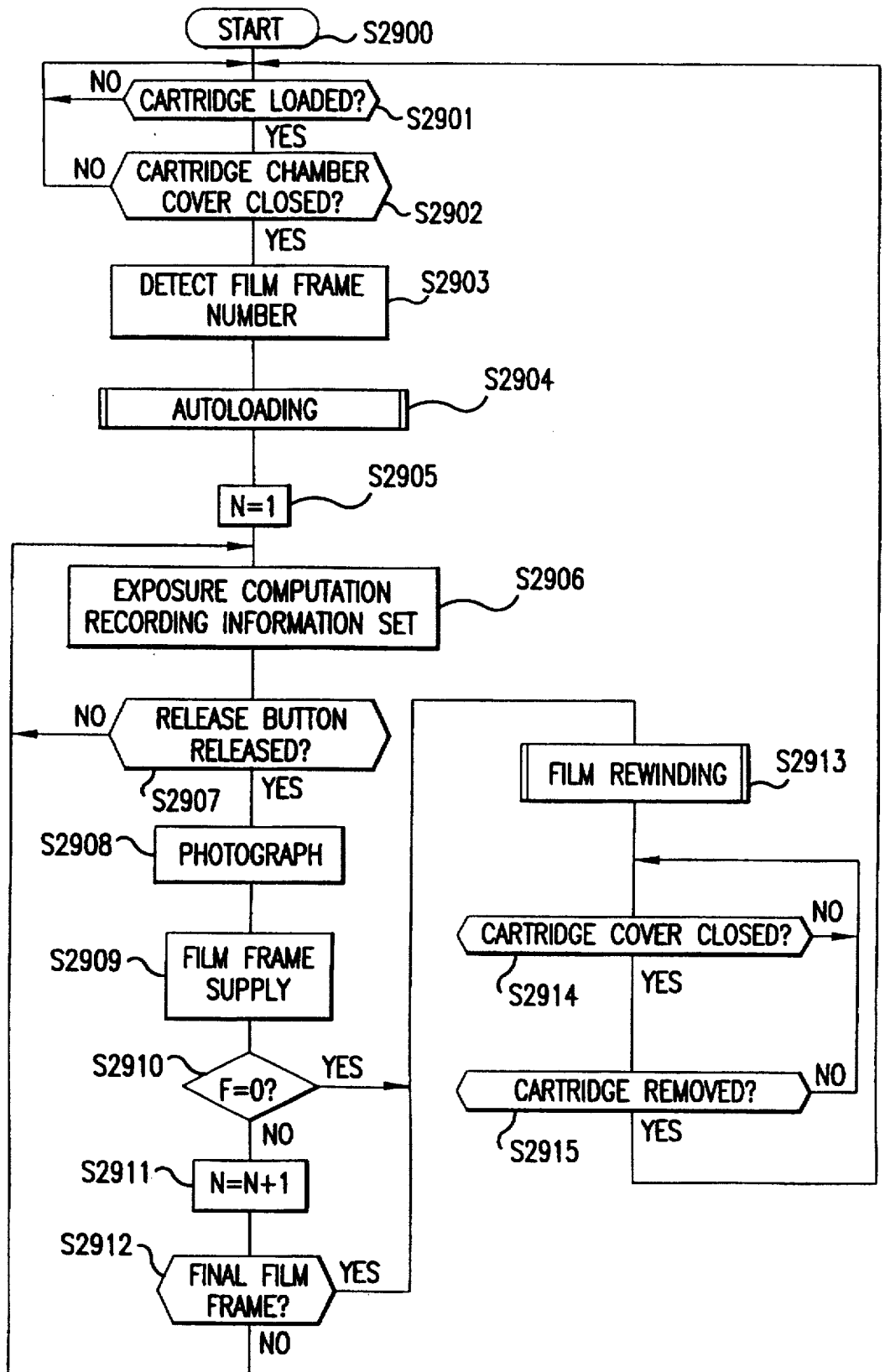
FIG. 29 a flowchart showing the operation of a normal winding method.
Figure 30:
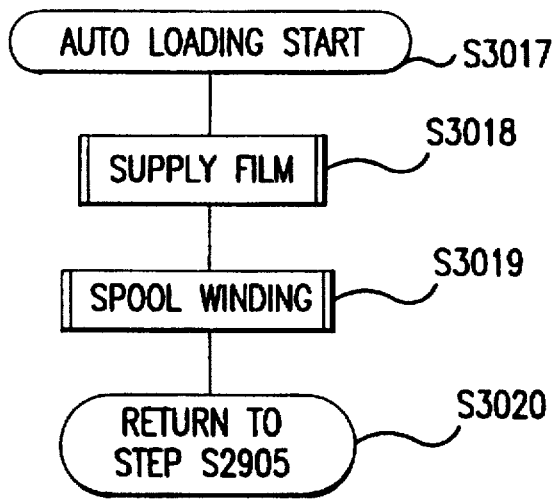
FIG. 30 is a flowchart showing autoloading for a normal winding method.

FIG. 29 shows the control operations. Steps S2900-S2915 correspond to FIG. 10 (steps S1000-S1015) so the detailed explanation is omitted. FIG. 30 shows the autoloading operation. Steps S3017-S3020 of FIG. 30 correspond to FIG. 11 (steps S1117-S1120) so the detailed explanation is omitted here.

Figure 27:
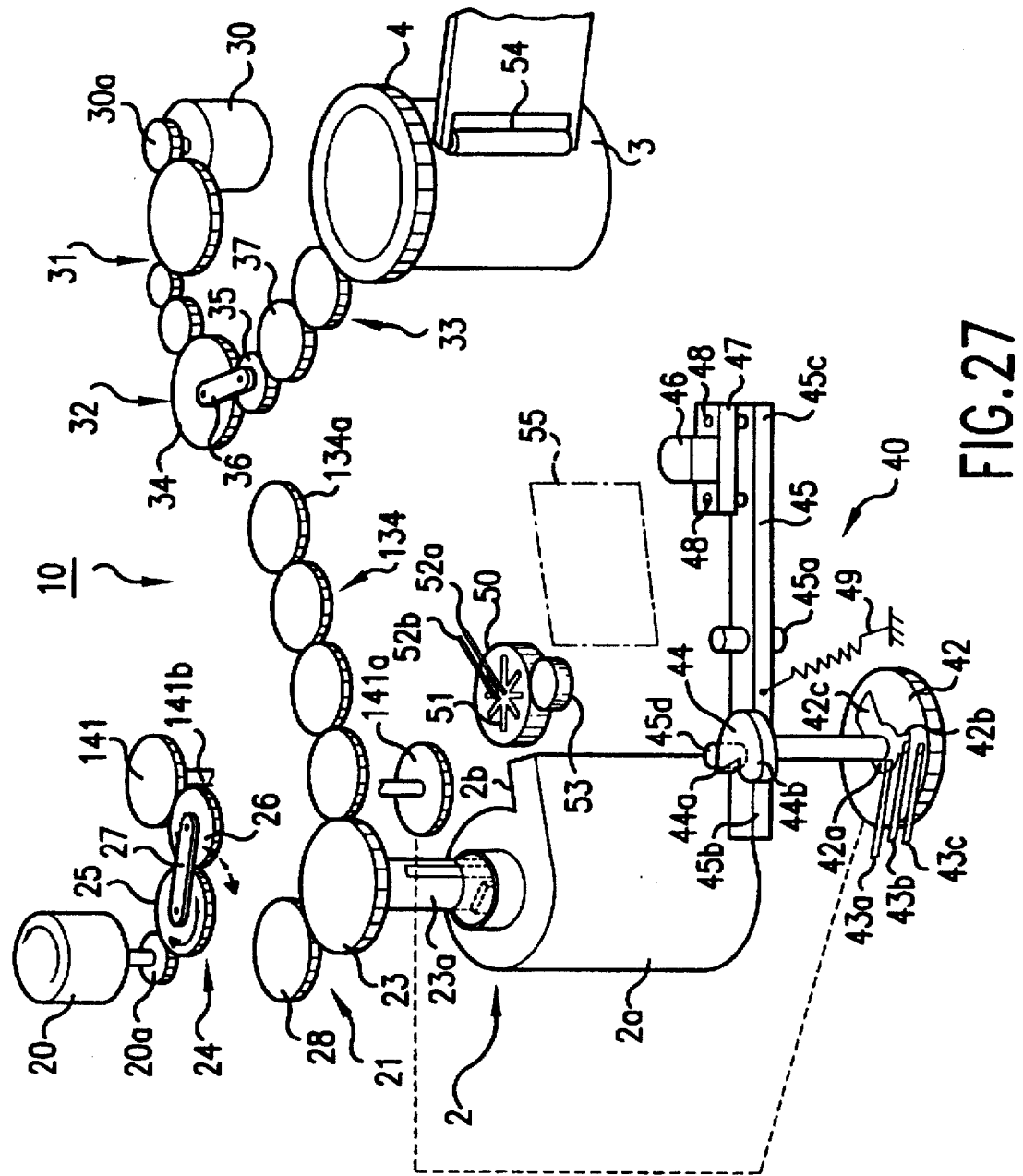
FIG. 27 is a drawing showing another state of the driving mechanism.
Figure 31:
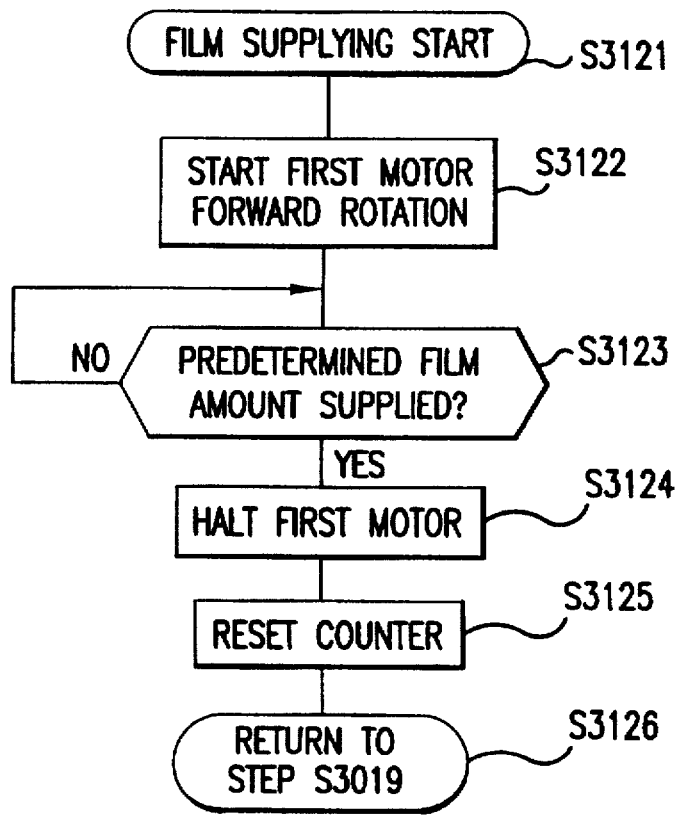
FIG. 31 is a flowchart showing the film supplying operation for normal winding method.

FIG. 31 shows the film supplying operation. Steps S3121-S3126 correspond to FIG. 12 (steps S1220 and S1222-S1226). FIG. 27 shows the state after the film 1 was rewound. FIG. 21 shows the film supplying state. The second motor is not a load on the first motor because the planetary gear 26 is not enmeshed with the gear 134a.

Figure 32:
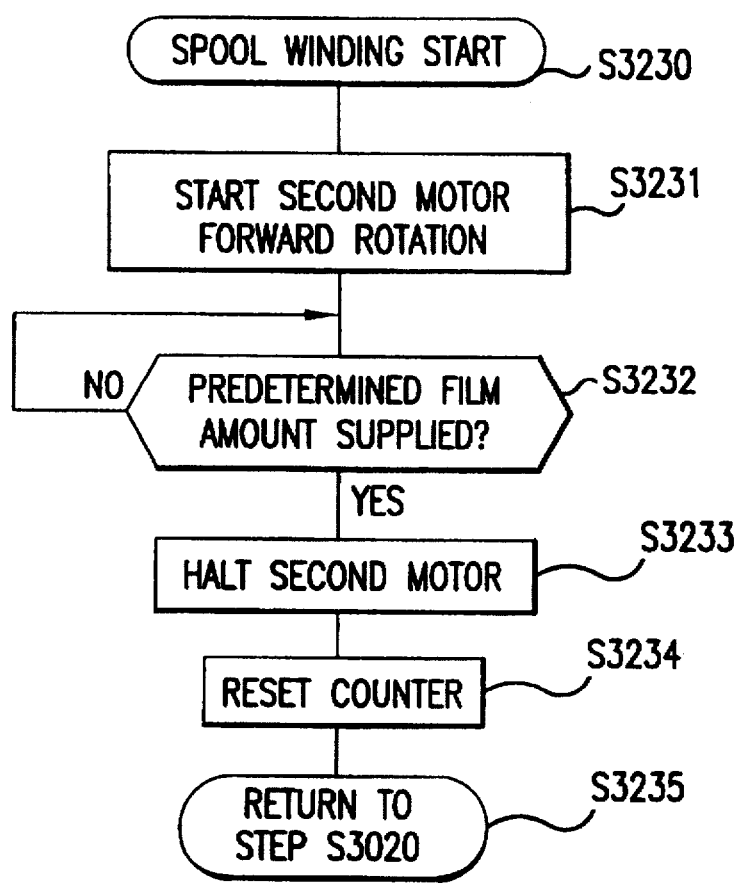
FIG. 32 is a flowchart showing the spool winding operation for a normal winding method.

FIG. 32 shows the spool winding operation. Steps S3230-S3235 correspond to FIG. 13 (steps S1330-S1335). The completed autoloading operation is shown in FIG. 33.

Figure 33:
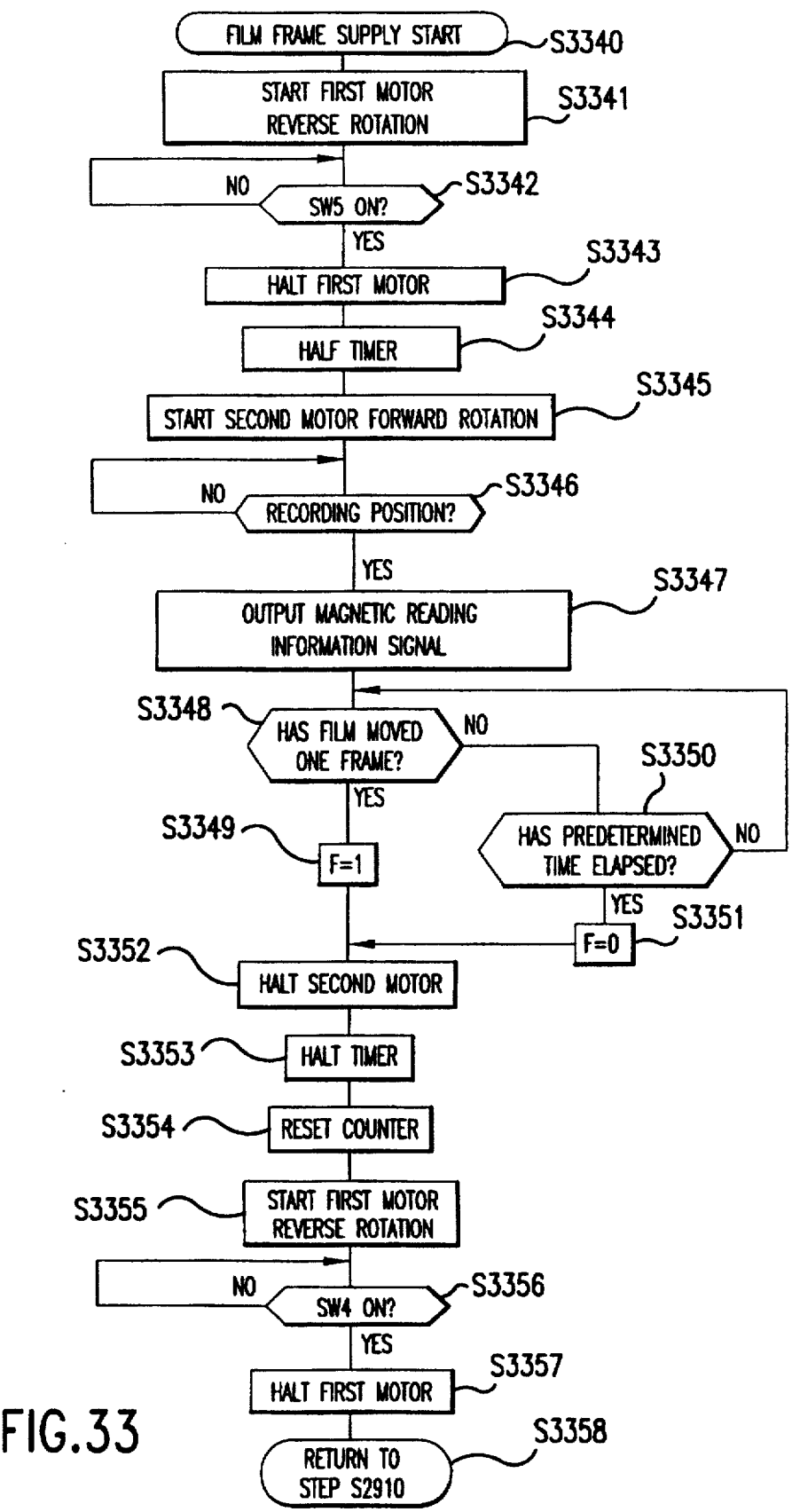
FIG. 33 is a flowchart showing the frame supplying operation for a normal winding method.

As shown in FIG. 33, the film frame supply operation starts in step S3340. Step S3341 starts reverse rotation of the first motor 20. The enmeshing of the planetary gear mechanism 24 changes and the planetary gear 26 enmeshes with the gear 141 to advance the magnetic head 46 by rotating the cam 44 through the gear 42 as shown in FIG. 24. Step S3342 determines using the switch SW5 whether the magnetic head 46 is pressed against the film 1, which allows recording. When the pin 45d of the support lever 45 contacts the side 44b of the cam 44 under the rotation of the cam 44, the magnetic head 46 is pressed against the magnetic recording section of the film 1 under the force of the spring 49. If magnetic recording is possible, the first motor 20 is halted in step S3343.

Figure 14:
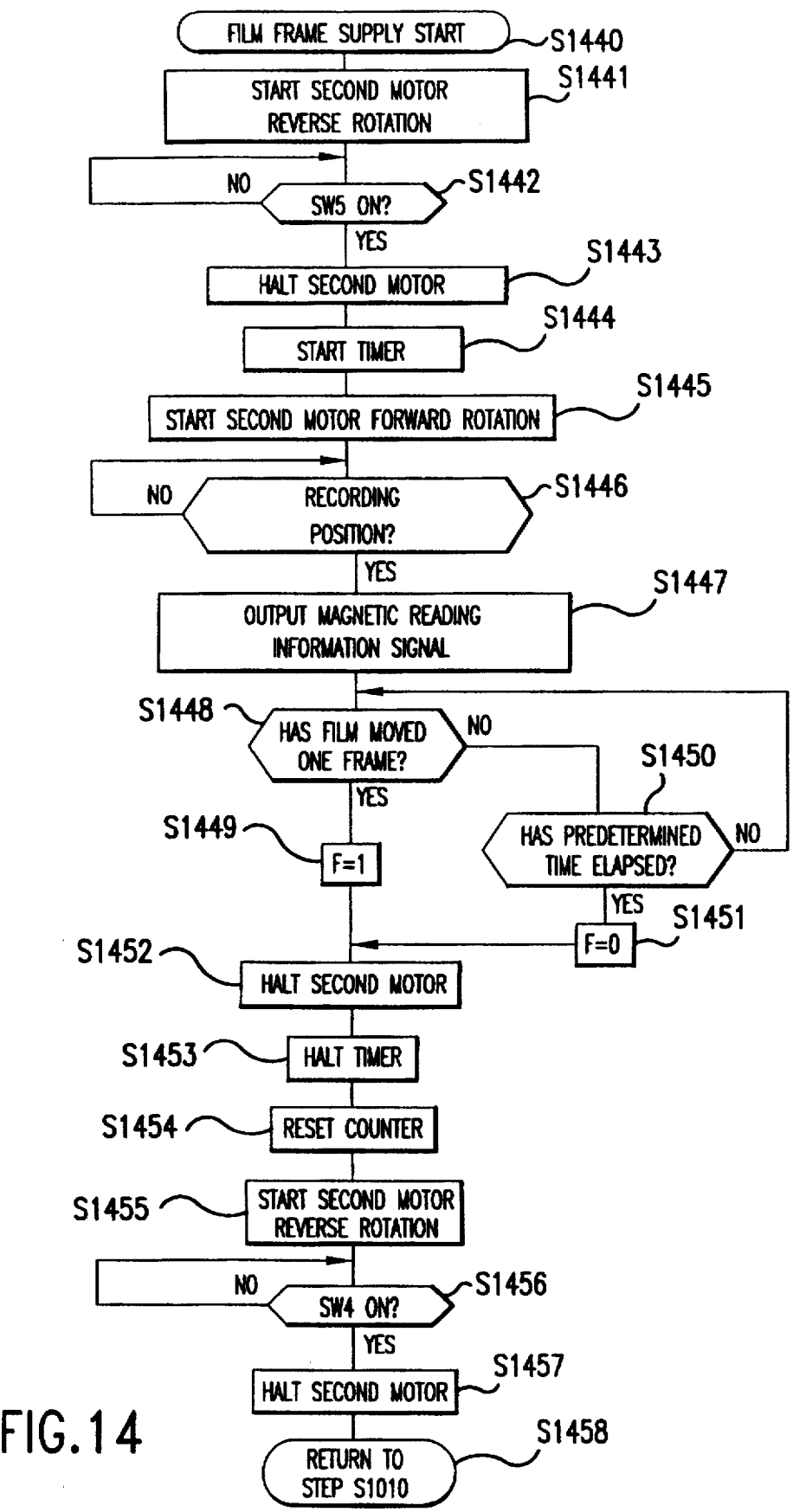
FIG. 14 is a flowchart showing the frame supplying operation for a normal winding method.

Steps S3344-S3354 of FIG. 33 correspond to FIG. 14 (steps S1444-S1454). After film frame supplying, step S3355 starts reverse rotation of the first motor 20 again. The mesh of the planetary gear mechanism 24 is already enmeshed with the gear 141 through the planetary gear 26. The cam 44 immediately rotates to start withdrawing the magnetic head 46. Step S3356 determines whether the magnetic head 46 has been withdrawn from the film 1 using the switch SW4. When the pin 45d of the support lever 45 contacts with the side 44a of the cam 44 under the cam 44 rotation, the magnetic head 46 has been completely withdrawn from the film 1 and the switch SW4 turns on. Then in step S3357, the first motor 20 is halted. Step S3358 returns the program to step S2910 in FIG. 29.

Figure 34:
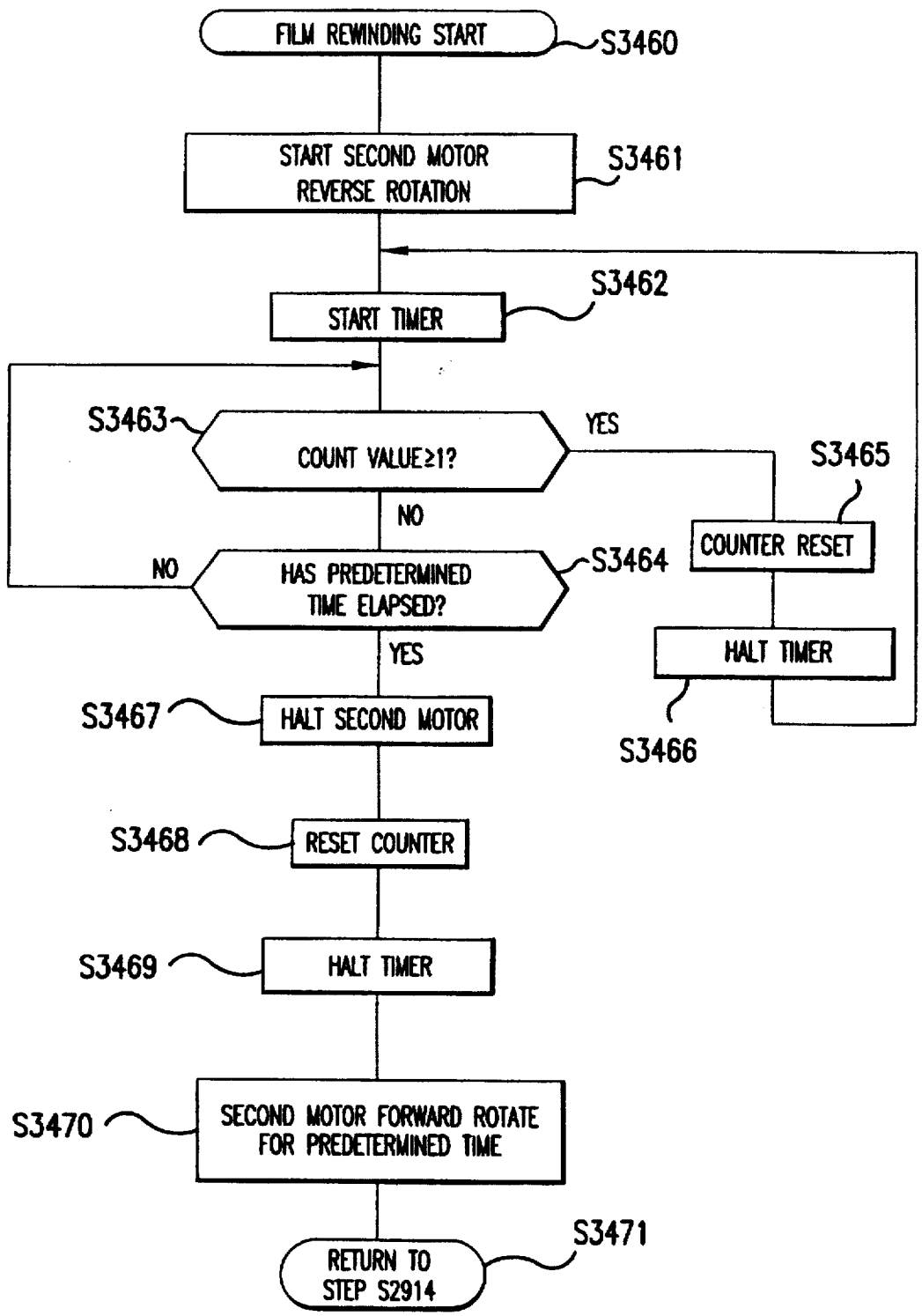
FIG. 34 is a flowchart showing the film rewinding operation for a normal winding method.

As shown in FIG. 34, the film rewinding starts in step S3460. Step S3461 starts the second motor 30 reverse rotation and the planetary gear 35 enmeshes with the gear 134a of the gear train 134 as shown in FIG. 26. Further, the second motor 30 reverse rotation transfers to the gear 23 causing the cartridge spool to rotate in the rewinding direction. Thus, the film 1 starts rewinding. During rewinding, the planetary gear 26 of the planetary gear mechanism 24 is enmeshed with the gear 141. Therefore, the first motor 20 does not become a load on the second motor 30.

Step S3462 starts the timer. Step S3463 determines whether the count value on the counter 901 is 1 or greater. When the count value on the counter 901 is 1 or greater in step S3463, operation continues to step S3465 where the counter is reset. In step S3466, the timer is halted and operation returns to step S3462.

When the count value is not 1 or greater, step S3464 determines whether the timer has exceeded a predetermined time length. When the predetermined time length has elapsed, operation continues to step S3467. If the predetermined time length has not elapsed, operation returns to step S3463. In step S3467, the second motor 30 is halted. Step S3468 resets the counter 901. Step S3469 halts timing with the timer. Thus, the rewinding operation rewinds the film 1 into the cartridge 2.

After film rewinding, the planetary gear mechanism 32 is enmeshed with the gear 134a as shown in FIG. 26. Therefore, step S3470 starts the second motor 30 forward rotation for a predetermined length of time. The planetary lever 36 of the planetary gear mechanism 32 moves toward the gear train 33. The meshing of the planetary gear 35 and the gear 134a is broken and the planetary gear 35 enmeshes with the gear 37 as shown in FIG. 27. Therefore, when film is supplied by the first motor 20 the next time, the second motor 30 does not become a load on the first motor 20. In step S3471, operation returns to step S2914 in FIG. 29.

For a normal winding camera according to the second preferred embodiment, film is supplied by driving the cartridge spool through forward rotation of the first motor 20. Film rewind is performed by driving the cartridge spool through reverse rotation of the second motor 30. Further, pressing and withdrawing the magnetic head 46 is performed by reverse rotation of the first motor 20. Film winding is performed by forward rotation of the second motor. Power transfer mechanisms including planetary gear mechanisms, are used and configured so one motor does not become a load on the other motor during driving. Therefore, advancing and withdrawing of the magnetic head 46 in addition to film supply is performed using two film supply motors. A special motor for advancement and withdrawal of the magnetic head 46 is unnecessary. The cost of the camera is reduced. Further, the camera can be made smaller.

Figure 35:
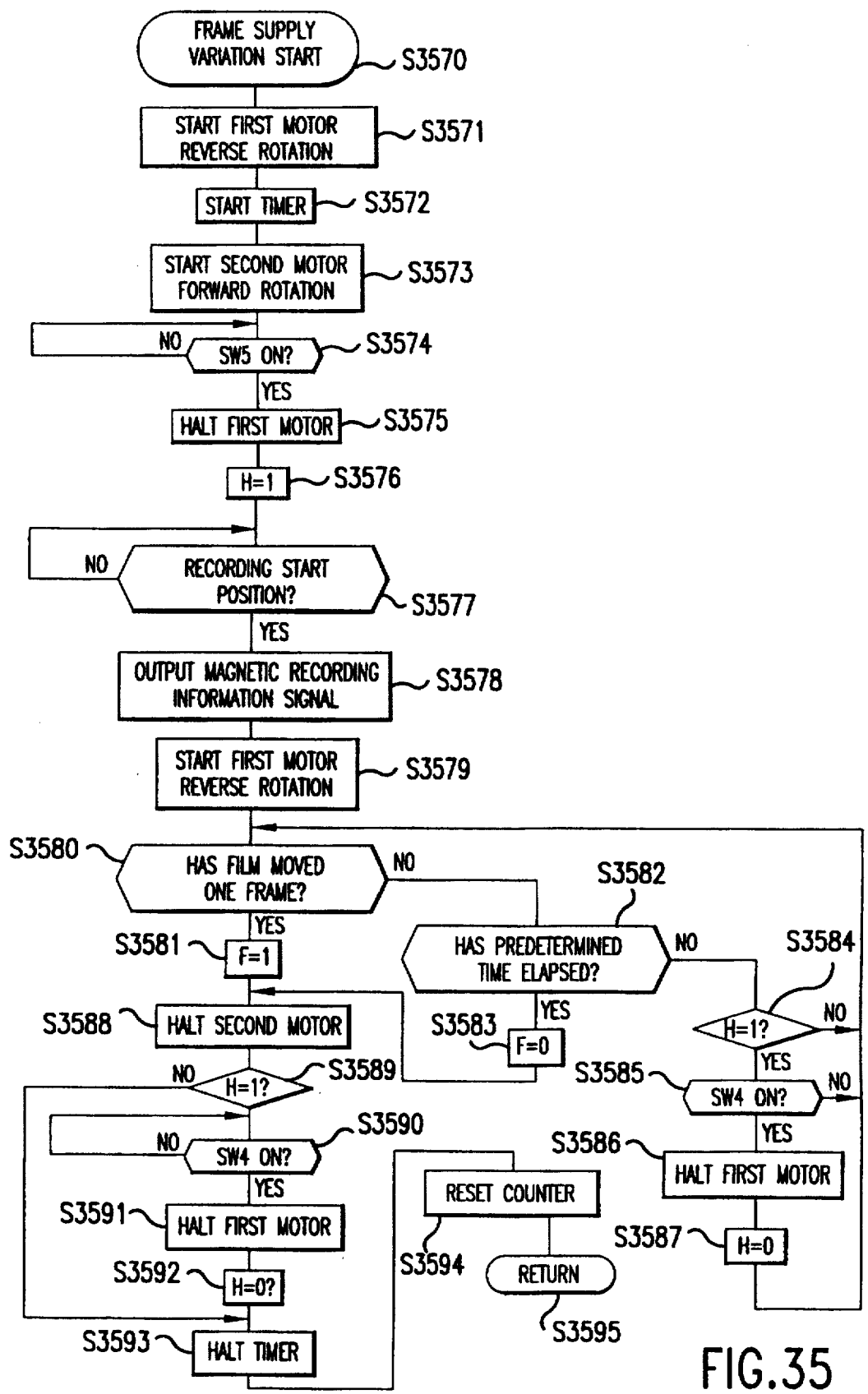
FIG. 35 is a flowchart showing a variation of the frame supplying operation for a normal winding method.

As shown in FIG. 35, a variation of the second preferred embodiment frame supplying in a normal camera will now be described where the magnetic head 46 is advanced and withdrawn during the supplying of one frame of the film 1 by overlapping the first motor 20 and the second motor 30 driving.

The frame supplying operation starts in step S3570. When reverse rotation of the first motor 20 is started in step S3571, the enmeshing of the planetary gear mechanism 24 changes so that the planetary gear 26 enmeshes with the gear 141 as shown in FIG. 24. The magnetic head 46 starts advancing through rotation of the cam 44 by the gear 42. Step S3572 starts a timer. In step S3573, winding of one frame of the film 1 is performed by starting the second motor 30 forward rotation. Step S3574 determines whether the magnetic head 46 is pressed against the film 1 using the switch SW5 so magnetic recording is possible. If magnetic recording is possible, step S3575 halts the first motor 20; otherwise, step S3574 is repeated. The magnetic head 46 is pressed against the film 1 before the magnetic recording position.

In step S3576, the flag H is set to 1. The flag H is set to 1 when the magnetic head 46 is in a pressing state, and is reset to 0 when the magnetic head 46 is in a withdrawn state. Step S3577 determines whether the film 1 has been supplied to the magnetic recording start position based on the supply amount detected by the counter 901. When the magnetic recording start position has been reached, step S3578 outputs the various recording information determined beforehand to the magnetic head driving circuit 908 for recording in the magnetic recording section of the film 1. The magnetic recording completes slightly before the frame supply is completed.

When magnetic recording has been completed, the first motor 20 reverse rotation is started again in step S3579. Because the planetary gear 26 of the planetary gear mechanism 24 is already enmeshed with the gear 141, the cam 44 forward rotation starts withdrawing the magnetic head 46. Step S3580 determines whether one film frame has been supplied based on the counter 901. When one frame has been supplied and the next frame is located in the photography position, the program moves to step S3581. Otherwise, the program continues to step S3582.

When one frame has been supplied, step S3581 sets the flag F to 1. Steps S3588 halts the second motor 30. Then, step S3589 determines whether the flag H is set to 1. When the magnetic head is set to 1 (pressing state) step S3590 determines whether the magnetic head 46 has been withdrawn from the film 1 using the switch SW4. When the magnetic head 46 is withdrawn, step S3591 halts the first motor 20. The flag H is reset to 0 in step S3592. Step S3593 halts the timer. Step S3594 resets the counter 901 and the frame supplying operation is completed. Step S3595 then returns the program to the step following the calling step.

On the other hand, when step S3580 determines one frame has not been supplied, step S5382 determines whether the timer exceed a predetermined time. If the predetermined time was exceeded, step S3583 resets the flag F to 0, and operation continues to step S3588. Otherwise, step S3584 determines whether the flag H has been set to 1. If the magnetic head is in the pressing state (H=1), operation continues to step S3585. Otherwise, operation returns to step S3580. Step S3585 determines whether the magnetic head 46 has been withdrawn from the film 1 using the switch SW4. When the magnetic head 46 is withdrawn, operation continues to step S3586. Otherwise, operation returns to step S3580. Step S3586 halts the first motor 20. Step S3587 resets the flag H to 0, and operation returns to step S3580.

The second preferred embodiment is also applicable to a prewinding method camera.

The composition and driving mechanism of a prewinding method camera are identical to the normal winding method camera as shown in FIG. 27. The exception is the magnetic head 46 positioning moves from the position contacting the area labelled X (normal winding) to a position contacting the area labelled Y (prewinding) as shown in FIG. 21. Therefore, an explanation of the prewinding driving mechanism is omitted.

FIGS. 36–39 are flowcharts showing the operation of the second preferred embodiment applied to a prewinding method camera.

Figure 36:
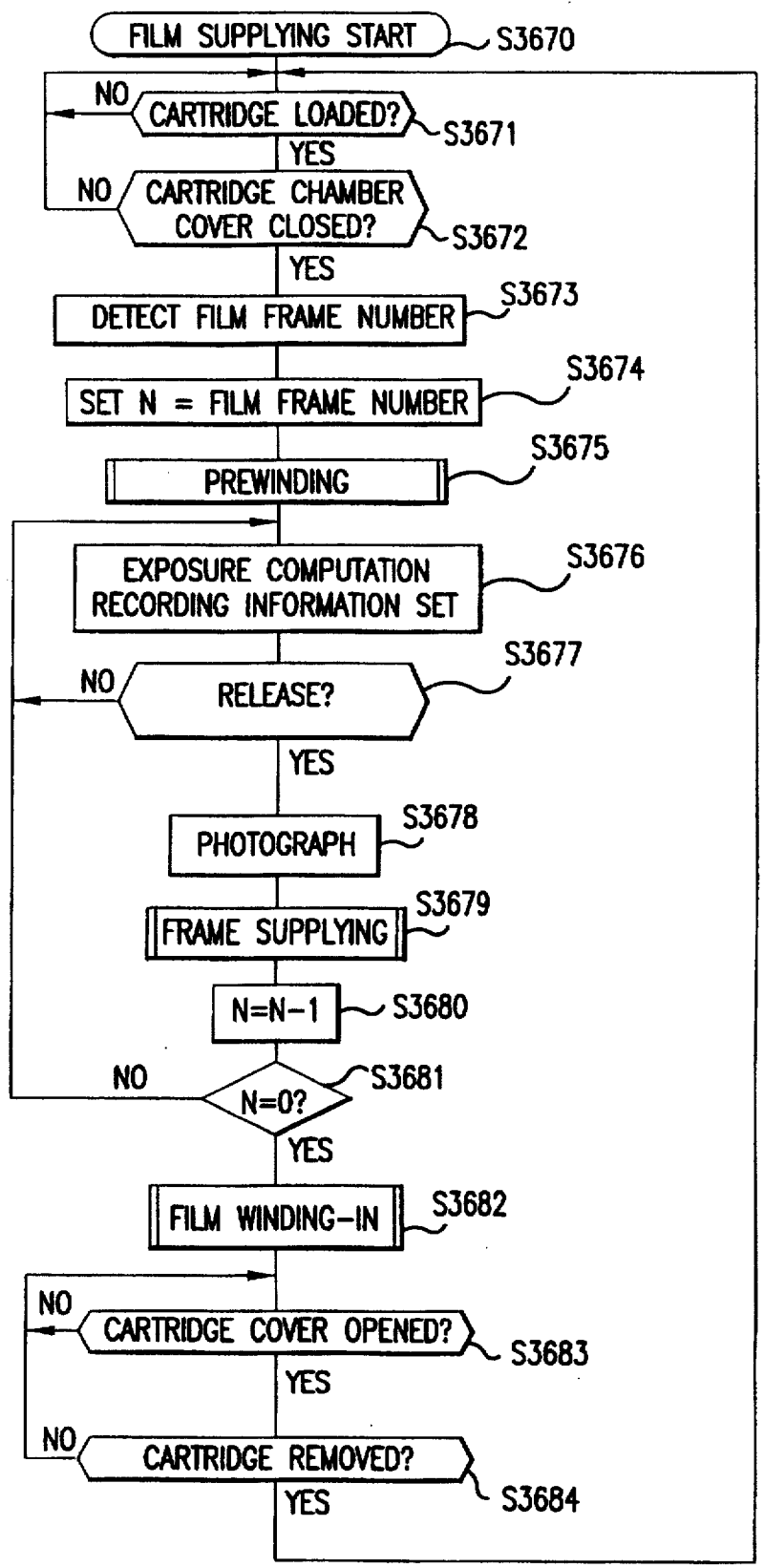
FIG. 36 is a flowchart showing the operation of a prewinding method.

As shown in FIG. 36, the control circuit 900 starts the film supplying operations in step S3670 when an camera battery (not shown) is loaded. Step S3671 determines whether a film cartridge 2 is loaded in the cartridge chamber using the switch SW2. When the film cartridge 2 has been loaded, step S3672 determines whether the cartridge chamber cover has been closed using the switch SW1. When the cartridge is not loaded in step S3671 or the cartridge cover is not closed in step S3672, operation returns to step S3671. When the cover of the cartridge chamber has been closed, step S3673 detects the number of film frames using the film frame number detection device 905. The number of film frames is stored as the photography frame number N in step S3674.

Figure 37:
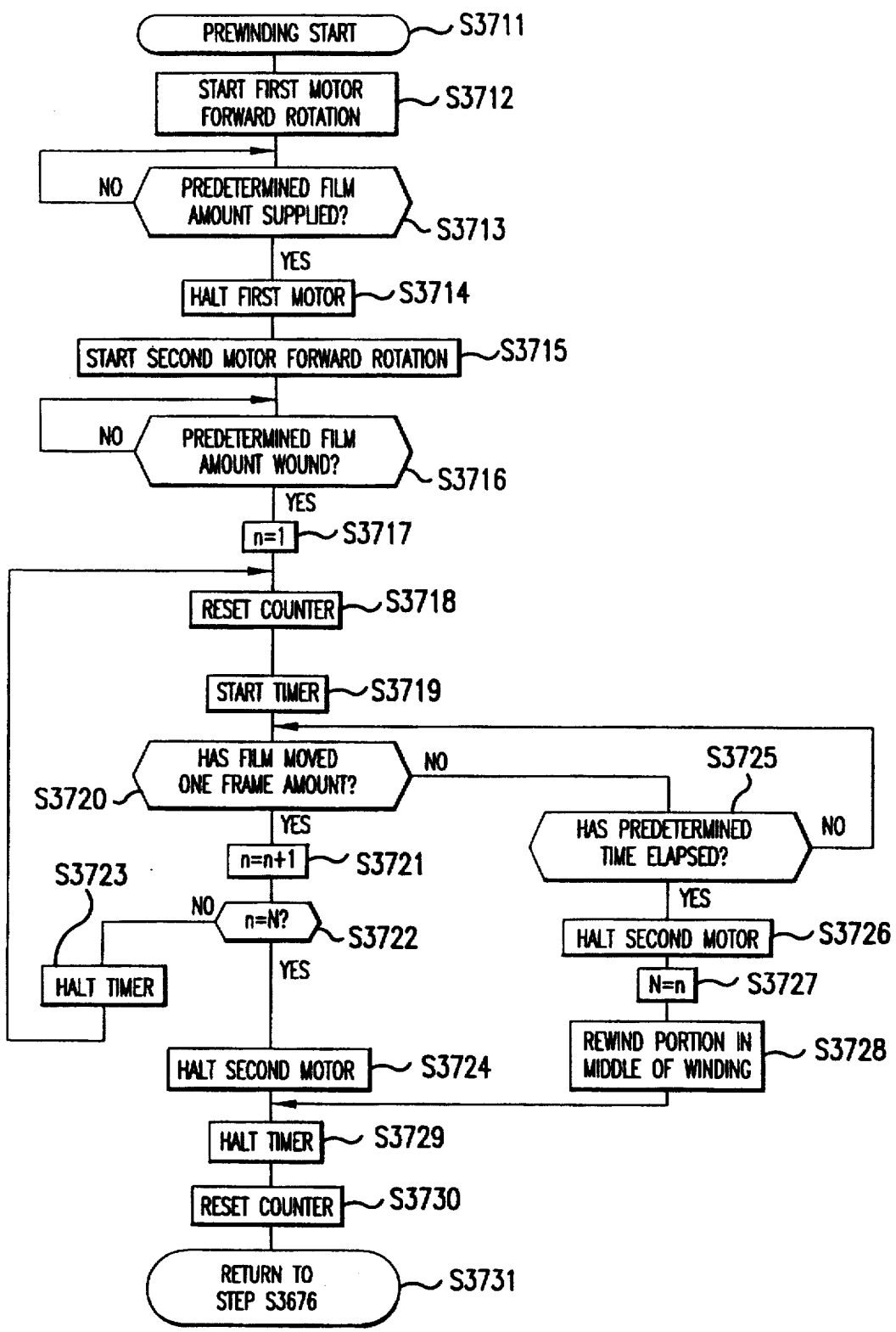
FIG. 37 is a flowchart showing the prewinding operation for a prewinding method.

Step S3675 performs the film prewinding operation. As shown in FIG. 37, film prewinding starts in step S3711. Step S3712 starts forward rotation of the first motor 20. The planetary lever 27 of the planetary gear mechanism 24 is moved to the side of the gear 28 as shown in FIG. 21. The planetary gear 26 enmeshes with the gear 28. The first motor 20 drives the cartridge driving gear 23 in the film supplying direction and the film 1 is supplied from the cartridge 2.

Step S3713 determines whether a predetermined amount of film 1 has been supplied using the counter 901. The predetermined film amount is the amount needed for the leader portion of the film 1 to reach the winding spool 3 as shown in FIG. 22. When the leader portion of the film 1 reaches the winding spool 3, step S3714 halts the first motor 20. Otherwise, operation returns to step S3713. The second motor forward rotation 30 is started in the step S3715.

Step S3716 determines whether the film has been wound to a position where the first film frame of the film 1 is located at the photograph position based on the supply amount detected by the counter 901. When the first film frame reaches the photograph position, operation continues to step S3717 where the winding frame number n is set to 1. The winding frame number n shows the frame number wound around the camera side during prewinding.

Step S3718 resets the counter 901. In step S3719, timing with the timer is started. The timer verifies whether one frame of the film 1 can be wound within a predetermined time length. Step S3720 determines whether winding one frame of the film 1 has been completed based on the supply amount detected by the counter 901. If one frame is not wound operation continues to step S3725. If one frame of film is wound, the winding frame number is incremented in step S3721. Step S3722 determines whether the winding frame number n equals the film frame number N. When the winding frame number n reaches the film frame number N (the number N is film frames for photograph), the film has been wound to the final frame. Step S3724 halts the second motor 30 and step S3729 halts the timer. Step S3730 resets the counter and the prewinding operation is completed.

When winding has not reached the final frame in step S3722, the timer is halted in step S3723 and operation returns to step S3718. When step S3720 determines one frame is not completely wound, step S3725 determines whether the time measured on the timer exceeds a predetermined time length. When the predetermined time length has elapsed, operation continues to step S3726. Otherwise, operation returns to step S3720. If one frame winding does not complete within the predetermined time length, the film 1 has been wound to the terminal end. Then, step S3726 halts the second motor 30. Step S3727 sets the film frame number N to the winding frame number n because the film frame number actually wound is n frames. Further, because the prewinding operation was halted during winding, step S3728 rewinds using the second motor 30 reverse rotation so that the nth frame is opposite the aperture 55. Timing with the timer is halted in step S3729. The counter 901 is reset in step S3730 and the prewinding operation is complete. Then, in step S3731, operation returns to step S3676 in FIG. 36.

Step S3676 detects the object brightness and film sensitivity and the like using the exposure calculation parameter detecting device 906. An exposure computation is performed based on the exposure calculation parameters, and the aperture stop and exposure time (shutter speed) are computed. Further, the required information is recorded on the magnetic recording section of the film 1. Step S3677 determines whether a release button has been depressed and released using the switch SW3. When the button has been released, operation continues to step S3678. Otherwise, operation returns to step S3676. In step S3678, the photograph is taken controlled by the exposure control device 907 using the computed aperture stop and shutter speed. After the photograph, step S3679 performs the frame supplying operation.

Figure 38:
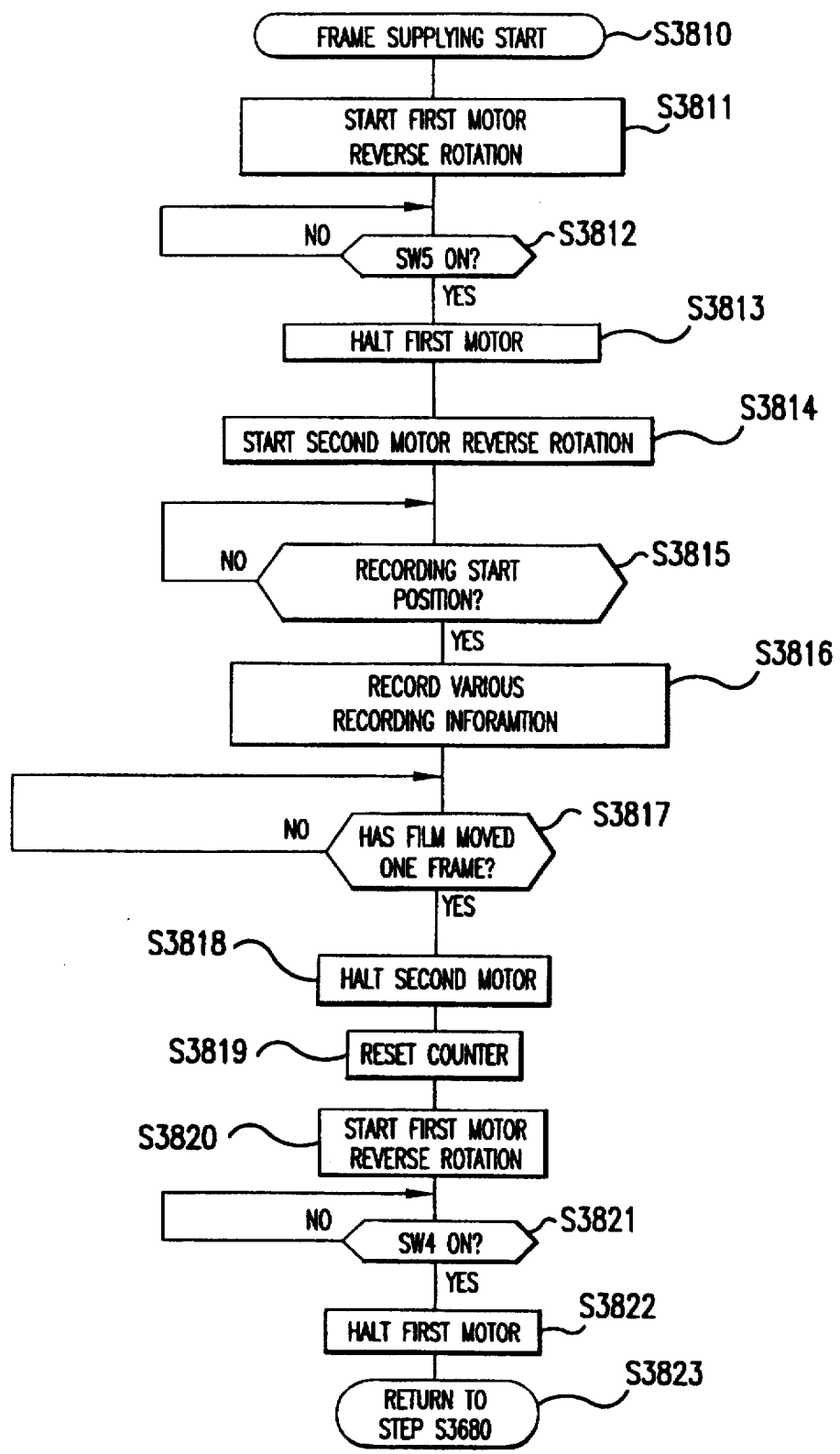
FIG. 38 is a flowchart showing the frame supplying operation for a prewinding method.

As shown in FIG. 38, frame supplying starts in step S3810. Step S3811 starts reverse rotation of the first motor 20 before the one frame is supplied following a photograph to press the magnetic head 46 against the film 1. Step S3812 determines whether the magnetic head 46 is pressed against the film using the switch SW5. If the magnetic head is not pressed against the film 1, operation repeats step S3812. Otherwise, step S3813 halts the first motor 20.

Step S3814 starts frame advancement (film rewind) by starting the second motor 30 reverse rotation. Step S3815 determines whether the film 1 being frame-advanced has reached the position where magnetic recording should be performed based on the film supply amount detected by the counter 901. If the film 1 has not reached the magnetic recording position, step S3815 is repeated. Otherwise, step S3816 outputs various recording information to the magnetic head driving circuit 908 for recording on the magnetic recording section of the film 1. The magnetic head 46 performs magnetic recording in the area corresponding to each shooting frame of the magnetic recording unit of the film 1 (i.e., the area labelled Y in FIG. 21). Recording information needs to be reversed because of opposite travel directions in a prewinding camera as compared to a normal winding camera.

Step S3817 determines whether the supplying of one frame has been completed based on the film supply amount detected by the counter 901. When one frame was supplied, operation continues to step S3818 where the second motor 30 is halted. Otherwise, step S3817 is repeated. The counter 101 is reset in step S3819.

Step S3820 starts the first motor 20 reverse rotation again to start withdrawing the magnetic head 46. Step S3821 determines whether the magnetic head 46 is withdrawn using the switch SW4. If the magnetic head 46 is not withdrawn, step S3821 is repeated. Otherwise, the first motor 20 is halted in step S3822. The frame supplying operation is completed and in step S3823 operation returns to step S3680 of FIG. 36.

After one frame has been supplied following the taking of a photograph, the photography frame number N is decremented in step S3680. Step S3681 determines whether the photography frame number N is 0. In other words, whether the final frame photograph has been completed. When photography of the final frame has not been completed, operation returns to step S3676 to perform the photography operation for the next photography frame.

When photography of the final frame has been completed, step S3682 performs the film winding-in operation.

The film winding-in operation is the operation of rewinding the film 1 into the cartridge 2, and is referred to as "winding-in" to distinguish the "rewinding" of the normal winding camera.

Figure 39:
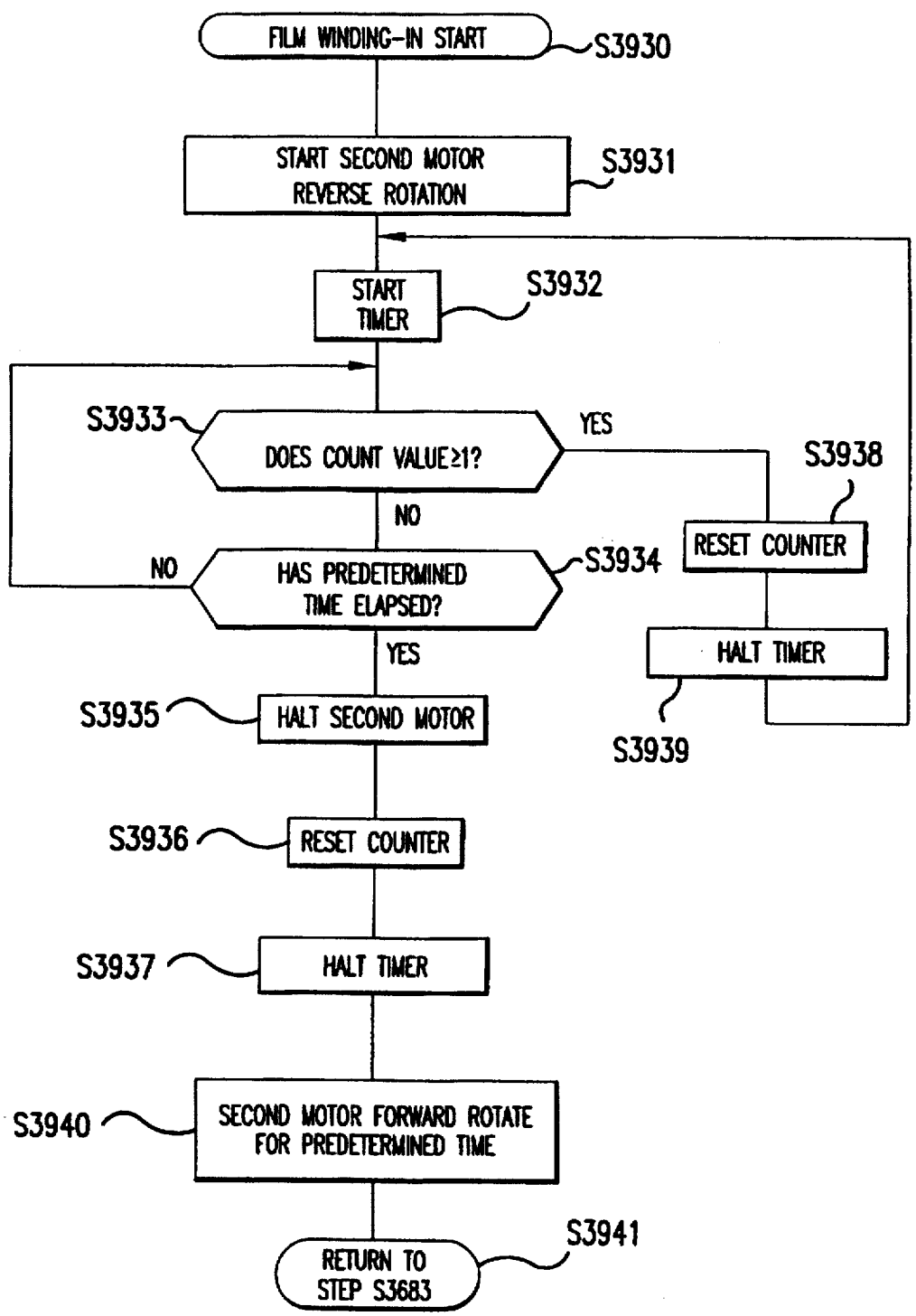
FIG. 39 is a flowchart showing the film winding-in operation for a prewinding method.

As shown in FIG. 39, film winding-in starts in step S3930. Step S3931 starts the second motor 30 reverse rotation to begin the winding-in of the film 1 into the cartridge 2. A prewinding camera rotates the second motor 30 in the reverse direction to supply the next frame after a photograph is taken. Thus, the planetary gear 35 of the planetary gear mechanism 32 is already enmeshed with the gear 134a. Further, the planetary gear 26 of the planetary gear mechanism 24 is enmeshed with the gear 141 so the first motor 20 does not become a load on the second motor 30 during the winding-in.

Step S3932 starts timing with a timer. Step S3933 determines whether the count value on the counter 901 is 1 or greater. When the count value is 1 or greater, operation continues to step S3938 where the counter is reset. Then, step S3939 halts the timer and operation then returns to step S3932. On the other hand, when step S3933 determines the count value is not 1 or greater, step S3934 determines whether the time measured by the timer exceeds a predetermined time length. If the predetermined time length has elapsed, operation continues to step S3935. Otherwise, operation returns to step S3933. Step S3935 halts the second motor 30. Step S3936 resets the counter 901. Step S3937 halts timing with the timer. When the winding-in operation is complete, the film 1 is wound into the cartridge 2.

After film winding-in, the planetary gear mechanism 32 is enmeshed with the gear 134a. If film supplying was started by the first motor 20 forward rotation in this state, the second motor 30 would be a load causing unnecessary power consumption through the gear 22. Thereafter, step S3940 starts the second motor 30 forward rotation for a predetermined length of time. The planetary lever 36 of the planetary gear mechanism 32 moves toward the gear train 33. The mesh of the planetary gear 35 and the gear 134a is broken and the planetary gear 35 enmeshes with the gear 37, as shown in FIG. 27. Therefore, when the film is supplied by the first motor 20 the next time, the second motor 30 does not become a load on the first motor 20. Step S3941 returns to step S3683 of FIG. 36.

Step S3683 determines whether the cartridge chamber cover was opened using the switch SW1. When the cover has been opened, step S3684 determines whether the film cartridge 2 has been removed using the switch SW2. If the cartridge cover is not opened in step S3683 or the cartridge is not removed in step S3684, operation returns to step S3683. After the cartridge 2 has been removed from the cartridge chamber, operation returns to step S3671 and the above-described processes can be repeated.

Therefore, advancing and withdrawing of the magnetic head 46 in addition to film supply is performed using two film supply motors. A special motor for advancement and withdrawal of the magnetic head 46 is unnecessary. The cost of the camera is reduced. Further, the camera can be made smaller.

Figure 40:
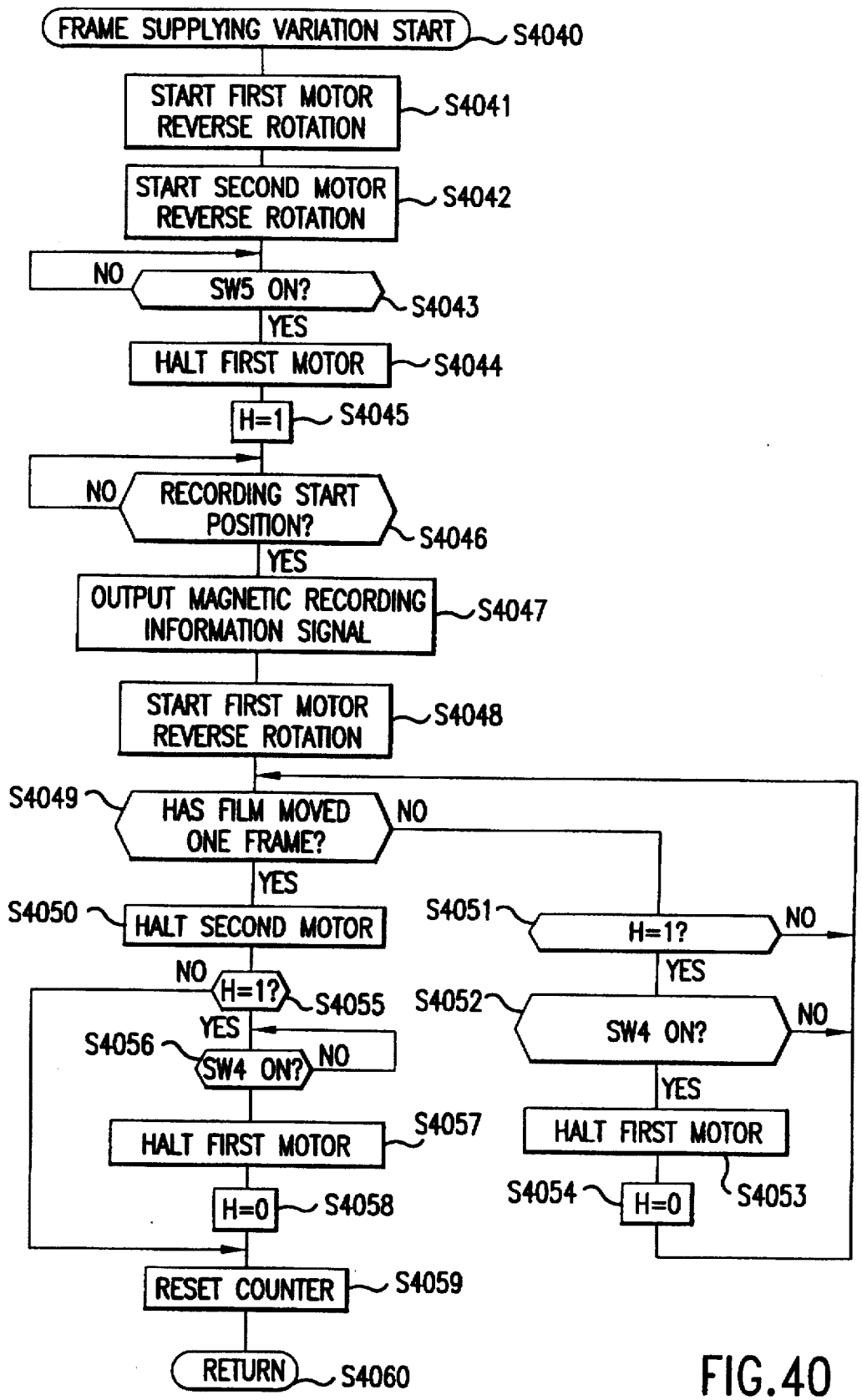
FIG. 40 is a flowchart showing a variation of the frame supplying operation for a prewinding method.

FIG. 40 shows a variation of the second preferred embodiment frame supplying in a prewinding camera where the magnetic head 46 is advanced and withdrawn during the supplying of one frame of the film 1 by overlapping the first motor 20 and the second motor 30 driving.

The frame supplying operation starts in step S4040. When reverse rotation of the first motor 20 is started in step S4041, the enmeshing of the planetary gear mechanism 24 changes so the planetary gear 26 enmeshes with the gear 141 as shown in FIG. 24. The magnetic head 46 starts advancing through rotation of the cam 44 by the gear 42. In step S4042, during the pressing operation of the magnetic head, rewinding of the film 1 is performed by starting second motor 30 reverse rotation. Step S4043, determines whether the magnetic head 46 is pressed against the film 1 using the switch SW5 so magnetic recording is possible. If magnetic recording is possible, step S4044 halts the first motor 20; otherwise step S4043 is repeated. The magnetic head 46 is pressed against the film 1 before the magnetic recording position.

In step S4045, the flag H is set to 1. The flag H is set to 1 when the magnetic head 46 is in a pressing state and is reset to 0 when the magnetic head 46 is in a withdrawn state. Step S4046 determines whether the film 1 has been supplied to the magnetic recording start position based on the supply amount detected by the counter 901. When the magnetic recording start position has been reached, step S4047 outputs the various recording information determined beforehand to the magnetic head driving circuit 108 for recording in the magnetic recording section of the film 1 by the magnetic head 46. The magnetic recording completes slightly before the frame supply is completed.

When magnetic recording has been completed, the first motor 20 reverse rotation is started again in step S4048. Because the planetary gear 26 of the planetary gear mechanism 24 is already enmeshed with the gear 141, the cam 44 forward rotation starts withdrawing the magnetic head 46. Step S4049 determines whether one film frame has been supplied based on the counter 901. When one frame has been supplied and the next frame is located in the photography position, operation moves to step S4050. Otherwise, operation continues to step S4051.

When one frame has been supplied, step S4050 halts the second motor 30. Then, step S4055 determines whether the flag H is set to 1. When the magnetic head is set to 1 (pressing state), step S4056 determines whether the magnetic head 46 has been withdrawn from the film 1 using the switch SW4. When the magnetic head 46 is withdrawn, step S4057 halts the first motor 20. The flag H is reset to 0 in step S4058. Step S4059 resets the counter 901 and the frame supplying operation is completed. Step S4060 then returns the program to the step following the calling step.

On the other hand, when step S4049 determines one frame has not been supplied, step S4051 determines whether the flag H has been set to 1. If the magnetic head is in the pressing state (H=1), operation continues to step S4052. Otherwise, operation returns to step S4049. Step S4052 determines whether the magnetic head 46 has been withdrawn from the film 1 using the switch SW4. When the magnetic head 46 is withdrawn, operation continues to step S4053. Otherwise, operation returns to step S4049. Step S4053 halts the first motor 20. Step S4054 resets the flag H to 0, and the program returns to step S4049.

In this way, the second preferred embodiment performs the operation of advancing and withdrawing the magnetic head and the operation of frame supplying to overlap, and thereby improving camera speed.

In the second embodiment, a first power transfer device includes the pinion gear 20a, the planetary gear mechanism 24 and the gears 23, 28 and 141. A second power transfer device includes the pinion gear 30a, the gear trains 31, 33 and 134, the planetary gear mechanism 32 and the gears 4 and 23.

With a prewinding camera according to the present invention, film is supplied from the cartridge by rotation of the first motor in a first direction or the second motor in the fourth direction. The operation of rewinding supplying film from the cartridge is performed by rotation the first motor in a second direction different from the first direction of the second motor in the fourth direction. The operation of winding the film to the camera side is performed by rotation of the second motor in a third direction. The operation preparatory to magnetic recording is performed by rotation of the second motor in a fourth direction different from the third direction or the first motor in the second direction. The film winding operation of the second motor can be performed during the magnetic recording preparatory operation of the first motor. Consequently, the camera speed can be improved. In particular, high speed continuous photography operations are enabled.

Further, the rotation of the first motor in the first direction transfers to the cartridge spool to supply film from the cartridge. The rotation of the first motor in the second direction or the second motor in the fourth direction transfers to the cartridge spool to rewind film to the cartridge. The camera is structured so that the film is wound towards the camera side by transferring rotation of the second motor in the third direction by the second power transfer device. The operation preparatory to magnetic recording is performed driving the second motor in the fourth direction or the first motor in the second direction. Thus, both the first motor and the second motor are prevented from becoming a load to the other motor during the other motor driving. Therefore, unnecessary battery power consumption is prevented.

While this invention has been described in conjunction with the specific embodiments outlined above, many alternatives, modifications and variations will be apparent to those skilled in the art. Accordingly, the preferred embodiments as set forth above are intended to be illustrative, not limiting. Various changes may be made without departing from the spirit and scope of the invention as defined in the following claims.

What is claimed is:

1. An apparatus having a winding spool and a driving member that drives a cartridge spool of a film cartridge, the apparatus comprising:

a first motor driving in a first direction and a second direction different from the first direction; and a second motor driving in a first direction of the second motor and a second direction of the second motor different from the first direction of the second motor, the first motor and the second motor adapted to perform thrust operation which supply film from the cartridge spool to the winding spool, wind the film around the winding spool, rewind the film from the winding spool to the cartridge spool and make a magnetic recording device ready for magnetic recording, and wherein after the rewinding action, engagement between a rewinding mechanism and one motor of the first motor and the second motor are released, and a thrust mechanism which performs the thrust operation and one motor of the first motor and the second motor are returned to an engaging position.

2. The apparatus according to claim 1, wherein the first motor supplies film from the cartridge spool to the winding spool by driving in the first direction, the first motor rewinding the film to the cartridge spool by driving in the second direction, the second motor winding the film around the winding spool by driving in the first direction of the second motor, the second motor making the magnetic recording device ready for magnetic recording by driving in the second direction of the second motor.

3. The apparatus according to claim 1, wherein the first motor supplies film from the cartridge spool to the winding spool by driving in the first direction, the first motor making the magnetic recording device ready for magnetic recording by driving in the second direction, the second motor winding the film around the winding spool by driving in the first direction of the second motor, the second motor rewinding the film to the cartridge spool by driving in the second direction of the second motor.

4. The apparatus according to claim 1, wherein the apparatus has a normal winding method that winds the film around the winding spool after each photograph.

5. The apparatus according to claim 4, further comprising a control device that controls the film winding during operation of the magnetic recording device.

6. The apparatus according to claim 1, wherein the apparutus has a prewinding method that initially winds substantially all the film from the cartridge spool to the winding spool and winds-in the film from the winding spool to the cartridge spool after each photograph.

7. The apparatus according to claim 6, wherein the second motor initially winds substantially all the film around the winding spool prior to photography and the first motor winds-in a portion of the film from the winding spool to the cartridge spool after each photograph.

8. The apparatus according to claim 6, wherein the second motor initially winds substantially all the film around the winding spool prior to photography and the second motor winds-in a portion of the film from the winding spool to the cartridge spool after each photograph.

9. The apparatus according to claim 6, further comprising a control device that controls the film winding-in by the first motor during operation of the magnetic recording device by the second motor.

10. The apparatus according to claim 1, wherein making the magnetic recording device ready for magnetic recording includes at least one of moving a magnetic head toward the film and withdrawing the magnetic head from the film.

11. The apparatus according to claim 1, wherein the magnetic recording device magnetically records photography information on the film.

12. The apparatus according to claim 1, further comprising:

a first power transfer device that transfers driving of the first motor in the first direction to the cartridge spool, the first power transfer device transferring driving of the first motor in the second direction to one of the cartridge spool and the magnetic recording device; and a second power transfer device that transfers driving of the second motor in the first direction of the second motor to the winding spool, the second power transfer device transferring driving of the second motor in the second direction of the second motor to one of the magnetic recording device and the cartridge spool.

13. The apparatus according to claim 1, further comprising:

a first planetary clutch mechanism that transfers driving of the first motor in the first direction to the cartridge spool using a first gear train, the first planetary clutch mechanism transferring driving of the first motor in the second direction to one of the cartridge spool and the magnetic recording device using a second gear train; and a second planetary clutch mechanism that transfers driving of the second motor in the first direction of the second motor to the winding spool using a third gear train, the second planetary clutch mechanism transferring driving of the second motor in the second direction of the second motor to one of the magnetic recording device and the cartridge spool using a fourth gear train.

14. The apparatus according to claim 13, wherein the first planetary clutch mechanism prevents the first motor from resisting the driving of the second motor, and the second planetary clutch mechanism prevents the second motor from resisting the driving of the first motor.

15. The apparatus according to claim 14, wherein each of the first planetary clutch mechanism and the second planetary clutch mechanism comprises at least a sun gear, a planetary gear and a planetary lever.

16. An apparatus having a winding spool and a driving member that drives a cartridge spool of a film cartridge, the apparatus comprising:

a first motor having a first mode and a second mode, the first mode driving the cartridge spool in a first direction to supply film from the cartridge spool to the winding spool, the second mode driving the cartridge spool in a second direction different from the first direction to rewind the film from the winding spool to the cartridge spool; and a second motor having a third mode and a fourth mode, the third mode driving the winding spool to wind the film around the winding spool by one direction rotation of the second motor, the fourth mode driving a magnetic recording device in preparation for magnetic recording by the other direction rotation of the second motor.

17. The apparatus according to claim 16, wherein the fourth mode comprises at least one of moving a magnetic recording head toward the film and withdrawing the magnetic recording head from the film.

18. The apparatus according to claim 16, further comprising:

a first power transfer device that transfers the first mode driving to the cartridge spool, the first power transfer device transferring the second mode driving to the cartridge spool; and a second power transfer device that transfers the third mode driving to the winding spool, the second power transfer device transferring the fourth mode driving to prepare the magnetic recording device for magnetic recording.

19. An apparatus having a winding spool and a driving member that drives a cartridge spool of a film cartridge, the apparatus comprising:

a first motor performing in a first mode and a second mode, the first mode driving the cartridge spool in a first direction of the cartridge spool to supply film from the cartridge spool to the winding spool, the second mode driving a magnetic recording device relative to the film in preparation for magnetic recording;

a second motor performing in a third mode and a fourth mode, the third mode driving the winding spool in a first direction of the winding spool to wind film around the winding spool, the fourth mode driving the cartridge spool in a second direction of the cartridge spool different from the first direction of the cartridge spool to rewind the film from the winding spool to the cartridge spool; and a return mechanism releasing engagement between the cartridge spool and the second motor after the film rewinding action by the cartridge spool, which releases the fourth mode, and bringing the cartridge spool and the first motor into engagement to start performing the first mode.

20. The apparatus according to claim 19, wherein the second mode comprises at least one of moving a magnetic recording head toward the film and withdrawing the magnetic recording head from the film.

21. The apparatus according to claim 19, further comprising:

a first power transfer device that transfers the first mode driving to the cartridge spool, the first power transfer device transferring the second mode driving to prepare the magnetic recording device for magnetic recording; and a second power transfer device that transfers the third mode driving to the winding spool, the second power transfer device transferring the fourth mode driving to the cartridge spool.

22. A method for supplying film in an apparatus having a driving member that drives a cartridge spool of a film cartridge, a winding spool and a magnetic recording device, the method comprising the steps of:

supplying film from the cartridge spool to the winding spool by driving a first motor;

winding the film around the winding spool by driving a second motor in one direction;

rewinding the film from the winding spool to the cartridge spool by driving the first motor; and making the magnetic recording device ready for magnetic recording by driving the second motor in the other direction.

23. The method of claim 22, wherein the second motor winds the film from the cartridge spool to the winding spool after each photograph.

24. The method of claim 22, wherein the second motor initially winds substantially all the film prior to photography from the cartridge spool to the winding spool and the first motor winds-in the film from the winding spool to the cartridge spool after each photograph.

25. The method of claim 22, wherein the making the magnetic recording device ready for magnetic recording step comprises at least one of moving the magnetic recording device toward the film and withdrawing the magnetic recording device from the film.

26. The method of claim 22, wherein the supplying step and the rewinding step are performed without resistance from the second motor, and the winding step is performed without resistance from the first motor.

27. A method for supplying film in an apparatus having a driving member that drives a cartridge spool of a film cartridge, a winding spool and a magnetic recording device, the method comprising the steps of:

supplying film from the cartridge spool to the winding spool by driving a first motor;

winding the film around the winding spool by driving a second motor;

preparing a magnetic recording device relative to the film by driving the first motor;

rewinding the film from the winding spool to the cartridge spool by driving the second motor; and releasing engagement of the cartridge spool with the second motor after the film rewinding action and bringing the cartridge spool into engagement with the first motor by driving the first and second motors.

28. The method of claim 27, wherein the second motor winds the film from the cartridge spool to the winding spool after each photograph.

29. The method of claim 27, wherein the second motor initially winds substantially all the film prior to photography from the cartridge spool to the winding spool and the second motor winds-in the film to the cartridge spool after each photograph.

30. The method of claim 27, wherein the making the magnetic recording device ready for magnetic recording step comprises at least one of moving the magnetic recording device toward the film and withdrawing the magnetic recording device from the film.

31. The method of claim 27, wherein the supplying step is performed without resistance from the second motor, and the winding step and the rewinding step are performed without resistance from the first motor.

32. An apparatus having a winding spool and a driving member that drives a cartridge spool of a film cartridge, the apparatus comprising:

a first motor driving in a first direction and a second direction different from the first direction; and a second motor driving in a first direction of the second motor and a second direction of the second motor different from the first direction of the second motor, the first motor and the second motor adapted to supply film from the cartridge spool to the winding spool, wind the film around the winding spool, rewind the film from the winding spool to the cartridge spool and make a magnetic recording device ready for magnetic recording, wherein one of the first motor and the second motor drives a single sun gear in one direction to supply the film from the cartridge spool to the winding spool and drives the single sun gear in opposite direction of the one direction to touch and withdraw the magnetic recording device from the film.

33. A apparatus having a winding spool and a driving member that drives a cartridge spool of a film cartridge, the apparatus comprising:

a first motor that rotates in a first rotating direction and a second rotating direction different from the first rotating direction;

a second motor that rotates in a first rotating direction of the second motor and a second rotating direction of the second motor different from the first rotating direction of the second motor;

a magnetic recording device that magnetically records photography information on film;

a first power transfer device that transfers rotation of the first motor in the first rotating direction to the cartridge spool, the first power transfer device transferring rotation of the first motor in the second rotating direction to one of the cartridge spool and the magnetic recording device; and a second power transfer device that transfers rotation of the second motor in the first rotating direction of the second motor to the winding spool, the second power transfer device transferring rotation of the second motor in the second rotating direction of the second motor to one of the magnetic recording device and the cartridge spool, one of the first motor and the second motor making the magnetic recording device ready for magnetic recording, wherein the one of the first motor and the second motor drives a single sun gear in one direction to supply the film from the cartridge spool and the winding spool and drives the single sun gear in opposite direction of the one direction to touch and withdraw the magnetic recording device from the film.

34. An apparatus having a winding spool and a driving member that drives a cartridge spool of a film cartridge, the apparatus comprising:

a first motor performing in a first mode and a second mode, the first mode driving the cartridge spool in a first direction of the cartridge spool to supply film from the cartridge spool to the winding spool, the second mode driving a magnetic recording device relative to the film in preparation for magnetic recording; and a second motor performing in a third mode and a fourth mode, the third mode driving the winding spool in a first direction of the winding spool to wind film around the winding spool, the fourth mode driving the cartridge spool in a second direction of the cartridge spool different from the first direction of the cartridge spool to rewind the film from the winding spool to the cartridge spool, wherein the first motor drives a single sun gear in one direction to supply the film from the cartridge spool to the winding spool and drives the single sun gear in opposite direction of the one direction to touch and withdraw the magnetic recording device from the film.

35. A method for supplying film in an apparatus having a driving member that drives a cartridge spool of a film cartridge, a winding spool and a magnetic recording device, the method comprising the steps of:

supplying film from the cartridge spool to the winding spool by driving a first motor;

winding the film around the winding spool by driving a second motor;

rewinding the film from the winding spool to the cartridge spool by driving the second motor; and advancing a magnetic recording device relative to the film in preparation for magnetic recording by driving the first motor, wherein the first motor drives a single sun gear in one direction to advance the film from the cartridge spool to the winding spool and drives the single sun gear in opposite direction of the one direction to touch and withdraw the magnetic recording device from the film.

* * * * *